United States Patent
Lepeska et al.

(10) Patent No.: US 10,789,326 B2
(45) Date of Patent: *Sep. 29, 2020

(54) PROGRESSIVE PREFETCHING

(71) Applicant: ViaSat, Inc., Carlsbad, CA (US)

(72) Inventors: Peter Lepeska, Boston, MA (US); William B. Sebastian, Falmouth, MA (US)

(73) Assignee: VIASAT, Inc., Carlsbad, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/887,559

(22) Filed: Feb. 2, 2018

(65) Prior Publication Data

US 2018/0337972 A1  Nov. 22, 2018

Related U.S. Application Data

(63) Continuation of application No. 13/371,374, filed on Feb. 10, 2012, now Pat. No. 9,912,718.

(Continued)

(51) Int. Cl.
*G06F 15/16* (2006.01)
*G06F 16/957* (2019.01)
(Continued)

(52) U.S. Cl.
CPC ...... *G06F 16/9574* (2019.01); *G06F 16/9566* (2019.01); *H04L 67/02* (2013.01);
(Continued)

(58) Field of Classification Search
None
See application file for complete search history.

(56) References Cited

U.S. PATENT DOCUMENTS

| | | |
|---|---|---|
| 5,408,470 A | 4/1995 | Rothrock et al. |
| 5,727,129 A | 3/1998 | Barrett et al. |

(Continued)

FOREIGN PATENT DOCUMENTS

| | | |
|---|---|---|
| EP | 1018085 B1 | 4/2006 |
| WO | WO-2001/061886 A2 | 8/2001 |

(Continued)

OTHER PUBLICATIONS

Frantzeskou et al., "Effective Identification of Source Code Authors Using Byte-Level Information," ICSE '06, May 20-28, 2006, Shanghai, China, ACM 1-59593-085-X/06/0005, XP040040085, pp. 893-896.

(Continued)

*Primary Examiner* — SM A Rahman
(74) *Attorney, Agent, or Firm* — Kilpatrick Townsend & Stockton, LLP

(57) ABSTRACT

The present invention relates to systems, apparatus, and methods of using usage data to determine the dependency structures of a web application, including dependency structures between follow-on objects of an initial object in a web transaction. In one embodiment, an input URL and associated dynamic response data are analyzed for such nested or dependent relationships. In further embodiments, analysis of these relationships are used to improve prefetching operations to lower overall page load times.

44 Claims, 27 Drawing Sheets

Related U.S. Application Data

(60) Provisional application No. 61/442,119, filed on Feb. 11, 2011, provisional application No. 61/550,296, filed on Oct. 21, 2011.

(51) Int. Cl.
  *H04L 29/08* (2006.01)
  *G06F 16/955* (2019.01)

(52) U.S. Cl.
  CPC ...... *H04L 67/2814* (2013.01); *H04L 67/2842* (2013.01); *H04L 67/2847* (2013.01); *H04L 67/2852* (2013.01)

(56) References Cited

U.S. PATENT DOCUMENTS

| | | |
|---|---|---|
| 5,740,367 A | 4/1998 | Spilo |
| 5,870,754 A | 2/1999 | Dimitrova et al. |
| 5,878,223 A | 3/1999 | Becker et al. |
| 5,905,981 A | 5/1999 | Lawler |
| 6,085,193 A * | 7/2000 | Malkin ............ H04L 29/06 |
| 6,085,226 A | 7/2000 | Horvitz |
| 6,098,064 A * | 8/2000 | Pirolli ............ H04L 29/06 |
| 6,178,461 B1 | 1/2001 | Chan et al. |
| 6,182,133 B1 | 1/2001 | Horvitz |
| 6,253,264 B1 | 6/2001 | Sebastian |
| 6,339,787 B1 | 1/2002 | Yohe et al. |
| 6,578,073 B1 | 6/2003 | Starnes et al. |
| 6,622,168 B1 | 9/2003 | Datta |
| 6,701,316 B1 | 3/2004 | Li |
| 6,879,808 B1 | 4/2005 | Nations et al. |
| 6,993,591 B1 | 1/2006 | Klemm |
| 7,124,305 B2 | 10/2006 | Margolus et al. |
| 7,130,890 B1 | 10/2006 | Kumar et al. |
| 7,237,061 B1 | 6/2007 | Boic |
| 7,340,510 B1 | 3/2008 | Liskov et al. |
| 7,359,956 B2 | 4/2008 | Kanai et al. |
| 7,430,331 B2 | 9/2008 | Singh |
| 7,509,667 B1 | 3/2009 | Cook |
| 7,526,607 B1 | 4/2009 | Singh et al. |
| 7,636,767 B2 | 12/2009 | Lev-Ran et al. |
| 7,680,897 B1 | 3/2010 | Carter |
| 7,681,032 B2 | 3/2010 | Peled et al. |
| 7,716,225 B1 | 5/2010 | Dean et al. |
| 7,716,367 B1 | 5/2010 | Leighton et al. |
| 7,747,749 B1 | 6/2010 | Erikson et al. |
| 7,778,438 B2 | 8/2010 | Malone |
| 7,814,149 B1 | 10/2010 | Stringham |
| 7,836,177 B2 | 11/2010 | Kasriel et al. |
| 7,917,531 B2 | 3/2011 | Sakurai |
| 7,941,409 B2 | 5/2011 | Mimatsu |
| 7,941,609 B2 | 5/2011 | Almog |
| 7,953,881 B1 | 5/2011 | Vadlakonda et al. |
| 7,975,019 B1 | 7/2011 | Green et al. |
| 7,975,071 B2 | 7/2011 | Ramjee et al. |
| 8,010,705 B1 | 8/2011 | Sebastian et al. |
| 8,041,677 B2 | 10/2011 | Sumner et al. |
| 8,055,616 B2 | 11/2011 | Johnston et al. |
| 8,082,228 B2 | 12/2011 | Mu |
| 8,151,004 B1 | 4/2012 | Ufimtsev et al. |
| 8,209,510 B1 | 6/2012 | Thathapudi et al. |
| 8,230,059 B1 | 7/2012 | Santos et al. |
| 8,230,461 B1 | 7/2012 | Ledermann et al. |
| 8,284,773 B1 | 10/2012 | Woleben et al. |
| 8,327,440 B2 | 12/2012 | Milener et al. |
| 8,335,838 B2 | 12/2012 | Zhang et al. |
| 8,341,245 B1 | 12/2012 | Roskind et al. |
| 8,477,635 B2 | 7/2013 | Sebastian et al. |
| 8,478,843 B1 | 7/2013 | Ortlieb et al. |
| 8,489,672 B2 | 7/2013 | Sebastian et al. |
| 8,489,673 B2 | 7/2013 | Sebastian et al. |
| 8,639,744 B2 | 1/2014 | Sebastian |
| 8,812,648 B2 | 8/2014 | Subramanian et al. |
| 8,984,048 B1 * | 3/2015 | Maniscalco ......... H04L 67/2847 709/203 |
| 9,037,638 B1 | 5/2015 | Lepeska et al. |
| 9,083,583 B1 | 7/2015 | Roskind et al. |
| 9,106,607 B1 | 8/2015 | Lepeska et al. |
| 9,135,364 B1 | 9/2015 | Sundaram et al. |
| 9,456,050 B1 | 9/2016 | Lepeska et al. |
| 9,912,718 B1 | 3/2018 | Lepeska et al. |
| 2001/0016836 A1 | 8/2001 | Boccon-Gibod |
| 2001/0043600 A1 | 11/2001 | Chatterjee et al. |
| 2001/0051927 A1 | 12/2001 | London et al. |
| 2002/0006116 A1 | 1/2002 | Burkhart |
| 2002/0010761 A1 | 1/2002 | Carneal et al. |
| 2002/0026478 A1 | 2/2002 | Rodgers et al. |
| 2002/0154887 A1 | 10/2002 | Lu |
| 2002/0188735 A1 | 12/2002 | Needham et al. |
| 2002/0194473 A1 | 12/2002 | Pope |
| 2003/0018581 A1 | 1/2003 | Bratton |
| 2003/0105833 A1 | 6/2003 | Daniels et al. |
| 2003/0120658 A1 | 6/2003 | Carneal et al. |
| 2003/0126232 A1 | 7/2003 | Mogul et al. |
| 2003/0237053 A1 | 12/2003 | Chen et al. |
| 2004/0205149 A1 | 10/2004 | Dillon et al. |
| 2005/0010870 A1 | 1/2005 | Gu et al. |
| 2005/0015387 A1 | 1/2005 | Sassi et al. |
| 2005/0015442 A1 | 1/2005 | O'Laughlen et al. |
| 2005/0027820 A1 | 2/2005 | O'Laughlen et al. |
| 2005/0033747 A1 | 2/2005 | Wittkotter |
| 2005/0044242 A1 | 2/2005 | Stevens et al. |
| 2005/0131903 A1 | 6/2005 | Margolus et al. |
| 2006/0047804 A1 | 3/2006 | Fredricksen et al. |
| 2006/0101514 A1 | 5/2006 | Milener et al. |
| 2006/0112264 A1 | 5/2006 | Agarwal |
| 2006/0116926 A1 | 6/2006 | Chen |
| 2006/0184960 A1 | 8/2006 | Horton et al. |
| 2006/0253444 A1 | 11/2006 | O'Toole et al. |
| 2006/0277257 A1 | 12/2006 | Kromann et al. |
| 2006/0288072 A1 | 12/2006 | Knapp et al. |
| 2006/0294112 A1 | 12/2006 | Mandato et al. |
| 2006/0294223 A1 | 12/2006 | Glasgow et al. |
| 2007/0033408 A1 | 2/2007 | Morten |
| 2007/0101074 A1 | 5/2007 | Patterson |
| 2007/0111713 A1 | 5/2007 | Silverbrook et al. |
| 2007/0116151 A1 | 5/2007 | Thesling |
| 2007/0133554 A1 | 6/2007 | Ederer et al. |
| 2007/0143484 A1 | 6/2007 | Drouet |
| 2007/0156845 A1 | 7/2007 | Devanneaux et al. |
| 2007/0174246 A1 | 7/2007 | Sigurdsson |
| 2007/0220303 A1 | 9/2007 | Kimura et al. |
| 2007/0226320 A1 | 9/2007 | Hager et al. |
| 2007/0256021 A1 | 11/2007 | Prager et al. |
| 2007/0260653 A1 | 11/2007 | Jaffri et al. |
| 2007/0288518 A1 | 12/2007 | Crigler et al. |
| 2008/0005086 A1 | 1/2008 | Moore |
| 2008/0066182 A1 | 3/2008 | Hickmott et al. |
| 2008/0082509 A1 | 4/2008 | Bessieres et al. |
| 2008/0114773 A1 | 5/2008 | Choi et al. |
| 2008/0115125 A1 | 5/2008 | Stafford et al. |
| 2008/0144713 A1 | 6/2008 | Kimmich et al. |
| 2008/0155614 A1 | 6/2008 | Cooper et al. |
| 2008/0175239 A1 | 7/2008 | Sistanizadeh et al. |
| 2008/0201331 A1 | 8/2008 | Eriksen et al. |
| 2008/0201332 A1 | 8/2008 | Souders et al. |
| 2008/0205396 A1 | 8/2008 | Dakshinamoorthy et al. |
| 2008/0235594 A1 | 9/2008 | Bhumkar et al. |
| 2008/0235739 A1 | 9/2008 | Coebergh Van Den Braak |
| 2008/0256138 A1 | 10/2008 | Sim-Tang |
| 2008/0263130 A1 | 10/2008 | Michalowitz et al. |
| 2009/0006368 A1 | 1/2009 | Mei et al. |
| 2009/0037393 A1 | 2/2009 | Fredricksen |
| 2009/0047937 A1 | 2/2009 | Zellner et al. |
| 2009/0049469 A1 | 2/2009 | Small et al. |
| 2009/0055471 A1 | 2/2009 | Kozat et al. |
| 2009/0055862 A1 | 2/2009 | Knoller et al. |
| 2009/0060086 A1 | 3/2009 | Kimmich et al. |
| 2009/0100228 A1 | 4/2009 | Lepeska et al. |
| 2009/0158318 A1 | 6/2009 | Levy |
| 2009/0168795 A1 | 7/2009 | Segel |
| 2009/0187673 A1 | 7/2009 | Ramjee et al. |
| 2009/0228782 A1 | 9/2009 | Fraser et al. |
| 2009/0234809 A1 | 9/2009 | Bluger et al. |

(56) References Cited

U.S. PATENT DOCUMENTS

| | | |
|---|---|---|
| 2009/0254971 A1* | 10/2009 | Herz ................... G06Q 30/02 726/1 |
| 2009/0313329 A1 | 12/2009 | Agrawal et al. |
| 2010/0017696 A1 | 1/2010 | Choudhary et al. |
| 2010/0058430 A1 | 3/2010 | Jones et al. |
| 2010/0083322 A1 | 4/2010 | Rouse |
| 2010/0095220 A1 | 4/2010 | Kassab |
| 2010/0169262 A1 | 7/2010 | Kenedy et al. |
| 2010/0169313 A1 | 7/2010 | Kenedy et al. |
| 2010/0177642 A1 | 7/2010 | Sebastian et al. |
| 2010/0179984 A1 | 7/2010 | Sebastian |
| 2010/0179986 A1 | 7/2010 | Sebastian et al. |
| 2010/0179987 A1 | 7/2010 | Sebastian et al. |
| 2010/0180046 A1 | 7/2010 | Sebastian et al. |
| 2010/0185730 A1 | 7/2010 | Sebastian |
| 2010/0191856 A1 | 7/2010 | Gupta et al. |
| 2010/0228963 A1 | 9/2010 | Kassab et al. |
| 2010/0232431 A1 | 9/2010 | Sebastian |
| 2010/0235579 A1 | 9/2010 | Biles et al. |
| 2010/0312858 A1 | 12/2010 | Mickens et al. |
| 2011/0029641 A1 | 2/2011 | Fainberg et al. |
| 2011/0078124 A1 | 3/2011 | Ushiyama |
| 2011/0238924 A1 | 9/2011 | Hampton et al. |
| 2011/0246880 A1 | 10/2011 | Horton et al. |
| 2011/0258532 A1 | 10/2011 | Ceze et al. |
| 2011/0270959 A1 | 11/2011 | Schlusser et al. |
| 2012/0060121 A1 | 3/2012 | Goldberg et al. |
| 2012/0066586 A1 | 3/2012 | Shemesh |
| 2012/0136926 A1 | 5/2012 | Dillon |
| 2012/0185505 A1 | 7/2012 | Borden et al. |
| 2012/0239598 A1 | 9/2012 | Cascaval et al. |
| 2013/0031459 A1 | 1/2013 | Khorashadi et al. |
| 2013/0297561 A1 | 11/2013 | Mizrotsky et al. |
| 2014/0149850 A1 | 5/2014 | Khorashadi et al. |

FOREIGN PATENT DOCUMENTS

| | | |
|---|---|---|
| WO | WO-2001/084777 A2 | 11/2001 |
| WO | WO-2002/041527 A1 | 5/2002 |
| WO | WO-2007/051079 A2 | 5/2007 |
| WO | WO-2008/070614 A2 | 6/2008 |

OTHER PUBLICATIONS

Paul et al., "Distributed caching with centralized control," Computer Communications, vol. 24, Issue 2, Feb. 1, 2001, pp. 256-268.

Selvakumar et al., "Implementation and comparison of distributed caching schemes," Computer Communications, vol. 24, Issues 7-8, Apr. 1, 2001, pp. 677-684.

Alnuem, "An Extended Review of Techniques for Enhancing TCP Performance", J. King Saud University, vol. 22, Comp. & Info. Sci., 2010, pp. 45-61.

* cited by examiner

FIG. 7 – Using Child URL Map to Add a Bin Children Entry

FIG. 8 – Additional Generalizations for the Bin Model

PROGRESSIVE PREFETCHING

CROSS-REFERENCE TO RELATED APPLICATIONS

This application is a continuation of co-pending U.S. patent application Ser. No. 13/371,374, filed Feb. 10, 2012, entitled "Progressive Prefetching," which claims the benefit of U.S. Provisional Application Ser. No. 61/442,119 filed on Feb. 11, 2011 entitled "Web Browser Acceleration and Application Analysis" and U.S. Provisional Application Ser. No. 61/550,296 filed on Oct. 21, 2011 entitled "Analyzing Real User Usage Data to Predict Objects in Web Pages," all of which are hereby expressly incorporated by reference in their entirety for all purposes.

BACKGROUND

Web page transmission, in which a user selects web page content and receives objects, is a core part of the Internet experience for Internet users. While the experience of users is typically a single selection followed by the viewing of a web page that is presented on the screen, the process of presenting the web page on the screen can involve a large number of objects and multiple request/response round trip communications from the user system to a system that is providing the web page.

One method of improving the performance of web page transmission and presentation is HTTP prefetching. HTTP prefetching typically involves pre-requesting content on behalf of a client or browser before a request for that content is actually generated as a typical HTTP request and response in the course of a typical web page transaction. Certain prefetching embodiments involve pre-requesting content based on predictions about a future user selection without any actual action or selection by the user. Other HTTP prefetching systems, such as the systems discussed here, involve pre-requesting content in response to a user action or selection as part of a web page transaction. In such systems, when content is prefetched it may become possible to satisfy the request for that content locally (with regard to the client or browser) or at a location with a lower latency to the user, thereby negating the need to transmit the request and wait for the response from a content server. For example, in cases where there exists high latency between the client generating the request and the server which responds with the context requested, each negated request/response may avoid the penalty for such latency, thereby potentially reducing the total time required to satisfy the entire series of requests for the client. This may result in an accelerated end user experience.

In some prefetching systems, the system may have a set of metrics for determining when a file should or should not be prefetched. An ideal goal of a prefetcher may be to identify and prefetch all objects relating to a particular requested web page, and to avoid prefetching objects which are not later requested by a user. For example, when a user requests a web page, the prefetcher may request (e.g., as a proxy for the user) various objects embedded in the web page in anticipation of those objects being ultimately requested. Under certain circumstances, however, incorrect objects may be prefetched repeatedly based on incorrect models or difficult to quantify exceptions to a rule, resulting in resources being wasted to prefetch an object that will never be used. In certain cases, a prefetcher may miss objects that are embedded in a web page, and it may be difficult to determine which objects associated with a web page will ultimately be requested, or how an object seen at a proxy server relates to other objects. Such circumstances may result in slower performance and increased wait time for a user while a system fetches an object that was missed by a prefetcher.

BRIEF SUMMARY

Various systems and methods are described for providing improved web browsing. Any of the systems and subsystems described may be combined in any functioning way in accordance with various embodiments of the present innovations, and in accordance with additional portions of embodiments not described herein that will be apparent to a person of ordinary skill in the art.

In certain embodiments, a system using smart tracking of parameters in web page transactions is used to improve prefetching performance. In one embodiment, an input URL and associated dynamic response data are analyzed for nested or dependent relationships. These relationships may be between children of a root HTTP request or may be reliant on further input. In further embodiments, a prefetching system identifies how information from a prefetch response or a subsequent web application request during a page download may be used to synthesize dynamic fields in a child URL.

In one potential non-limiting embodiment, a system, device, or method functions by identifying, in response to a user browsing indicator, a plurality of HTTP objects for prefetching; identifying an interdependency between the plurality of HTTP objects; delaying based on the interdependency of objects, the prefetching of a second HTTP object until a first HTTP object has been prefetched.

Further embodiments may operate where identifying the interdependency between the plurality of HTTP objects comprises: observing, using a computing device, at least a portion of a first web page transaction comprising: a first root HTTP request, and resulting therefrom: a first root HTTP response; a first child HTTP request; a first child HTTP response including the first HTTP object; and a second child HTTP request for the second HTTP object; and identifying a parameter from the first child HTTP response that is used to create a second child HTTP request.

Further embodiments may operate by updating an object model using the identifying of the parameter that is used to create the second child HTTP request.

Further embodiments may operate where updating the object model comprises updating a statistical correlation between the first HTTP object and the second HTTP object.

In one potential non-limiting embodiment, a system, device, or method functions by observing, using a computing device, at least a portion of a first web page transaction comprising: a first root HTTP request, and resulting therefrom: a first root HTTP response; a first child HTTP request; a first child HTTP response; and a second child HTTP request; and identifying a parameter from the first child HTTP response that is used to create a second child HTTP request.

Further embodiments may operate by altering a set of prefetching instructions associated with the first web page transactions using the identification of the parameter from the first child HTTP response, whereby prefetch timing instructions stored at the computing device for the first web page transactions are altered.

Further embodiments may operate by communicating the parameter to a content server; and modifying, using the content server, at least one object of the first web page such that a set of object timings for the first web page transaction are optimized to shorten an overall expected web page timing.

Further embodiments may operate by analyzing a set of object timings for the first web page transaction; and adjusting, using the computing device, a set of caching behaviors using the analysis of the set of object timings.

Further embodiments may operate where adjusting the set of caching behaviors comprises lowering a caching priority for a low priority object of the first web page transaction based on a determination by the analyzing the set of object timings that the lower priority object does not impact an overall first web page transaction time.

Further embodiments may operate where adjusting the set of caching behaviors comprises increasing a caching priority for a high priority object of the first web page transaction based on a determination by the analyzing the set of object timings that the high priority object does increases an overall first web page transaction time.

Further embodiments may operate where identifying the parameter from the first child HTTP response comprises scanning an HTTP request of the first web page transaction.

Further embodiments may operate where identifying the parameter from the first child HTTP response further comprises: identifying an expected dependency based on an indicator identified by scanning of the HTTP request; creating a set of prefetching instructions using the expected dependency; and identifying the parameter from the first child HTTP response using the set of prefetching instructions.

Further embodiments may operate where identifying the parameter from the first child HTTP response comprises retrieving a set of timing information from a database of user usage data.

Further embodiments may operate where the set of timing information is part of a child origin model comprising instructions for creating and prefetching a dynamic child URL.

Further embodiments may operate where the database of user usage data comprising timing information from previous user requests for a web page of the first web page transaction.

Further embodiments may operate where the database of user usage data comprises a statistical record of hits, misses, and failures for the prefetching of a set of object that are used to create the first web page.

Further embodiments may operate where the database of user usage data further comprises a set of timing data and a second statistical record of hits, misses, and failures for a set of objects associated with a key/value pair of the first root HTTP request.

Further embodiments may operate where the computing device is a proxy server that intercepts a communication of the first root HTTP request from a user computing device to a content server.

Further embodiments may operate where the computing device is a proxy client operating on a user computing device that originates the first root HTTP request.

Further embodiments may operate where the identifying of the parameter is performed by the computing device.

Further embodiments may operate where the identifying of the parameter is performed by a prefetching analysis server that is separate from the computing device of a user system that originates the first root HTTP request.

In one potential non-limiting embodiment a computing device comprises a processor; a network connection communicatively coupled to a client computer and a content server computer; and a computer readable storage medium having instructions stored thereon for performing a method of content prefetching comprising: observing with the computing device at least a portion of a first web page transaction comprising: a first root HTTP request from the client computer to the content server computer, and resulting therefrom: a first root HTTP response, at least one child HTTP request, and at least one child HTTP response; extracting at least one parameter received at the computing device from the content server computer as part of the web page transaction; identifying a data dependency whereby the at least one parameter is a dynamic parameter that is required by the computing device to create the at least one child HTTP request.

Further embodiments may operate where the computer readable storage medium has instructions stored thereon for performing the method of content prefetching further comprising: storing, using the identified data dependency, a set of prefetch timings for the first web page transaction; observing at least a portion of a second web page transaction comprising a second root HTTP request, wherein the URL of the second root HTTP request is the same as from the URL of the first root HTTP request; extracting the at least one parameter from the second web page transaction; and prefetching the at least one child HTTP response using the at least one parameter.

In one potential non-limiting embodiment, a system, device, or method functions by executing, using a prefetching system, a sequence of prefetch requests from the prefetching system to a content server, wherein execution of at least one of the prefetch requests is delayed until a state change occurs at the prefetching system in response to a communication from the content server.

In one potential non-limiting embodiment, a system, device, or method functions by executing, using a prefetching system, a sequence of prefetch requests from the prefetching system to a content server, wherein execution of at least one of the prefetch requests is delayed until a response is received at the prefetching system from another one of the prefetch requests.

Further embodiments may function where the response returned from the another one of the prefetch requests is a set-cookie HTTP header.

In one potential non-limiting embodiment, a system, device, or method functions by observing, using a computing device, a web transaction including a root HTTP request and a plurality of child HTTP requests and responses; recording a set of timing information for the web page transaction; calculating, for at least one child object, an expected page load time impact associated with caching the at least one child object; adjusting a caching priority for the at least one child object based on the expected page load time impact; and making a caching decision based on the caching priority.

Further embodiments may function where the caching priority is for a local cache on a user computer that is different from the computing device.

Further embodiments may function where the caching priority is for a cache on a dynamic CDN.

Further embodiments may function by communicating the timing information from the computing device to an internet optimization server, wherein the calculating the expected page load time impact is performed on the internet optimization server.

Further embodiments may function where the set of timing information includes server responsiveness timing.

Further embodiments may function where the set of timing information includes an object download time.

Further embodiments may function where the set of timing information includes an overall page load time from user selection to complete web page rendering.

Further embodiments may function where the expected page load time impact comprises a first impact associated with a single user and a second impact associated with a group of users.

Further embodiments may function where adjusting a caching priority for the at least one child object based on the expected page load time impact comprises adjusting a caching priority based on the second impact associated with the group of users.

Further embodiments may function where the expected page load time impact is a time saved per byte of cache used over a caching period.

Further embodiments may function where the caching period is a freshness period specified by a content owner.

Further embodiments may function where the expected page load time impact is based on an multiple expected future page loads for at least two separate web pages that use the at least one child object; wherein the multiple expected future page loads are determined using a page load history for the at least two separate web pages.

Further embodiments may function where the first impact is based on a bandwidth associated with the single user.

Further embodiments may function where the second impact is based on a content server responsiveness associated with the at least one child object.

Further embodiments may function by identifying, using the computing device, a cause of the expected page load time impact; and transmitting, using the computing device, a message including the cause of the expected page load time impact and the expected page load time impact.

Further embodiments may function where the web transaction is initiated by a web crawler operating on the computing device.

BRIEF DESCRIPTION OF THE DRAWINGS

The present disclosure is described in conjunction with the appended figures.

DETAILED DESCRIPTION

Figure 1A:
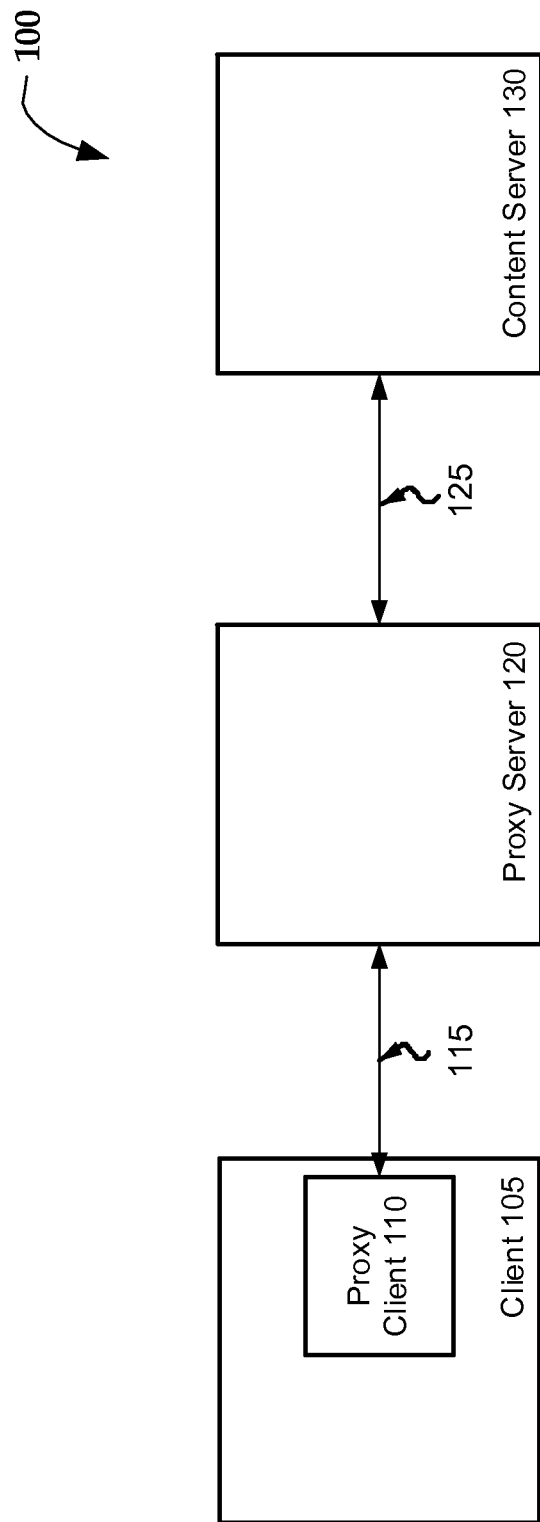
FIG. 1A illustrates a block diagram of one potential implementation of a communications system in accordance with one potential embodiment of the innovations presented herein.

The present invention relates, in general, to network acceleration and, more particularly, to enhancing web page transaction and web page load operations in response to a user action with dynamic tracking of web page transactions.

In one potential implementation, a user of a client side computer clicks on a web page link. The client side computer or a web browser operating on a client side computer may then send a first root HTTP request to a content server via a proxy server in response to the click. The content server then sends a first root HTTP response back to the client side computer via the proxy server. The first root HTTP response may include embedded URLs that are then requested as part of child HTTP requests from the client to the content server via the proxy server. Child HTTP responses may include further embedded URLs, thus creating a chain or waterfall of objects that make up a web page. Certain embodiments detailed below may function to identify the relationships between objects that create the chain in such a way that delays occur in presentation of the web page to the user. Additional embodiments may improve the web page transaction by optimizing the request and response of objects in the chain.

The proxy server, which has been observing these requests and responses as part of the web page transaction initiated by the user click, may identify or associate a parameter in the web page transaction with a child HTTP request. When the parameter is seen later, the child may be prefetched in anticipation that the child will be requested as part of the web page transaction including the parameter. A history of prefetching success may be kept for a parameter and used to weight a priority for prefetching.

Additionally, in alternate embodiments, the observation of the web page transaction may occur using data from a module inside the web browser or the client system, such that the code used to implement certain parts of the web page transaction may be identified and used as feedback in an acceleration system as described further below. Various embodiments may use either proxy server analysis, analysis from inside the web browser or client system, or both.

In one potential example of a web page transaction with proxy server based acceleration, if the first root HTTP request includes the path http://movies.com/actionmovies/movie1, and a child HTTP request includes http://movies.com/templates/actionmovietemplate, then the proxy server may associate the parameter "actionmovies" from movies.com with the URL http://movies.com/templates/actionmovietemplate. Any time any URL is seen that includes the path http://movies.com/actionmovies, even if the full URL has not been seen before, the proxy server may prefetch the same child URL. Subsequent web transactions including user selections including the paths http://movies.com/actionmovies/movie2 and http://movies.com/action movies/movie100 may confirm or deny the validity of the association. If the child HTTP request always occurs in association with the identified parameter, then the association is confirmed. If the child HTTP request only occurs sporadically with the parameter, additional parameters that impact the child HTTP request may be identified. Additional non-limiting examples of the present innovations are described below.

Various embodiments described herein relate to systems, apparatus, and methods for enhancing prefetch operations by analyzing real user actions with dynamic tracking of web page transactions. While various aspects and descriptive examples embodiments of the invention are discussed above and throughout the present application, the following detailed description illustrates embodiments in further detail to enable one of skill in the art to practice the invention. In the following description, for the purposes of explanation, numerous specific details are set forth in order to provide an understanding of the present invention. It will be apparent, however, to one skilled in the art that the present invention may be practiced without some of these specific details. In other instances, structures and devices that are non-limiting examples of embodiments are shown in block diagram form as illustrations. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Referring now to FIG. 1A, a system 100 for providing network acceleration is illustrated. In one embodiment, user system 102 in FIG. 1 may be client 105 and proxy client 112 in FIG. 1 may be proxy client 110. Client 105 may generate a request for content from content server 130. In one embodiment, content server 130 may be a web server, a file server, a mail server, etc., and the content request may be for a file, a web page, an email message, etc.

Proxy client 110 may be configured to intercept the content request from client 105 and transmit the request over high latency link 115 to proxy server 120 on behalf of client 105. In one embodiment, high latency link 115 may be a satellite link, a cellular link, a wireless link, etc. In one embodiment, the content request may include references to prefetchable content. Accordingly, proxy server 120, while prefetching objects for network acceleration, may utilize the prefetch systems and methods.

In a further embodiment, communications between proxy server 120 and content server 130 over low latency link 125 are sufficiently fast that acceleration is not needed or would not provide sufficient benefit for the cost needed to accelerate. Hence, upon receipt of communications from content server 130, proxy server 120 accelerates the communications between proxy server 120 and proxy client 110 in order to accelerate communications over high latency link 115. The network traffic over high latency link 115 is accelerated while network traffic over low latency link 125 remains relatively unchanged.

Figure 1B:
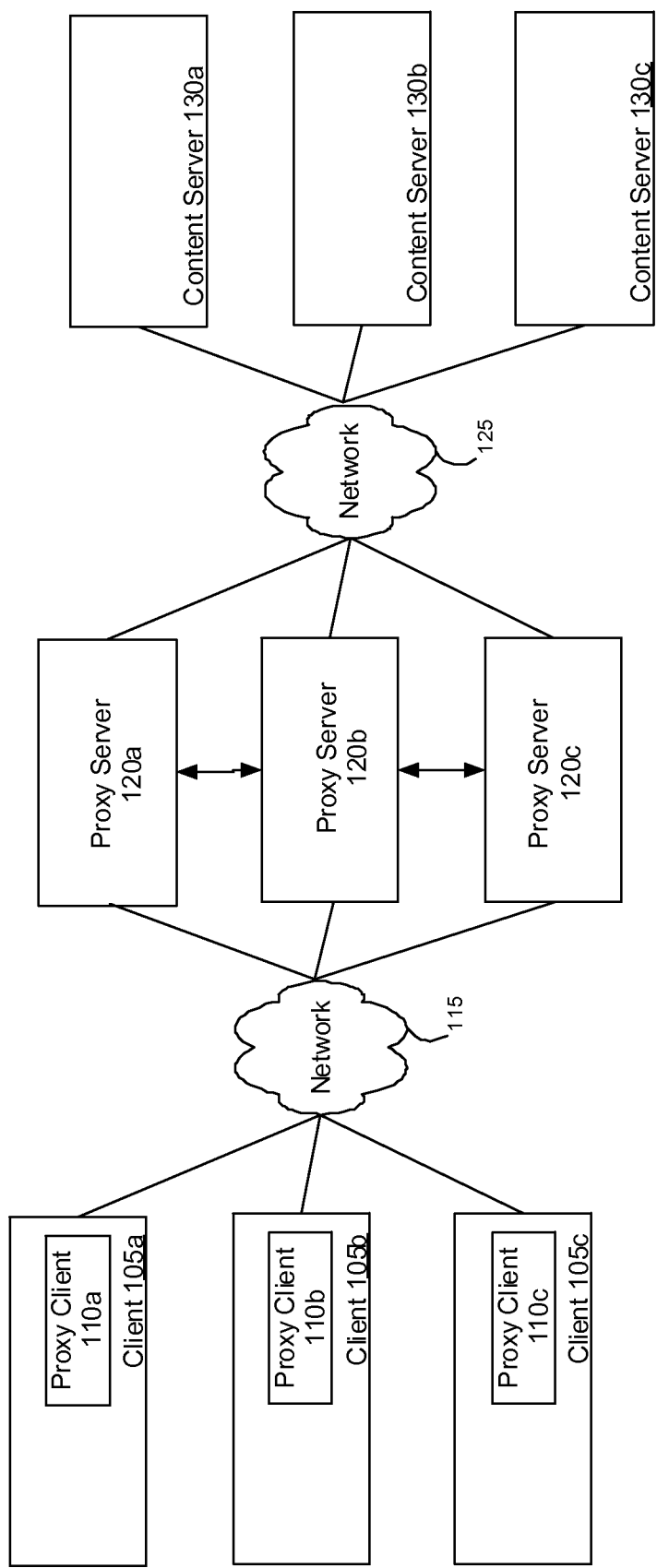
FIG. 1B illustrates a block diagram of one potential implementation of a communications system in accordance with one potential embodiment of the innovations presented herein.

As shown in FIG. 1B, the elements in FIG. 1A may in some embodiments, function in systems with multiple proxy servers. In any of the embodiments described below, a system may include multiple of any component as shown, such as clients 105A-C operating proxy clients 110A-C, respectively, and any client may communicate with any proxy server 120A-C. In certain embodiments, proxy servers may share information, such that web transaction analysis performed on proxy server 120a may be communicated to proxy server 120c, for example, to improve the quality and amount of real user data for each proxy server that may be used to analyze web transactions and improve prefetch decision making. In other alternative embodiments, proxy servers may be organized into groups, such that certain groups share user data, and certain other groups of proxy servers do not share user data. Such sharing may be based on privacy access rights, user groupings, proxy server service provider information, or any other grouping scheme. In further embodiments, a browser plug-in or browser integrated module may perform the functions of a proxy client or proxy server for any function described herein.

Figure 1C:
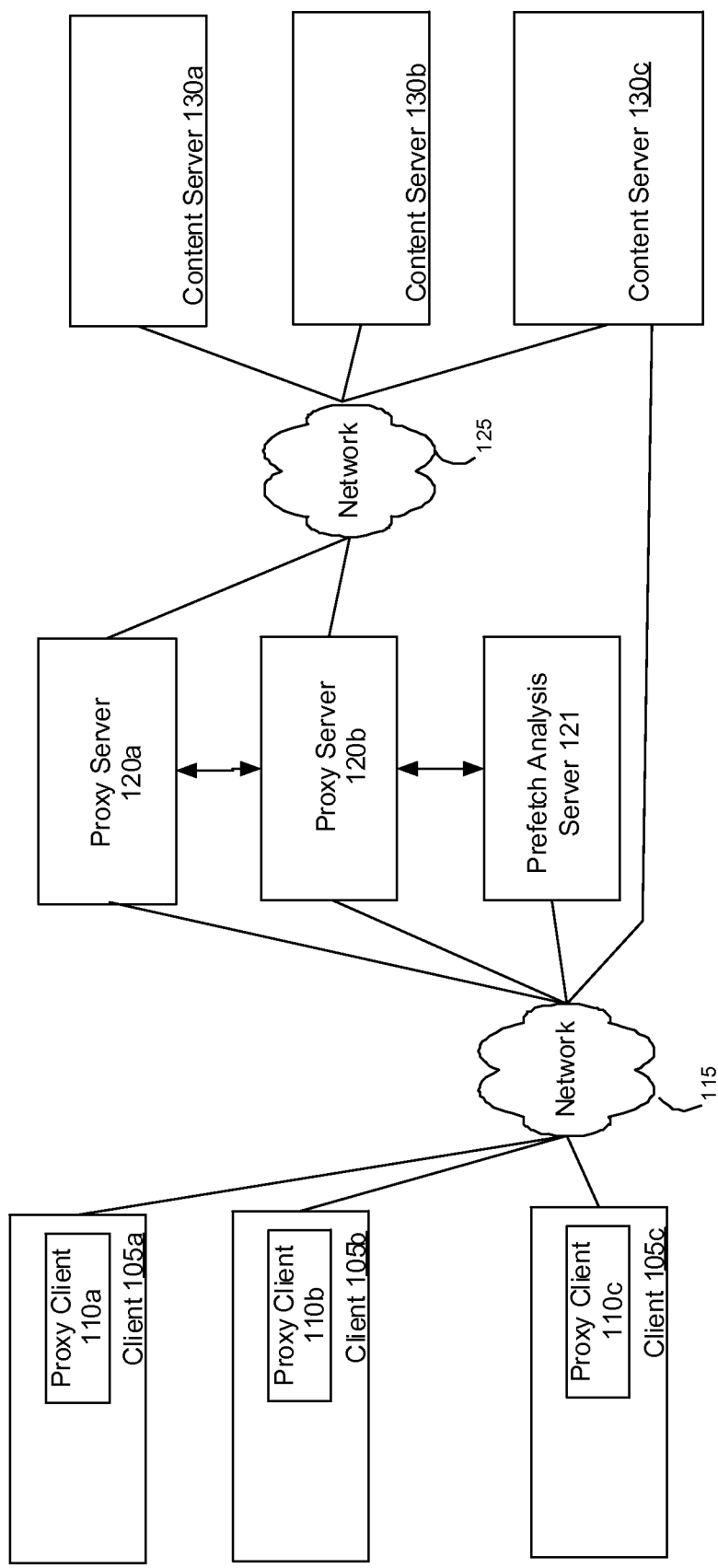
FIG. 1C illustrates a block diagram of one potential implementation of a communications system in accordance with one potential embodiment of the innovations presented herein.

FIG. 1C describes an additional alternative embodiment where user data, web page transaction data, or other data may be analyzed using a separate analysis server. In certain embodiments, a proxy server such as proxy server 120b may collect data and send it to prefetch analysis server 121, and may receive information relevant to prefetching from prefetch analysis server 121 implementing any analysis and improved method for prefetching described below. Prefetch analysis server 121 may, for example, provide proxy server 120b with a list of objects for potential prefetching and a probability of success associated with each object. As the success or failure of associated prefetching is determined, the proxy server may provide information to the prefetch analysis server to update models and probability calculations. This structure may include a single analysis server for a single proxy server, or analysis server for a group of proxy servers.

In a further alternative embodiment, a client such as client 105c may communicate directly with a content server such as content server 130c. In such an embodiment, proxy client 110c may serve in an interception, data collection, and prefetching role. Proxy client 110c may communicate with prefetch analysis server 121 to receive prefetching analysis and assistance with data from multiple clients. Thus, although the embodiments described below are discussed within the context of a proxy server, various embodiments of the invention may function with a proxy client fulfilling the role of the proxy server in observing a web page transaction, and the proxy client may function in conjunction with a prefetch analysis server or prefetch analysis module to perform an improved method of prefetching analysis that enables prefetching of web page objects from content servers.

Figure 1D:
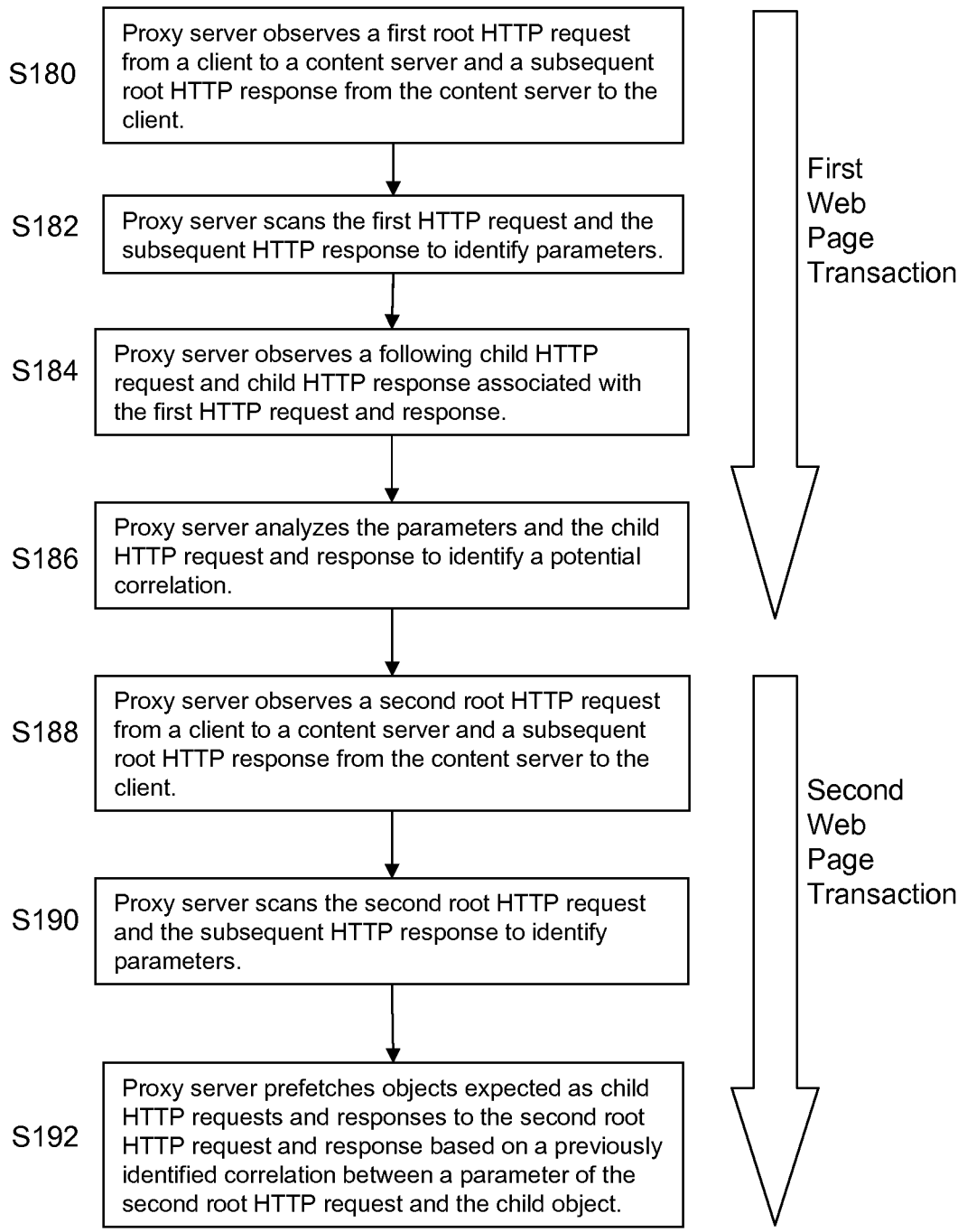
FIG. 1D describes a method for improved prefetching in accordance with one potential implementation of the present innovations.

FIG. 1D, then, shows a basic method of improving prefetching using real user usage data to predict objects in web pages. In step S180, a proxy server such as proxy server 120 of FIG. 1A observes a first root HTTP request from a client to a content server and a subsequent root HTTP response from the content server to the client. In step S182, the proxy server scans the first HTTP request and the subsequent HTTP response to identify parameters. In step S184, the proxy server observes a following child HTTP request and child HTTP response associated with the first HTTP request and response. In step S186, the proxy server analyzes the parameters and the child HTTP request and response to identify a potential correlation.

As noted in FIG. 1D, steps S180 through S186 all involve a first web page transaction that includes root and child portions.

A "root" refers to an initial portion of a web page transaction that is initiated directly by a user selection or action. For example, a user clicking on a web page link initiates a root HTTP request for that link. The root HTTP response is the response directly responding to that root request.

"Child" requests and responses are then follow on requests and responses that result from embedded or calculated references to objects in root objects. The child objects, requests, and responses are always one or more steps removed from the user action by a root that directly responds to the user action.

Continuing the description of FIG. 1D, step S188 describes that a proxy server observes a second root HTTP request from a client to a content server and a subsequent root HTTP response from the content server to the client. In step S190, the proxy server scans the second root HTTP request and the subsequent HTTP response to identify parameters. Finally, in step S192, the proxy server prefetches objects expected as child HTTP requests and responses to the second root HTTP request and response based on a previously identified correlation between a parameter of the second root HTTP request and the child object. Just as steps S180 through S186 described are part of a first web page transaction, steps S188 through S192 are part of a second web page transaction that can use the real user data from the first web page transaction to predict a child object that will be part of a second web page transaction that may be different from the first web page transaction.

Additionally, the method described in FIG. 1D may be carried out by any number of different proxy servers. For example, all steps involving a proxy server related to the first web page transaction may use a first proxy server, such as proxy server 120a from FIG. 1B, while all steps relating to the second web page transaction may use a second proxy server, such as proxy server 120b. The correlation data from the first web page transaction may be shared between proxy servers 120a and 120b, perfecting as part of the second web page transaction at a second proxy server using real user usage data from the first web page transaction and first proxy server. In additional further embodiments, any individual step within or across web page transactions may occur using multiple proxy servers that share information.

Embodiments of the systems described herein can be implemented in a number of ways without departing from the scope of the invention. In some embodiments, as described above, a separate proxy is implemented, such that a proxy server and a proxy client are stand alone devices. For example, a transparent intercept proxy can be used to intercept traffic in a way that is substantially transparent to users at the client-side of the proxy tunnel. In other embodiments, the optimizer is implemented as an in-line optimizer. For example, the client proxy is implemented within a user terminal and the server proxy is implemented within a provider terminal (e.g., a satellite base station or gateway, a cable head-end, a digital subscriber line access multiplexer (DSLAM), etc.). Other configurations are possible in other embodiments. For example, embodiments of the proxy server are implemented in the Internet cloud (e.g., on commercial network leased server space). Embodiments of the proxy client may be implemented within a user's personal computer, within a user's modem, in a physically separate component at the customer premises, etc.

References herein to "intercepting" data should be construed broadly to include any useful slowing, sampling, re-routing, and/or other techniques that allow processing of the data as required according to various embodiments. In some embodiments, traffic passes through the proxy server, where it is "intercepted" by being buffered for analysis and processing. For example, the buffering may be used to slow and accumulate traffic for analysis, as described more fully below. Notably, certain embodiments described as using a component or module to intercept the traffic may actually be implemented by having a different component intercept the traffic, from which web page analysis module may receive the intercepted traffic for processing.

Additionally, while certain embodiments include intercepting as described above, certain other embodiments may function without such intercepting. For example, in one potential non-limiting embodiment, a browser or module within a client may create and send reports detailing use data database without the system requiring redirection or interception of any data. Thus, any embodiment described herein may have associated alternative embodiments without interception or with interception essentially occurring within a web browser or a web browser plug-in.

As used herein, "content servers" is intended broadly to include any source of content in which the users may be interested. For example, a content server 130 may provide website content, television content, file sharing, multimedia serving, voice-over-Internet-protocol (VoIP) handling, and/or any other useful content. It is worth noting that, in some embodiments, the content servers 130 are in direct communication with the proxy servers 120 (e.g., not through the network 125). For example, the proxy server 120 of FIG. 1 may be located in a gateway that includes a content or application server. As such, discussions of embodiments herein with respect to communications with content servers 130 over the network 125 are intended only to be illustrative, and should not be construed as limiting.

In some embodiments, when the client 105 communicates with the content server 130, the proxy server 120 intercepts the communications for one or more purposes. As described below, the proxy server 120 may be part of a server system that includes components for server-side communications (e.g., base stations, gateways, satellite modem termination systems (SMTSs), digital subscriber line access multiplexers (DSLAMs)). The proxy server 120 may act as a transparent and/or intercepting proxy. For example, the proxy client 110 is in communication with the proxy server 120 over a client-server communication link 115, and the proxy server 120 is in communication with the content server 130 over a content network link 125. The proxy server 120 may act as a transparent man-in-the-middle to intercept the data as it passes between the client-server communication link 115 and the content network link 125. Some purposes of the interception may include filtering, caching, parsing, and/or otherwise processing the requests and responses. For example, when the client system 105 requests a web object from a content server 130, the proxy server 120 may intercept and parse the request to implement prefetching and/or other types of functionality in a way that is completely transparent to both the client 105 and the content server 130.

Figure 2A:
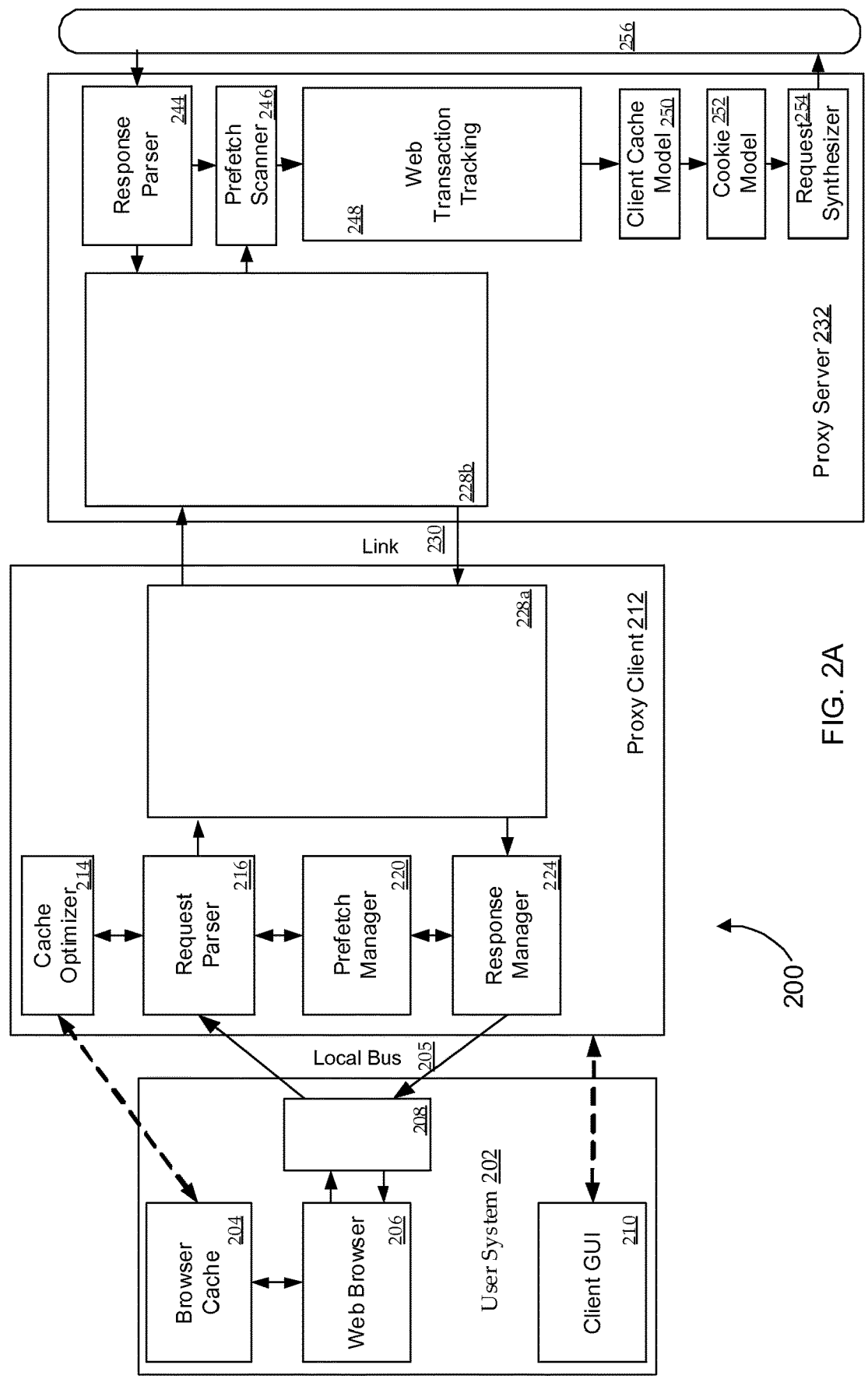
FIGS. 2A, 2B, and 2C illustrate, respectively, a block diagram of one potential implementation of a communications system, an example of an implementation of the user system of the communications system, and an example of a method for improving prefetching that can be performed by the communications system in accordance with various embodiments.
Figure 2B:
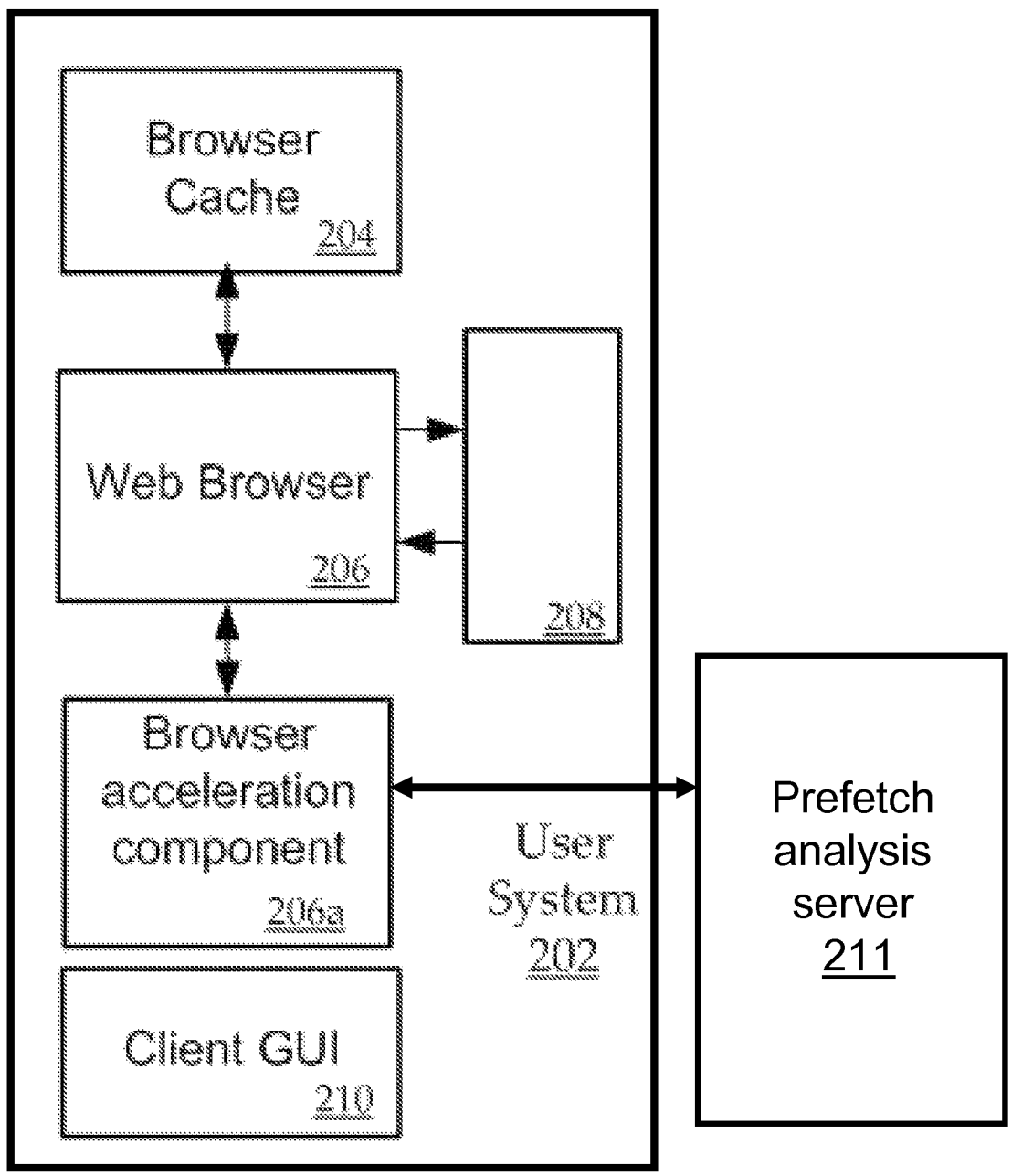

Turning now to FIGS. 2A and 2B, a system 200 that may be used as part of a system for acceleration web content from the Internet to a web browser is illustrated. In one embodiment, the system may include a user system 202, a proxy client 212, and a proxy server 232. The user system 202 may include a client graphical user interface (GUI) 210. Client GUI 210 may allow a user to configure performance aspects of the system 200. For example, the user may adjust the compression parameters and/or algorithms, content filters (e.g., blocks elicit websites), and enable or disable various features used by the system 200. In one embodiment, some of the features may include network diagnostics, error reporting, as well as controlling, for example, prefetch response abort 242. Such control may be adding and/or removing pages (i.e. URLs) to or from whitelist 248 and/or blacklist 249.

FIG. 2B additionally describes a user system 202 that may include a browser acceleration component 206a that may function to analyze web transactions from inside the web browser, and to provide feedback to an analysis system that provides improved prefetching and acceleration for future web page transactions. Prefetch analysis server 211 may, for example, function as an equivalent to prefetch analysis server 121 from FIG. 1, such that the embodiments of FIG. 1 may additionally include feedback to a proxy server or prefetch analysis server from the client in any of the various embodiments described herein.

Figure 2C:
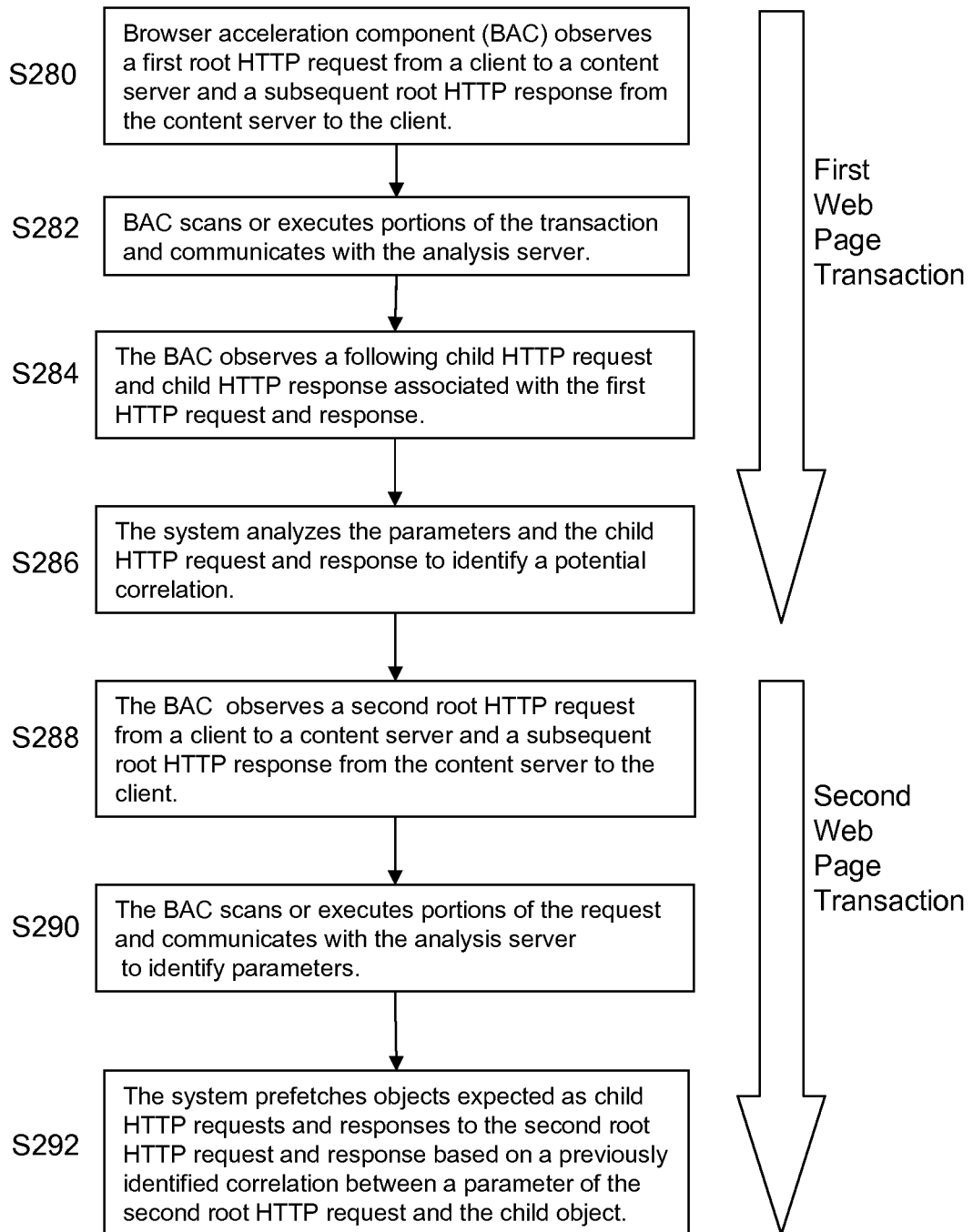

FIG. 2C, then, shows a basic method of improving prefetching using real user usage data to predict objects in web pages. In step S280 browser acceleration component 206a of FIG. 2B observes a first root HTTP request from a client to a content server and a subsequent root HTTP response from the content server to the client. In step S282, browser acceleration component 206a may communicate with a prefetch analysis server to receive hint information or any prefetching assistance. Browser acceleration component 206a may also scan the first HTTP request and the subsequent HTTP response or execute portions of the associated code to identify parameters. In step S184, the proxy server observes a following child HTTP request and child HTTP response associated with the first HTTP request and response. In step S186, the proxy server analyzes the parameters and the child HTTP request and response to identify a potential correlation. In certain embodiments, because the browser acceleration component is directly observing the code of the web page transaction the correlation may be significantly higher than any correlation identified by a proxy server. The correlation is functioning as an error check in such systems rather than a means for inferring the code, since in certain embodiments the browser component has the actual executed code that may be accessed directly.

In one embodiment of the system of FIGS. 2A and 2B, the user selects a universal recourse locator (URL) address which directs web browser 206 (e.g., Internet Explorer®, Firefox®, Netscape Navigator®, etc.) to a website (e.g., cnn.com, google.com, yahoo.com, etc.). In a further embodiment, web browser 206 may check browser cache 204 to determine whether the website associated with the selected URL is located within browser cache 204. If the website is located within browser cache 204, the amount of time the website has been in the cache is checked to determine if the cached website is "fresh" (i.e., new) enough to use. For example, the amount of time that a website may be considered fresh may be 5 minutes; however, other time limits may be used. Consequently, if the website has been cached and the website is considered fresh, then web browser 206 renders the cached page. However, if the website has either not been cached or the cached web page is not fresh, web browser 206 sends a request to the Internet for the website.

In one embodiment, redirector 208 intercepts the request sent from web browser 206. Redirector 208 instead sends the request through a local bus 205 to proxy client 212. In some embodiments, proxy client 212 may be implemented as a software application running on user system 202. In an alternative embodiment, proxy client 212 may be implemented on a separate computer system and is connected to user system 202 via a high speed/low latency link (e.g., a branch office LAN subnet, etc.). In one embodiment, proxy client 212 includes a request parser 216. Request parser 216 may check cache optimizer 214 to determine if a cached copy of the requested website may still be able to be used. Cache optimizer 214 is in communication with browser cache 204 in order to have access to cached websites. Cache optimizer 214 is able to access browser cache 204 without creating a redundant copy of the cached websites, thus requiring less storage space.

According to one embodiment, cache optimizer 214 implements more effective algorithms to determine whether a cached website is fresh. In one embodiment, cache optimizer 214 may implement the cache expiration algorithms from HTTP v1.1 (i.e., RFC 2616), which may not be natively supported in web browser 206. For example, browser cache 204 may inappropriately consider a cached website as too old to use; however, cache optimizer 214 may still be able to use the cached website. More efficient use of cached websites can improve browsing efficiency by reducing the number of Internet accesses.

In one embodiment, if the requested website is not able to be accessed from the cached websites, request parser 216 checks prefetch manager 220 to determine if the requested website has been prefetched. Prefetching a website is when content from the website is accessed, downloaded, and stored before a request to the website is made by web browser 206. Prefetching can potentially save round-trips of data access from user system 202 to the Internet.

In a further embodiment, if the requested website has not been prefetched, then request parser 216 forwards the request to a transmission and protocol module 228. Transmission and protocol module 228a may include a request encoder that encodes the request into a compressed version of the request using one of many possible data compression algorithms. For example, these algorithms may employ a coding dictionary which stores strings so that data from previous web objects can be used to compress data from new pages. Accordingly, where the request for the website is 550 bytes in total, the encoded request may be as small as 50 bytes. This level of compression can save bandwidth on a connection, such as high latency link 230. In one embodiment, high latency link 230 may be a wireless link, a cellular link, a satellite link, a dial-up link, etc.

In one embodiment, transmission and protocol module 228a may include encoding for Intelligent Compression Technology® (ICT) transport protocol (ITP). In other embodiments, other protocols may be used, such as the standard transmission control protocol (TCP). In one embodiment, transmission and protocol module 228 maintains a persistent connection with proxy server 232. The persistent connection between proxy client 212 and proxy server 232 enables system 200 to eliminate the inefficiencies and overhead costs associated with creating a new connection for each request.

In one embodiment, the encoded request is forwarded to transmission and protocol module 228b and is decoded. Transmission and protocol module 228b may use a decoder which is appropriate for the encoding performed by transmission and protocol module 228a. In one embodiment, this process utilizes a coding dictionary in order to translate the encoded request back into a standard format which can be accessed by the destination website.

A request may be sent directly from proxy server 232 to a content server over a network connection such as low latency link 256. Alternately, as part of an analysis of any web transaction, the request may be sent to prefetch scanner 246, web transaction tracking 248, client cache model 250, cookie model 252, and/or request synthesizer 254 for various analysis including to analyze and improve web transactions. For example, if the HTTP request includes a cookie (or other special instructions), such as a "referred by" or type of encoding accepted, information about the cookie or instructions may be stored in a cookie model 252. After or concurrent with the analysis the proxy server 132 may transmit the decoded request to the destination website over a low latency link 256. Low latency link 256 may be, for example, a cable modem connection, a digital subscriber line (DSL) connection, a T1 connection, a fiber optic connection, or another suitable network connection.

In response to the request, a response parser 244 receives a response from the requested website. In one embodiment, this response may include an attachment, such as an image and/or text file. Some types of attachments, such as HTML, XML, CSS, or Java Scripts, may include references to other "in-line" objects that may be needed to render a requested web page. In one embodiment, when response parser 244 detects an attachment type that may contain such references to "in-line" objects, response parser 244 may forward the objects to a prefetch scanner 246.

In one embodiment, prefetch scanner 246 scans the attached file and identifies URLs of in-line objects that may be candidates for prefetching. For example, candidates may be identified by HTML syntax, such as the token "img src=". In addition, objects that may be needed for the web page may also be specified in java scripts that appear within the HTML or CSS page or within a separate java script file. In one embodiment, the identified candidates are added to a candidate list.

In one embodiment, for the candidate URLs, prefetch scanner 246 may notify prefetch response abort 242 of the context in which the object was identified, such as the type of object in which it was found and/or the syntax in which the URL occurred. This information may be used by prefetch response abort 242 to determine the probability that the URL will actually be requested by web browser 206.

According to a further embodiment, the candidate list is forwarded to web transaction tracking 248. Web transaction tracking 248 may be used to track which URLs should be allowed to be prefetched, and may perform parameter correlation for parameters identified in a web transaction that are correlated with child HTTP requests. Web transaction tracking 248 may also include white and blacklists for known errors in prefetching systems that may select an incorrect object for prefetching repetitively. Based on the host (i.e., the server that is supplying the URL), the file type (e.g., application service provider (ASP) files should not be prefetched), etc. Accordingly, a whitelist and blacklist may control prefetching behavior by indicating which URLs on the candidate list should or should not be prefetched. In many instances with certain web pages/file types, prefetching may not work. In addition to ASP files, web pages which include fields or cookies may have problems with prefetching.

In one embodiment, once the candidate list has been passed through whitelist and blacklist, a modified candidate list is generated and then the list is forwarded to a client cache model 250. The client cache model 250 attempts to model which items from the list will be included in browser cache 204. As such, those items are removed from the modified candidate list. Subsequently, the updated modified candidate list is forwarded to a request synthesizer 254 which creates an HTTP request in order to prefetch each item in the updated modified candidate list. The HTTP request header may include cookies and/or other instructions appropriate to the website and/or to web browser 206's preferences using information obtained from cookie model

252. The prefetch HTTP requests may then be transmitted through low latency link 256 to the corresponding website.

In alternative embodiments, objects identified for potential prefetching may be assigned a priority rather than being checked against a whitelist or a blacklist Objects assigned a priority may be sent to a prefetch accumulator as part of transmission and protocol module 228*b*, with the highest currently identified prefetch candidates sent over the network whenever resources are available for prefetching.

When an object is received at response parser 244, response parser 244 may pass the response to prefetch scanner 246 to identify additional child HTTP candidates for prefetching, and may concurrently or subsequently forward the response to transmission and protocol module 228*b* to be transmitted back to the user system 102. A response encoder, in certain embodiments, accesses a coding dictionary in order to encode the prefetched response just as described above for the request. Transmission and protocol module 228*b* may then forward the encoded response over high latency link 230 and then to transmission and protocol module 228*a*, where the response may be decoded and forwarded the response to response manager 224. In one embodiment, if the response is a prefetched response, then response manager 224 creates a prefetch socket to receive the prefetched item as it is downloaded and to manage delivery of the prefetched object when it is later requested in the normal course of the relevant web page transaction.

Response manager 224 transmits the response over local bus 205 to redirector 208. Redirector 208 then forwards the response to web browser 206 which renders the content of the response.

Figure 3A:
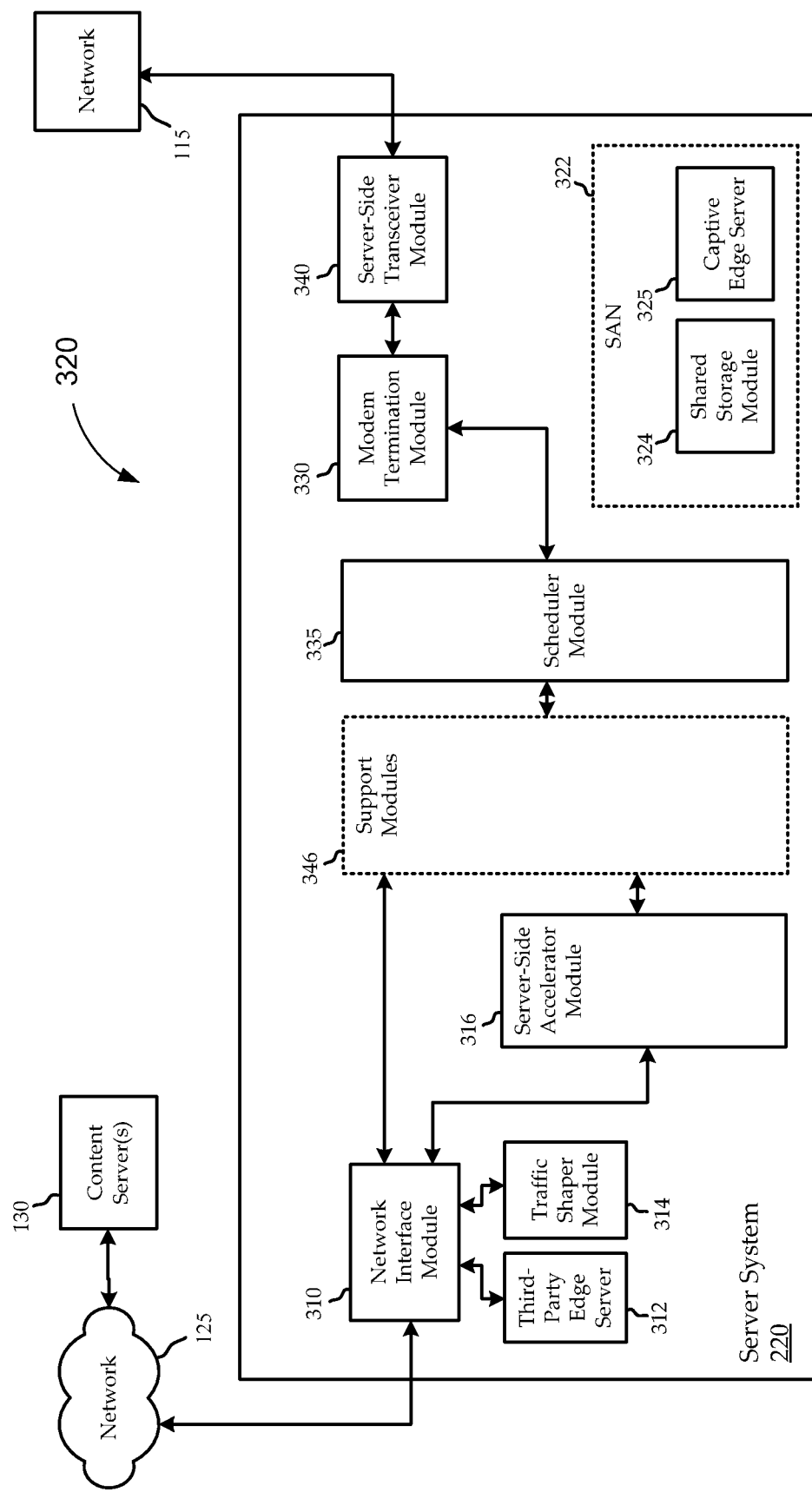
FIG. 3A illustrates a block diagram of one potential implementation of a communications system in accordance with one potential embodiment of the innovations presented herein.

FIG. 3A shows a simplified block diagram 320 illustrating an embodiment of a server system 220 that may be one potential embodiment of a proxy server 120 as shown in FIG. 1, coupled between a network 140 and an antenna 210. The server system 220 has a number of components, including a network interface module 310, a modem termination module 330, and a server-side transceiver module 360. Components of the server system 220 may be implemented, in whole or in part, in hardware. Thus, they may include one or more Application Specific Integrated Circuits (ASICs) adapted to perform a subset of the applicable functions in hardware. Alternatively, the functions may be performed by one or more other processing units (or cores), on one or more integrated circuits (ICs). In other embodiments, other types of integrated circuits may be used (e.g., Structured/Platform ASICs, Field Programmable Gate Arrays (FPGAs), and other Semi-Custom ICs), which may be programmed. Each may also be implemented, in whole or in part, with instructions embodied in a computer-readable medium, formatted to be executed by one or more general or application specific controllers.

Embodiments of the server system 220 receive data from the network 140 (e.g., the network 140 of FIG. 1A), including data originating from one or more content servers 150 (e.g., or other types of servers, as discussed above) and destined for one or more users in a spot beam (e.g., at a user system 110 in a spot beam 235, as shown in FIG. 2). The data is received at the network interface module 310, which includes one or more components for interfacing with the network 140. For example, the network interface module 310 includes a network switch and a router.

In some embodiments, the network interface module 310 interfaces with other modules, including a third-party edge server 312 and/or a traffic shaper module 314. The third-party edge server 312 may be adapted to mirror content (e.g., implementing transparent mirroring, like would be performed in a point of presence ("POP") of a content delivery network ("CDN")) to the server system 220. For example, the third-party edge server 312 may facilitate contractual relationships between content providers and service providers to move content closer to users in a communications network (e.g., the satellite communications network 200 of FIG. 2). The traffic shaper module 314 controls traffic from the network 140 through the server system 220, for example, to help optimize performance of the communications system (e.g., by reducing latency, increasing effective bandwidth, etc.). In one embodiment, the traffic shaper module 314 delays packets in a traffic stream to conform to a predetermined traffic profile.

Traffic is passed from the network interface module 310 to one or more processing modules. In some embodiments, the processing modules include a server-side accelerator module 350, a scheduler module 335, and support modules 346. In some embodiments, all traffic from the network interface module 310 is passed to the server-side accelerator module 350 for handling, as described more fully below. In other embodiments, some or all of the traffic from the server-side accelerator module 350 is passed to the support modules 346. For example, in one embodiment, real-time types of data (e.g., User Datagram Protocol ("UDP") data traffic, like Internet-protocol television ("IPTV") programming) bypass the server-side accelerator module 350, while non-real-time types of data (e.g., Transmission Control Protocol ("TCP") data traffic, like web video) are routed through the server-side accelerator module 350 for processing. In such embodiments, certain types of data may be subject to enhanced prefetching according to aspects of the present innovations, while other types of data may have limited or no prefetching applied to the datastream. All such data streams, however, may share the same network channels using a server such as server system 220. Embodiments of the server-side accelerator module 350 provide various types of application, WAN/LAN, and/or other acceleration functionality.

In some embodiments, the server-side accelerator module 350 is adapted to provide high payload compression. This allows faster transfer of the data and enhances the effective capacity of the network. The server-side accelerator module 350 can also implement protocol-specific methods to reduce the number of round trips needed to complete a transaction, such as by prefetching objects embedded in HTTP pages. In other embodiments, functionality of the server-side accelerator module 350 is closely integrated with the satellite link through other modules, including the support modules 346, the scheduler module 335, the modem termination module 330, etc., to reduce upload bandwidth requirements and/or to more efficiently schedule to the satellite link. For example, the link layer may be used to determine whether packets are successfully delivered, and those packets can be tied more closely with the content they supported through application layer information. In certain embodiments, these and/or other functions of the server-side accelerator module 350 are provided by a server optimizer 230 resident on (e.g., or in communication with) the server-side accelerator module 350.

In some embodiments, the server optimizer 230 is implemented with multiple servers. Each of the multiple servers may be configured to handle a portion of the traffic passing through the server-side accelerator module 350. It is worth noting that functionality of various embodiments described herein use data which, at times, may be processed across multiple servers. As such, one or more server management modules may be provided for processing (e.g., tracking, routing, partitioning, etc.) data across the multiple servers. For example, when one server within the server optimizer 230 receives a request from a user (e.g., from a user system 110 on a spot beam 235, as shown in FIG. 2), the server management module may process that request in the context of other requests received at other servers in the server optimizer 230. In one embodiment, coordination between servers is implemented in support of singular storage of data. For example, it may be desirable to avoid caching the same byte sequence twice in two servers that are in communication with each other (e.g., where both servers are part of a storage area network 322 ("SAN") in the server system 220).

It will be appreciated that, while the server optimizer 230 is illustrated as part of the server system 220, this should not be construed as limiting the location or implementation of the server optimizer 230. In one embodiment, the server optimizer 230 is implemented by a server in communication with the server system 220 over the network 140. For example, a third party may lease server space that is accessible over the Internet or a private connection (e.g., a high-speed fiber connection). The leased server space may be used for serving the server optimizer 230.

Data processed by the server-side accelerator module 350 may pass through the support modules 346 to the scheduler module 335. Embodiments of the support modules 346 include one or more types of modules for supporting the functionality of the modem termination module 330, for example, including a multicaster module, a fair access policy ("FAP") module, and an adaptive coding and modulation ("ACM") module. In certain embodiments, some or all of the support modules 346 include off-the-shelf types of components. An accounting module implements various accounting-related functions. In one embodiment, the accounting module collects data from multiple components to determine how much network usage to attribute to a particular user. For example, the accounting module may determine how to count upload or download traffic against a user's fair access policy (FAP). In another embodiment, the accounting module dynamically adjusts FAPs according to various network link and/or usage conditions. For example, the accounting module may adjust FAPs to encourage network usage during lower traffic times. In yet another embodiment, the accounting module affects the operation of other components of the modem termination module 330 as a function of certain FAP and/or other accounting conditions. For example, the accounting module may direct a multicasting module to multicast certain types of data or to prevent certain users from joining certain multicast streams as a function of FAP or other considerations.

When traffic has been processed by the server-side accelerator module 350 and/or the support modules 346, the traffic is passed to the scheduler module 335. Embodiments of the scheduler module 335 are configured to provide various functions relating to scheduling the links of the communications system handled by the server system 220. For example, the scheduler module 335 may manage link bandwidth by scheduling license grants within a spot beam. A scheduler may also include prefetch scheduling or accumulation to utilize resources to improve end user experience by prefetching objects. A scheduler may include priority ratings for all data, including prefetch data, and schedule data for transmission based on priority ratings.

In some embodiments, functionality of the server system 220 involves communication and interaction with the SAN 322. Embodiments of the SAN 322 include a shared storage module 320, which may include any useful type of memory store for various types of functionality of the server system 220. For example, the shared storage module 320 may include volatile or non-volatile storage, servers, files, queues, etc. In certain embodiments, the SAN 322 further includes a captive edge server 325, which may be in communication with the shared storage module 320. In some embodiments, the captive edge server 325 provides functionality similar to that of the third-party edge server 312, including content mirroring. For example, the captive edge server 325 may facilitate different contractual relationships from those of the third-party edge server 312 (e.g., between the server system 220 provider and various content providers). In certain embodiments, the captive edge server 325 and/or the third-party edge server 312 are in communication with server-side storage (e.g., within the SAN 322).

It will be appreciated that components of the server system 220 may provide many different types of functionality. For example, some embodiments oversee a variety of decoding, interleaving, decryption, and unscrambling techniques. Other embodiments manage functions applicable to the communication of content downstream through a satellite (e.g., the satellite 205 of FIG. 2) to one or more users (e.g., user systems 110 of FIG. 2). As described more fully below with reference to various embodiments, the server system 220 may handle different types of traffic in different ways. For example, some uses of the communications system involve contractual relationships and/or obligations with third-party content providers to interface with their edge servers (e.g., through the third-party edge server 312), while other uses involve locally "re-hosting" certain content (e.g., through the captive edge server 325). Further, some use cases handle real-time types of data (e.g., UDP data) differently from non-real-time types of data (e.g., TCP data). Many other uses are possible.

In certain embodiments, some or all of these downstream communications functions are handled by the server-side transceiver module 360. Embodiments of the server-side transceiver module 360 encode and/or modulate data, using one or more error correction techniques, adaptive encoding techniques, baseband encapsulation, frame creation, etc. (e.g., using various modcodes, lookup tables, etc.). Other functions may also be performed by the server-side transceiver module 360 or other components of the server system 220, including upconverting, amplifying, filtering, tuning, tracking, etc.

Figure 3B:
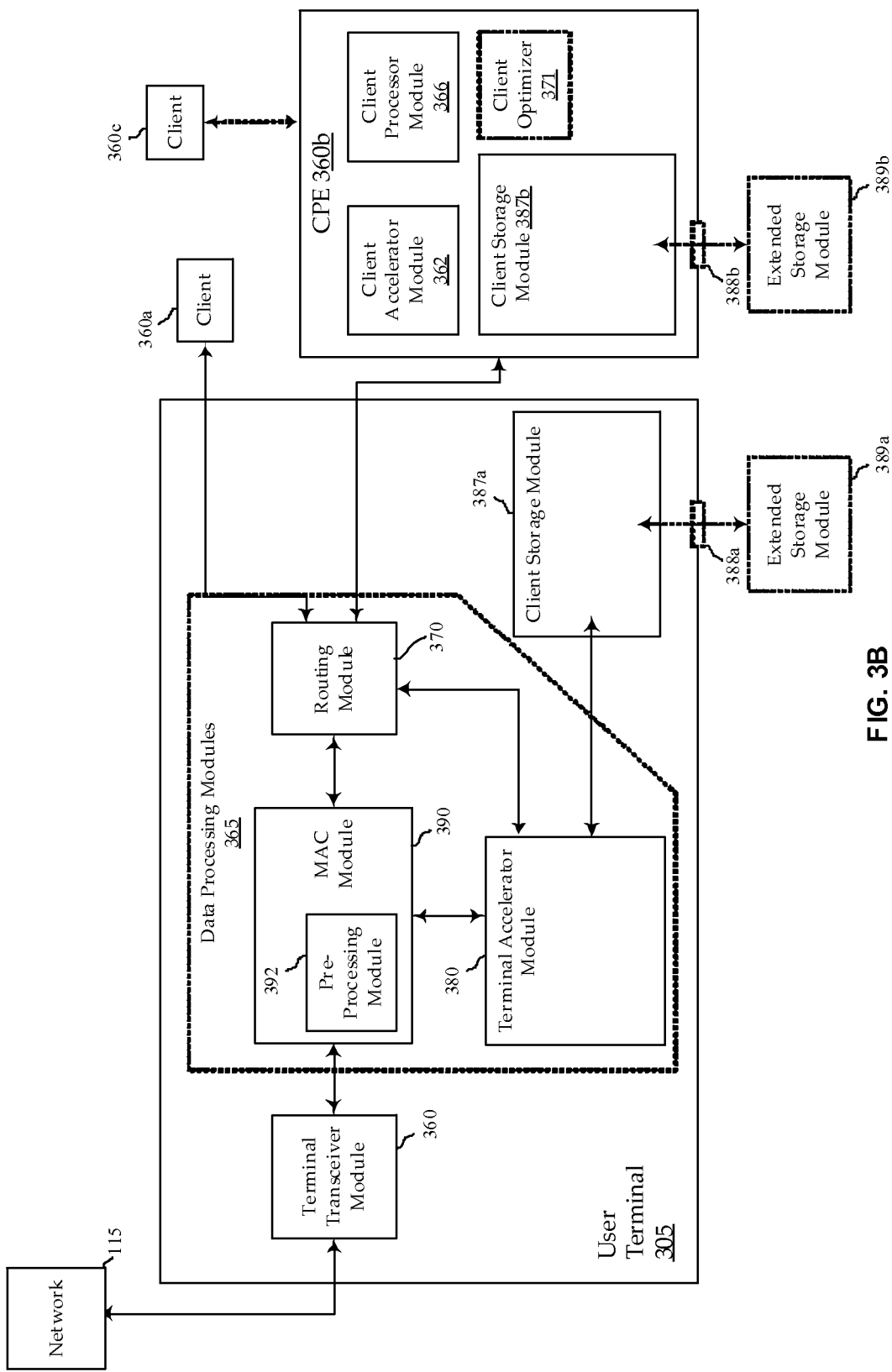
FIG. 3B illustrates a block diagram of one potential implementation of a communications system in accordance with one potential embodiment of the innovations presented herein.

FIG. 3B shows another potential implementation of a client such as client 105 of FIG. 1, in an embodiment where the client includes multiple client devices accessing a network 115 through a user terminal 305. The embodiment of FIG. 3A includes a user terminal 305 coupled between a user antenna 115 and a client 360. Some embodiments are configured to communicate over a satellite communications system by interfacing with a server system over a satellite link (e.g., the server system 220 of FIG. 3A). Alternative embodiments may use links that are partially or entirely terrestrial. Interfacing and other functionality of the user system 110 may be provided by components of the user terminal 305, including a terminal transceiver module 360, data processing modules 365, and a client storage module 387. Embodiments of the data processing modules 365 include a MAC module 390, a terminal accelerator module 380, and a routing module 370.

The components may be implemented, in whole or in part, in hardware. Thus, they may include one or more ASICs adapted to perform a subset of the applicable functions in hardware. Alternatively, the functions may be performed by one or more other processing modules (or cores), on one or more integrated circuits. In other embodiments, other types of integrated circuits may be used (e.g., Structured/Platform ASICs, FPGAs, and other Semi-Custom ICs), which may be programmed. Each may also be implemented, in whole or in part, with instructions embodied in a computer-readable medium, formatted to be executed by one or more general or application specific processors.

A signal from the user antenna 115 is received by the user terminal 305 at the terminal transceiver module 360. Embodiments of the terminal transceiver module 360 may amplify the signal, acquire the carrier, and/or downconvert the signal. In some embodiments, this functionality is performed by other components (either inside or outside the user terminal 305).

In some embodiments, data from the terminal transceiver module 360 (e.g., the downconverted signal) is communicated to the data processing modules 365 for processing. For example, data is communicated to the MAC module 390. Embodiments of the MAC module 390 prepare data for communication to other components of, or in communication with, the user terminal 305, including the terminal accelerator module 380, the routing module 370, and/or the client 360. For example, the MAC module 390 may modulate, encode, filter, decrypt, and/or otherwise process the data to be compatible with the client 360.

In some embodiments, the MAC module 390 includes a pre-processing module 392. The pre-processing module 392 implements certain functionality for optimizing the other components of the data processing modules 365. In some embodiments, the pre-processing module 392 processes the signal received from the terminal transceiver module 360 by interpreting (e.g., and decoding) modulation and/or coding schemes, interpreting multiplexed data streams, filtering the digitized signal, parsing the digitized signal into various types of information (e.g., by extracting the physical layer header), etc. In other embodiments, the pre-processing module 392 pre-filters traffic to determine which data to route directly to the routing module 370, and which data to route through the terminal accelerator module 380 for further processing.

Embodiments of the terminal accelerator module 380 provide substantially the same functionality as the server-side accelerator module 350, including various types of applications, WAN/LAN, and/or other acceleration functionality. In one embodiment, the terminal accelerator module 380 implements functionality of proxy server applications, like interpreting data communicated by the server system 220 using high payload compression, handling various prefetching functions, parsing scripts to interpret requests, etc. In certain embodiments, these and/or other functions of the terminal accelerator module 380 are provided by a client optimizer 220 resident on (e.g., or in communication with) the terminal accelerator module 380. Notably, in some embodiments, the client optimizer 220 is implemented as client optimizer on the user terminal 305 and/or client optimizer 371 on the client 360b. Data from the MAC module 390 and/or the terminal accelerator module 380 may then be routed to one or more CPEs 360 by the routing module 370.

In some embodiments, output from the data processing modules 365 and/or the terminal accelerator module 380 is stored in the client storage module 387a. Further, the data processing modules 365 and/or the terminal accelerator module 380 may be configured to determine what data should be stored in the client storage module 387a and which data should not (e.g., which data should be passed to the client 360). It will be appreciated that the client storage module 387a may include any useful type of memory store for various types of functionality of the user system 110. For example, the client storage module 387a may include volatile or non-volatile storage, servers, files, queues, etc.

In certain embodiments, storage functionality and/or capacity is shared between an integrated (e.g., on-board) client storage module 387a and an extended (e.g., off-board) storage module 389a. For example, the extended storage module 389a may be implemented in various ways, including as an attached peripheral device (e.g., a thumb drive, USB hard drive, etc.), a wireless peripheral device (e.g., a wireless hard drive), a networked peripheral device (e.g., a networked server), etc. In some embodiments, the user terminal 305 interfaces with the extended storage module 389a through one or more ports 388a. In one embodiment, functionality of the client storage module 387 is implemented as storage integrated into or in communication with client 360 (e.g., as client storage module 387b in client 360b).

Some embodiments of the client 360 are standard client 360 devices or systems with no specifically tailored hardware or software (e.g., shown as client 360a). Other embodiments of the client 360, however, include hardware and/or software modules adapted to optimize or enhance integration of the client 360 with the user terminal 305 (e.g., shown as alternate client 360b). For example, the alternate client 360b is shown to include a client accelerator module 462, a client processor module 466, and a client storage module 387b. Embodiments of the client accelerator module 462 are configured to implement the same, similar, or complementary functionality as the terminal accelerator module 380. For example, the client accelerator module 462 may be a software client version of the terminal accelerator module 380. In some embodiments, some or all of the functionality of the data processing modules 365 is implemented by the client accelerator module 462 and/or the client processor module 466. In these embodiments, it may be possible to reduce the complexity of the user terminal 305 by shifting functionality to the alternate client 360b.

Embodiments of the client storage module 387b may include any type of object or byte caching, data serving, and/or other storage-related components in or in communication with the alternate client 360b. In some embodiments, the client storage module 387b is in communication with an extended storage module 389b, for example, via one or more ports 388b. Of course, many types of client 360 are possible, and the functionality of the client 360 may be implemented in a number of different types of devices or systems. In some embodiments, the client 360 is a fixed or mobile end device for displaying content to the user, like a television, personal computer, home theater system, cellular telephone, portable music or video player, personal digital assistant, etc. In other embodiments, the client 360 is an intermediate device, configured to communicate to another client 360 end device (or even to another client 360 intermediate device). For example, the client 360 may include a set-top box, a home networking component (e.g., a router, a hub, a femtocell, etc.), or any other type of intermediate device. As shown, client 360c is in communication with the user terminal 305 indirectly through client 360b, where client 360b is acting as an intermediate device.

Further, in some embodiments, the client 360 is integrated, partially or completely, with the user terminal 305. For example, a home theater system may be built around a main interface component that includes a network interface having user terminal 305 functionality, certain client 360 functionality, and ports for wired or wireless communication with additional client 360 devices. Embodiments of user terminals 305 and/or CPEs 360 may also be configured for compatibility with certain communication standards. For example, CPEs 360 may be configured to support plug-and-play functionality (e.g., through the Digital Living Network Alliance (DLNA) standard), wireless networking (e.g., through the 802.11 standard), etc.

Figure 4:
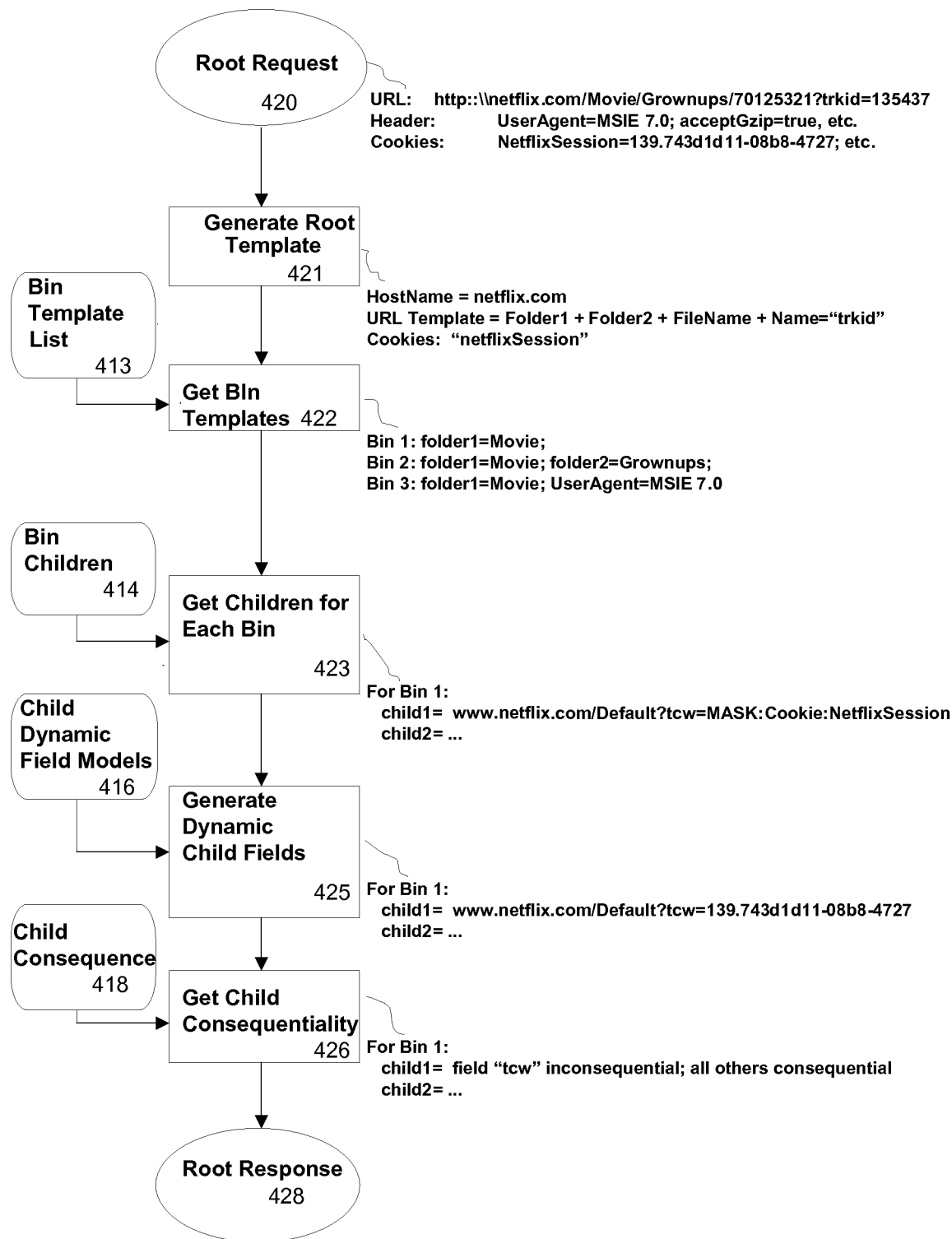
FIG. 4 describes a method for improved prefetching in accordance with one potential implementation of the present innovations.

FIG. 4 is a chart of how one potential implementation of a system may identify parameters and correlations between parameters and child objects according to an aspect of the innovations presented herein. While FIG. 4 presents one potential example using netflix.com™, many additional permutations will be possible given the described system, and the methods are not particular to any given host or structure created underlying a particular host.

In 420 of FIG. 4, an HTTP root request may be observed by a proxy server. The following step 421 is to create a root template from this data. A parser may tokenizes root HTTP request data into a series of key/value pairs. The root template may comprise a hostname and the keys for each of these pairs. Each unique root template may have a series of Bins, which are found in step 422. A Bin is defined by a set of values for some of the fields. In the example of FIG. 4, one Bin contains all the child URLs for this root template that would be downloaded anytime Folder1 has the value "Movies", which would be requested regardless of which movie might be selected. Another bin might cover the URLs specific to the movie 'Grownups', and other URLs that are only loaded when IE is downloading any movie page for the specific host.

Each Bin contains a list of child URLs 423 and the probabilities of their being requested, which control prefetch operations in a proxy server. These child URLs may include dynamic elements such as session IDs, user IDs, tracking information, and random values. Dynamic fields are represented by a mask value. The next step is to fill in the values for these fields at 425 with the values to use for this download. The Child Origin model 416 specifies how to get the values for these dynamic fields. In the example in FIG. 4, it might say that the value for the key "tcw=" can be obtained from the value of the cookie with the name "NetflixSession". In other cases, it might specify a value should be synthesized from the current time stamp or a value that would have been set in a previous download.

A special case occurs if a field is known to vary for each download, but not in a way that can be anticipated. If the field is download consequential, then there is no point in prefetching this URL: the prefetch URL will never match the browser request, and the mismatched response can not be used. In this case, the child URL may be left in the list with special marking so that it can be used to prevent the app requests from being added to the unrecognized model.

The final step is to determine the download consequentiality 426 of each fields in each child URL. If a field is download inconsequential, it does not affect the response that will be delivered. The ClientSideProxy can send the prefetched response to the browser if the browser request differs from the prefetched response only by inconsequential fields.

Figure 5:
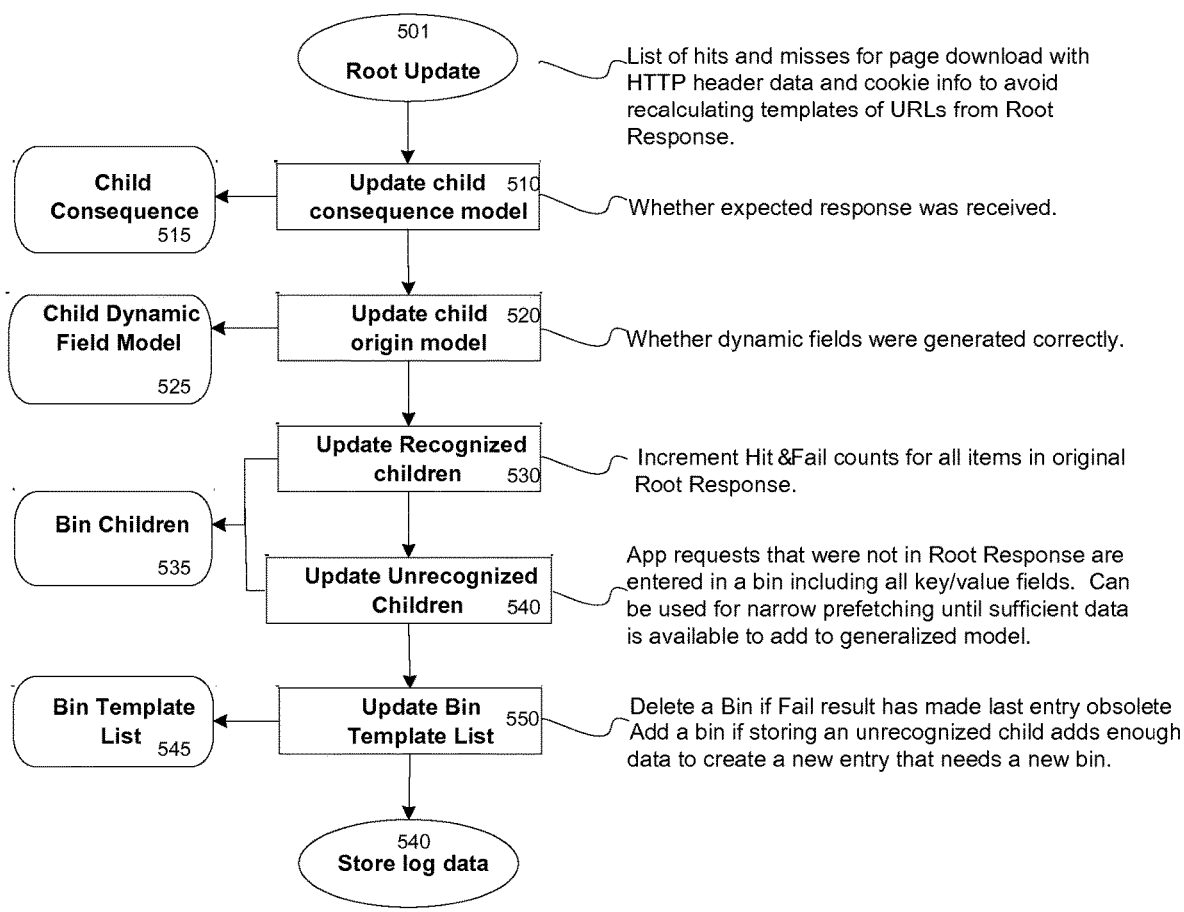
FIG. 5 describes a method for improved prefetching in accordance with one potential implementation of the present innovations.

FIG. 5 shows how a URL models may be updated in one potential embodiment that may work in conjunction with the embodiment described in FIG. 5 when a download is completed and a tracker module updates root template with a report for child objects of the root including details of the hits (indicating an object was prefetched and used), misses (indicating an object was requested in response to the root but not prefetched), and fails (where an object was prefetched, not requested in response to the root). A report as part of step 501 may also include HTTP header data and cookie information. To save CPU cycles, the templates for the root and child that are calculated when the Root Request was processed by the proxy server can be included in the report data. This hit, miss, and fail data may then be used to identify future parameters and correlations when selecting objects to prefetch in a web page transaction. For example, the system may have a percentage threshold above which a correlation is established. Alternatively, a prefetching score may be impacting by hit, miss, and fail percentages, such that a correlation based on the hit, miss, and fail data impacts the priority an object is given in a prefetch accumulator that utilized system resources for prefetching when the resources are available.

The child consequence model in step 510 checks whether the response to each child URL follows the model of field consequentiality as described above for FIG. 5. If a model already exists, the result can confirm or contradict the model. If the model is still being formulated, the new data can be added to the database. This may occur when the system decides, for reliability or other purposes, that a correlation has not yet sufficiently been established for an identified parameter.

The child origin model in step 520 checks whether the dynamic fields in each child were populated correctly. For a hit, all models can be affirmed. For a fail, the misses should be checked to see if a miss was due to an error in synthesizing a dynamic field. If so, the entry was handled correctly by the bin children and can effectively be considered a hit, but the child origin model failed for that field and it may need to be adjusted. For a miss, the new data can be added to the URL model for this child URL.

Recognized URLs will either be hits or fails, so the appropriate bin children model for each URL may be updated at step 530. A hit may increase the probability for that URL in the model, while a fail will decrease the probability of that entry.

A miss is usually an unrecognized URL, i.e., one that is not yet part of the model. Until adequate information is available, the behavior of the system may treat this information as follows: (1) the child URL is added to a bin that is defined by all values in the URL, the model applying only to exact copies of the root URL; (2) all fields in the child URL are assumed to be static, and for the next download, the old values will be re-used; and (3) all fields in the child URL are assumed to be consequential such that the prefetched response can only be supplied if there is an exact match with the browser request URL. Each of these behaviors may be controlled individually. A child consequence model may be available from other domains, proxy servers, templates, or bins, so that it can be used before a good bin model is available. Conversely, a child URL can be added to a bin before sufficient data is available about its consequentiality. Additional details describing how models are created are discussed further below.

A miss can also be a recognized URL with a consequential but unsynthesizable dynamic field as discussed above. In that case, the bin model is affirmed, but the miss URL is not added to any new list as there is no point in prefetching this URL in the future.

The updating of the models can cause a bin to be added or deleted at step 550. A new child URL may require creating a new bin defined by all the values. When enough data is available about the child, the child might be moved to a new bin that is defined by only a subset of the fields, such as the bin "Folder1='Movie'" in the example of FIG.

5. When all entries in a bin have failed or are inactive too long, the bin or even the entire template can be removed.

Additional details will now be discussed for one potential implementation of template matching that may be used to identify parameters and correlations between parameters and objects when a proxy server or web browser observes a web transaction. The following system may be used with the systems described in FIGS. 1D, 4, and 5 discussed above.

For the purposes of this description, a template is a sequence of fields specific to a domain and then defined by the path components and query keys in the URL. This system for URL modeling may create independent models for each unique template. This may simplify the analysis that has to be done to create the rules for predicting the children of a root URL or predicting the response of a child URL. An additional analysis in various alternative embodiments that is not restricted to template matches may discover other useful patterns to make these predictions. In certain embodiments, the extra analysis at the cost of system processing resources may have value, but in other embodiments, but this addition may not justify the extra processing complexity. In certain embodiments, the number of templates needs to be small relative to the number of sample URLs. If a web application involved with a particular web page transaction or set of web page transactions uses a large number of templates, then the restriction to evaluating within template matches may reduce the number of samples so that the predictions are less reliable for speculative prefetching.

One potential tokenization scheme according to one non-limiting embodiment of the present innovations follows the standard RFC1738. The protocol, hostname, path components, and query arguments are extracted from the URL. Each host name may be evaluated independently. The path components may be assigned keys based on their position: folder1, folder2, . . . folderN, ending with the filename including any extension.

The next step is to identify key value pairs. The standard tokenization uses '&', ';' or '\' to separate the key/value pairs and uses a '=' to separate the key and value, such as:
http://ad.doubleclick.net/adj/lj.homepage/loggedout;a=1; r=0;w=0;c=se;pt=se;sz=236×90;pos=t;tile=2
http://ar.voicefive.com/bmx3/
broker.pli?pid=p68422230&PRAd=1858468&AR_C=3970715
http://r1.ace.advertising.com/site=690966/size=728090/ u=2/hr=13/hl=0/c=2/scres=5/tile=1/f=2/r=1

In alternative embodiments, the system may analyze information from one or more URLs associated with a given host to find alternative or non-standard tokenization schemes to identify key/value pairs for that host.

The key for each key\value pair is considered part of the template, so that
HostName|Folder1|Folder2|Filename|size= . . . |tile= . . .
is a different template from
HostName|Folder1|Folder2|Filename|size= . . . |hr= . . .
where "size", "tile", and "hr" are all key names. However, for folders, the key is just Folder1 or Folder2 and the actual name in the field may be considered a value and not part of the template. This is because web applications sometimes use the "folders" in the path as query values. For similar reasons, FileName may also be used as the key for that field and the string in that field will be considered as the value and not as part of the template.

This embodiment of a template matching method may creates a template key, such as a uint64 key, describing the template for a URL. The template keys can then be used to look up the models and data when processing a new URL for a known host. URLs for each host name are processed independently. In a distributed global processing system, the hash of the hostname can be used to select the server to process a URL when multiple proxy servers are configured to share information as described above. Such an embodiment has the benefit of enabling parallel processing without duplicating resources, since the hash sorting enables each server to operate using a specific subset of data traffic.

In one potential embodiment described below, the system requires all fields to be present, but does not require named fields to be in order. In other alternative embodiments, various fields may be absent, or the system may require fields to be named in order. In the embodiment where all fields are present but not in order, the URLs:
http://ad.doubleclick.net/adj/2014;a=1;r=0
and
http://ad.doubleclick.net/adj/2122; r=11;a=97
have the same template, but these would be different because number of fields has changed:
http://ad.doubleclick.net/adj/2014;a=1;r=0
http://ad.doubleclick.net/2014;a=1;r=0.

The order-independence for query keys can be achieved by sorting the query keys before creating the template key, or by using an algorithm for generating the template key that has the transitive property.

One potential embodiment may involve requiring all fields to be present. This simplifies the processing, but may miss many common cases not missed by other potential embodiments where all fields are not required to be present. Child URLs may be assembled by the browser by scripts that only add key/value pairs when a particular value such as a cookie is present. A long query with many pairs may differ only because an insignificant field is omitted. This may require two independent analyses to be run, where each operates with only part of the samples. Further alternative embodiments may examine the templates for each host and look for templates that should be combined. A translation table may then convert the template keys that should be modeled together into a common key for combined templates.

The child URLs that may be requested when a root page is downloaded may depend on values provided in the HTTP header other than the URL. Adding key/value fields into the template for the header data incorporates this data into the models. One of the most influential HTTP fields is the UserAgent, as web sites often supply different content to different agents. Other directives such as HTTP version, encodings accepted, etc. can also affect the child URLs that need to be prefetched. In certain embodiments, such standard directives may be excluded; however, other embodiments may deal with such standard directives by including them as default fields with every template. In such embodiments, if the directive is not included in the HTTP header, its value may be entered into the template as NULL. The same techniques used to correlate child requests with other template fields may then be used to deal with the directives.

Cookies may be complex header fields, which can also affect the child URLs that are ultimately requested as part of the web page transaction. Cookies therefore may have an influence on parameters and object correlations in a prefetching system according to the present innovations. Creating individual key/value pairs for each cookie name/value pair in the request may function in one potential embodiment to provide a straightforward means of the analysis of correlations between specific cookies and the URLs which are subsequently requested. However, since the storage and attachment of cookies can inconsistent, creating different templates for each combination of cookies would fragment the templates: and a large number of templates for each URL may result. Therefore, in one potential embodiment, the system may create implied fields for all cookies names ever associated with the template. If a new cookie name appears in a request, it is added to this list. Requests that do not include this cookie in such embodiments may have a value of NULL for the appropriate key.

In one additional embodiment, a structure may be created to deal with a relationship between cookies and folders. The standardized HTTP specification provides rules that can associate cookies with folders, so that different cookies can be placed in different folders. Such an embodiment may include a template structure that treats folder names as values, so that different folder names are part of the same template. All cookies in such an embodiment will appear in a single template. This will not impact the ability of the system to determine the children to prefetch: if a folder name is significant, its value will control the selection of children.

According to certain non-limiting embodiments of the present innovations, the identification of child URLs to prefetch for a URL template may be based on bins as described above. A bin may be defined by a set of specific values for some of the fields in the URL template. For each bin, a set of children may be defined that will be prefetched when a URL matching the bin value is encountered. The probability of individual children being requested in such an embodiment may be a function of whether they were requested for root pages matching this bin's values. These probabilities may then be adjusted such that probabilities increase for hits and decrease for fails, as described above. In various alternative embodiments, multiple other parameters and system resource considerations may be included in prefetch decision-making processes.

When a new child URL is encountered, it may be assigned by default to a bin that includes all fields in the model where the bin values are those of the root URL instance responsible for the download. As the same child URL is seen again, it may be moved to a bin defined by only a subset of the fields. This generalization process allows children to be prefetched for root URLs that have never been seen before, but where some of the fields match bin templates that are known to result in successfully prefetched items. In certain embodiments, child URLs in the bin list may be masked to remove dynamic elements, and then the masked values are replaced with values specific to a particular download of the root. This may enable the system to calculate dynamic values, in certain instances, so that objects associated with the dynamic values may be prefetched. In other embodiments, dynamic values may simply be associated with objects that are not prefetchable, and the system may account for this by identifying expected objects that are not prefetchable.

Figure 6:
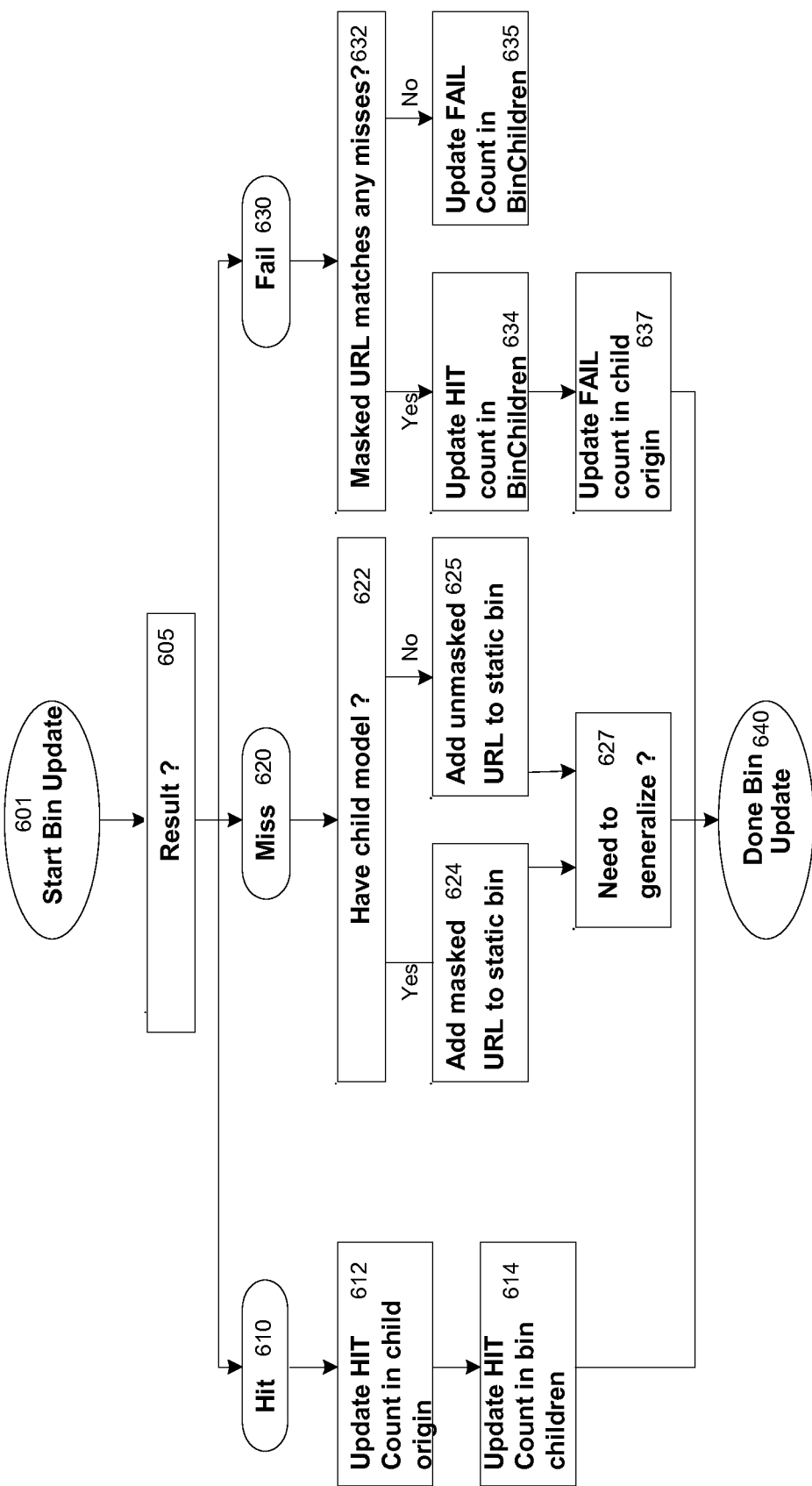
FIG. 6 describes a method for improved prefetching in accordance with one potential implementation of the present innovations.

FIG. 6, then, provides an overview of how the bin models are created and updated. The processing of each child depends on an identified result in step 605 of whether it was a hit, fail, or miss as reported by a proxy server at the conclusion of a web page transaction If the child is identified as a hit in step 610, an associated hit count in the child origin model may be incremented in step 612. Then its hit count in the bin entry is incremented. The location of the bin entry may be supplied in the report from a proxy server, which receives this value when the root request model was generated as discussed above. As a result of this increase in the hit count, the prefetch probability for this child will usually be increased the next time a root matching this bin template is encountered.

A system according to the present invention may encounter dynamic URLs, where a child URL changes for each download. Certain embodiments may attempt to predict the dynamic portion of an anticipated child URL. Such attempts to prefetch URLs by predicting the dynamic portion may be incorporated into a child origin model that creates dynamic fields and places them in masked values in a child template as described below.

If the child was identified as associated with a fail in step 630, the missed children from the download are checked to see if any matches the child template that failed. If so, this indicates that the correct masked URL was prefetched, so the hit count can be incremented at step 634 in the same way as for a hit. A problem, however, may be identified in that the masked values were not correctly replaced by dynamic data, so a fail will be recorded in step 637 in the child origin model which was used to fill in the dynamic fields. When a dynamic field must be generated by the child origin model, the probability of the URL being requested is multiplied by the probability that the origin model has used the correct value, so the overall impact of this fail will be a reduction in the prefetch probability for this child in future downloads. If none of the missed items matched the template of the failed URL, then the bin model was incorrect and the fail count is incremented at step 635. This will also decrease the prefetch probability for that child in subsequent downloads.

In step 620 a miss may be identified for a child URL that was requested by an application or user as part of the web page transaction, but not prefetched. The same special case of errors in filling in the dynamic fields discussed above may also apply to this step. Otherwise, this URL may be treated as a new entry with new associated templates created. A model may have already been generated for the URL template of the child based on its use as a child in other bins, other templates, or other domains. If so, the masked URL will be entered into the model at step 624. When a new entry is added to the model, it may be placed into a default bin, which may be the most specific bin possible such that all fields in a subsequent download have the same values.

In certain embodiments, if no child model exists, the URL can be added in step 625 to the same default bin as above, but a backpointer may be kept to this entry in case a model for this child URL is subsequently developed. When that occurs, all instances of the unmasked child in all bins can be replaced with the masked value, which will allow the dynamic fields of the child URL to be synthesized correctly.

In alternate embodiments, additional generalization analysis may be done at the first identification of the new entry to identify subsequent downloads that may be generalized to the new object. When a new instance of this child URL is added to the default bin, the bin may be checked for previous instances of this child URL to see if any generalizations are possible. "Generalization" therefore as discussed here refers to using a bin that does not care about one or more of the values in the root URL fields. For example, the value of an ID in the root URL may have no impact on the children that will be requested. If generalization is possible, the child URL will be moved from the default bin to the more general one, so that the child will be requested for any root URL that has the values in the bin template. Greater details on how this generalization can be implemented in real time in certain embodiments [[is discussed below.

In certain embodiments, the goal of generalization is to identify a subset of fields in the root URL that are responsible for a particular child being requested. In addition to identifying a bin, this may also involve a need to determine the probability of that child being requested when a root matching that bin template is downloaded.

In certain embodiments, such a match may be developed over time based on a statistical correlation from observing hits, misses, and fails for a bin template. In alternative embodiments children may be moved from the default bin to generalized bins on a small amount of information. If the bin selection was too aggressive or generalized to quickly, the child will quickly encounter failures and be removed from the bin. In such circumstances an adjustment may be made to the object model to prevent repetition of the mistake. If the child is subsequently requested, it will start back in the default bin and a new attempt may be made to generalize upon it. In various embodiments, if the bin selection is too conservative, other instances of the URL will arrive as misses in response to template values that were excluded from the conservative bin. These new missed entries will be added to the default bin and a new attempt at generalization will be attempted. This attempt will have information about the other bin entries for this child, and may add the entry to a new bin that is a superset of the old. Selection on how quickly to move objects to generalized bins may therefore be based on available resources and system structures, and the costs associated with prefetching objects that are not subsequently used. If system resources are limited and costs are high, the system may generalize more slowly to conserve resources.

Figure 7:
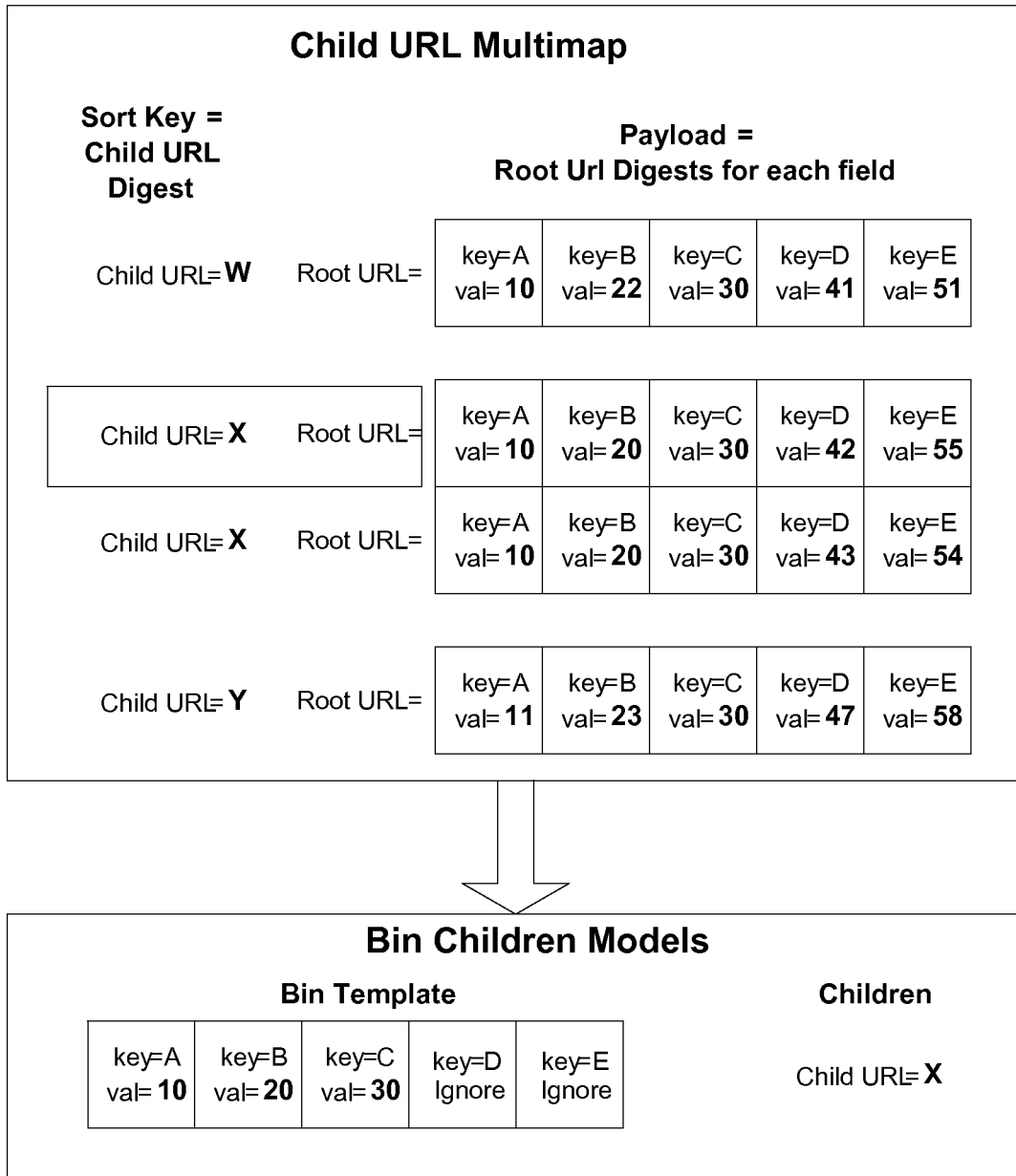
FIG. 7 describes a method for improved prefetching in accordance with one potential implementation of the present innovations.

FIG. 7 illustrates one potential view of how a multimap can be used to add a child URL to a bin. The child URL multimap of FIG. 7 is a digest of the child URL that was reported as a miss by a proxy server. The multimap is presented here for illustrative purposes to provide a clear explanation of one potential embodiment of a bin structure, and should not be interpreted as limiting. The payload structure described in this embodiment includes the values for each of the fields. All entries have the same number of fields, as they are all generated from the same root template as described above. For fast calculation, integer digests of the field values can be used instead of strings. When the highlighted new entry arrives with key value=X, it may be discovered that a previous entry exists, and the roots responsible for the entries have the same values for fields A, B, and C.

Such a pair wise method may try to generalize from this single pair of roots by assuming that only consequential fields are the ones in common, so this child URL may be added to a bin defined by this set of values for A, B, & C. This child URL will be prefetched from any subsequent root matching these three values, regardless of the values of the inconsequential fields D & E for this type of embodiment.

A bin count may describe how many requests for this bin have occurred since time T. As described above with respect to FIG. 7, a bin counts can report how many entries have been received for the bin including those values of A, B, C since the earliest child with URL value=X was received. In FIG. 7, there are two roots that requested this child X. If these were the only entries in the bin ABC, then the generalization is acceptable, and a prefetch of child X would have a hit rate of 100%. Alternatively, if there were 100 roots reported with entries matching ABC during that time, then a hit rate for this model would be only 2%. This hit rate for children within a bin map closely hews to the probability value returned to the prefetcher for a child. The actual probability will be lower than the hit rate. There may have been 100% hits in the past, but the item might not be requested by the browser or may no longer be part of the page, or the web page may change.

In certain embodiments, then, a bin count may be implemented using a circular buffer containing timestamps when the root was requested. A sorted list can be used to find how many entries have been received since any arbitrary time T.

In additional embodiments, a bin count may also or alternatively be tracked once a bin is created. In the example of FIG. 7 again, the combination of ABC values for the bin may already have been used for other child URLs, so there may be a count for the bin that can be used to test whether to add child X to that bin. If this is a new bin, then it will not be possible to know the hit rate in advance, but the system may start using the model and then respond to the success rate that is actually achieved.

Various embodiments of the present innovations may deal with low hit rates in different ways. In one potential embodiment, a low hit rate may have two causes. The first is when the bin model with the low hit rate failed to include a consequential field. A field may be assumed to be inconsequential when it had multiple values in the instances where the child URL was requested, but it is also possible that several values in that field will produce that child URL, but other values will cause a different child to be requested. In the example of FIG. 7, it is possible that a value in field D of either 42 or 43 will cause child X to be prefetched, but any other value will not. In such a case, the correct solution would be to define 2 bins that have the common ABC, but different required values for D. In this case, the hit rate may be boosted by improving our model as described above.

In addition to the above described low hit rate cause in the embodiment being discussed, a low hit rate can also be caused by randomly varying content. For example, the web server or content server may have 50 ads on a carousel, and randomly picks one each time each time it sees a root request matching those values for ABC. The ABC bin is the optimum model for such a situation, but the hit rate will never be better than 2%.

If the low hit rate is detected by the bin counts before child X is added to the bin, one potential embodiment can delay adding child X to the bin until we have more samples. If in the example, D was consequential and 42 was a value that triggered child X, the multimap would soon receive data for multiple instances of 42 for D. In that case, there would then exist a model ABCD to test. If the bin defined by ABCD had a high hit ratio, then the system may add child X to that bin. Children of roots with other values of D would continue to be treated as misses, but if D=43 also produced child X, the system would eventually discover this and add another ABCD bin where D=43.

If the bin ABC did not exist prior to this, the hit count will not be known in advance. In that case, the bin can be created and child X can be added. If fails are detected, the child can be removed from the bin, but the system may continue to track the bin count. Child X may go back to the default bin and a new model may be created from the multimap as described above, and the bin count will be available to make improved decisions.

If the multimap acquires a large number of entries for child X without finding a useful correlation for D or E, then the system may reach a decision threshold that this is randomly varying content. The system may then look at the hit ratio and see if the probability of X is high enough to justify a prefetch request. In other alternative embodiments, the object may simply be given a low prefetch score and placed in an accumulator to be prefetched if low cost resources are available for the purpose. If the object is identified as acceptable for prefetching, the system may add X to the bin, with a note or tag that indicates that X is only expected for a lower probability, so that it should not be removed from the bin unless the hit rate drops below an expected level.

As discussed above, an initial model may have a correctable problem where the system may have an initial state where consequential fields are treated as inconsequential. In certain embodiments, a preliminary model can also have the opposite problem: it may have decided that inconsequential fields are consequential. In this case, the system may achieve a high hit ratio for this child in the assigned bin, but the system will also soon see more misses where the same child URL shows up from a root that matches some but not all of the consequential fields.

Figure 8:
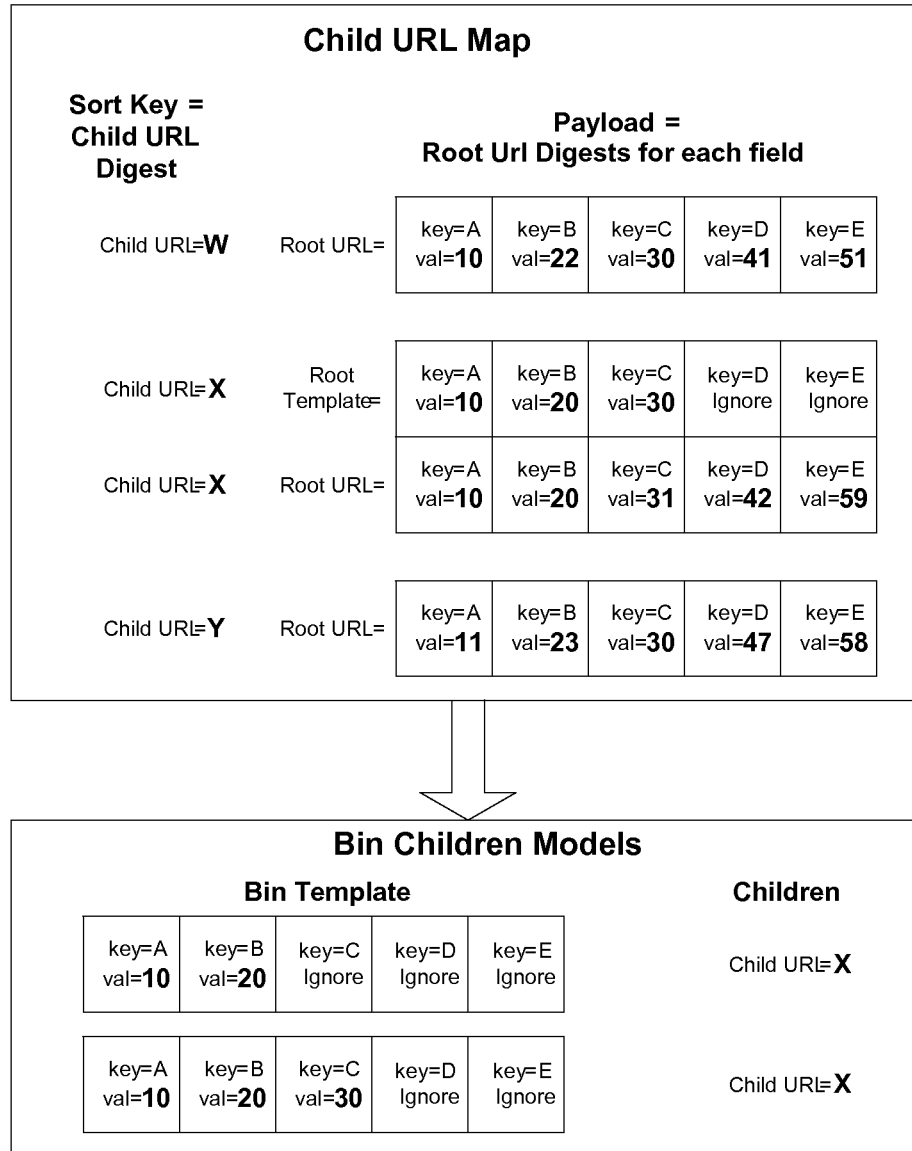
FIG. 8 describes a method for improved prefetching in accordance with one potential implementation of the present innovations.

FIG. 8 shows how this problem may be solved by tracking the bin assignments in a multimap. After child X was added to a bin defined by a set of ABC values, a root template entry is added to the map. If a new root is missed by this model because it had a different value for a consequential field, such as C=31 in the figure, then X can be added to a bin defined by only the AB values.

If the ABC model had previously had a high hit rate, it could be temporarily retained as shown in the figure. When the children of a new root are being collected, the highest probability for X would be used. If it matched the full ABC template, it might receive a higher probability than if it only matched AB. However, if the hit rate for AB is the same as for ABC, then C is inconsequential for X, and the entry for X can be dropped from bin ABC.

As discussed briefly above, in certain embodiments a child URL that is a potential candidate for prefetching may include dynamic fields or parameters. In certain web page transactions, these fields may not be synthesizable, and so the child URL may not be prefetched. In other web page transactions, these fields may be calculated or synthesized from a large variety of sources. In the models above, the dynamic portions that are known to be synthesizable are masked as part of the modeling operations, and then may be synthesized during the web page transaction when the appropriate information becomes available to the system. This improves the ability of the prefetch to anticipate the URLs that will be requested by the browser, as the values in the masked fields may be different for each download. If the fields are synthesized correctly, the prefetched URL may match a browser request even though the URL string has not previously been seen. The information needed to synthesize these fields may be based on either child-specific and root-specific models.

For embodiments utilizing child-specific classification, the child-specific classification may be based upon all instances of the child URL template, which may be from many different root templates, even those from different proxy servers. The classification may specify whether the field is dynamic, how often the values change, have changed in the past, and/or are expected to change in the future, and the classification may further provide "hints" which function as information relating to where to find the values needed to synthesize the dynamic parameter of the URL. In certain embodiments, having such a global model may be useful when the system is building root models as the information suggests where the system may look for values or how the system may build models.

For other embodiments utilizing root specific classifications, the root-specific classification may use information from a specific root template to identify where values for the dynamic fields can be found. For example, for a particular web page transaction a session ID needed for a dynamic URL parameter might be found in a particular cookie value, while for a different web page transaction using a different root template, the session ID needed for a dynamic URL parameter might only be found by looking at previous URLs. The root-specific model may provide information on how to get each dynamic field for each child URL associated with that root.

In embodiments that attempt to prefetch child URLs with variable parameters, the goal of the process is to be able to synthesize the values of fields in the child URLs based on data which is available either at the time the root is requested or at an early enough point in the page download that the prefetching is still beneficial. Some values will be effectively random, so that the system will never be able to synthesize the same value that will appear in the browser request. Knowing that the value is random is also useful, so the system does not waste time prefetching URLs that will never match or otherwise adjust the prefetch strategy. The following is a description of some potential classifications for dynamic fields, and methods that may be used in certain embodiments for handling the various types of dynamic fields.

In some embodiments, dynamic fields may derive values supplied from cookies. A unique value appearing in a URL from the browser may have been supplied via a HTTP set cookie directive on the response to a different request URL that was part of the same page download. When the root page is updated, a list of the cookies that were set in the download can be provided so that it is available for this purpose when the model of the template for each child URL is updated. In order to take advantage of this data, the prefetch request may need to be delayed until the object setting the cookie is downloaded. In certain embodiments, such a system may provide a benefit to a system that does not want to use cookie values that are out of date and may produce the wrong response.

In some embodiments, dynamic fields may derive values supplied from web text. A unique value appearing in a URL may have been supplied in the web text data such as HTML, JavaScript, CSS, or other such formats in a way that could be discovered by the prefetch scanner. In some cases, a standard prefetch text parsing scanner may always find the full Universal Resource Locator (URL). The root page results may indicate which URLs were found by the scanner and in which web text files. A tracking model can then incorporate this data into the prefetch strategy. For example, a fresh copy of the web text file might be downloaded in embodiments where the object is not subject to an If Modified Since command and scanned even if we expect the item to be served from browser cache. Also, the tracker may be structured to wait for the scanner rather than use a low-probability rule for fields in the URL.

If a dynamic field affects many child URLs for popular root templates and no effective rules are found to synthesize it, then it might be beneficial to run a special scan of the web text files. When the root page is requested, the tracker can specify that it would like more information about a particular dynamic field that has been a problem in previous downloads of this root template. The tracker module can provide a template to identify this field in the child URLs that will be requested by the browser, as these children are not currently prefetchable due to this problematic field.

In this case, the prefetch scanner or other similar functional module may save copies of all web text files when downloading the root. In various alternative embodiments, the analyzer may issue requests for URLs when it needs to run this analysis. This accomplishes the same goal, without requiring the system to collect the web text during the prefetching. When the download is complete, the scanner may use the template to identify the current value of this dynamic field in the child URLs for this web page transaction, and then scan for this value in all the web text files that were downloaded before the first child URL containing this value was requested. If a match is found, the preceding bytes may be scanned to see if there might be a Java operator such as "var SessionId=" that could be used to find this value in future downloads of the root. The bytes after the value may also be recorded so that the system may find the correct end to a string. The next time this root page is downloaded, the tracker can supply this prefix string and end delimiter to the scanner to use during this download. The scanner adds this to the list of tokens for which it scans when processing the web text file where the value is expected. When it finds this value, it uses it to complete the synthesis of the child URL(s) that depend on this dynamic value and to prefetch those children.

In certain embodiments then, this procedure can thus allow the scanner to be used in constructing URLs containing dynamic fields even though the full URL does not appear in the scanned text file. The system may still miss cases where the entire field value does not appear as a literal in the web text, but may capture some cases that currently elude both systems without such an embodiment.

In some embodiments, dynamic fields may derive values supplied from another URL. While a dynamic parameter value may be unique to the current template, it may have been appeared in another URL that was part of the same page download. In certain embodiments, the URL may even be from a separate web page download or transaction. When a template for a child URL is being updated, the modeler can have access to the list of all child URLs relevant for that download and the order in which they were requested. The prefetch of URLs needing that field can be delayed until a URL containing that field is requested or identified. For example, when the HTML or a JavaScript is parsed, the scanner might identify a URL to prefetch that contains a field that has the correct value. URLs from templates that contain that field can then be prefetched. In some cases, the system may wait on a browser request for the template that contains the first instance of the field, and then prefetch the objects that need this value. In certain embodiments, a special case may occur when an entire URL appears as part of a previous URL, which occurs in some redirection schemes. In such an embodiment, the entire URL may be treated as a dynamic parameter and prefetched when the parameter becomes available.

In some embodiments, dynamic fields may derive values supplied from session specific data. Session specific data refers to a value that is used for multiple page downloads by a single client, such as when a user logs onto a web site that creates a shopping cart that is maintained across multiple page requests or multiple web page transactions that are considered part of a single session. Since a session specific value appears across multiple requests, the client session may be able to find this value from a field in an earlier request. This allows the synthesized URL to be prefetched immediately when the root is requested.

In some embodiments, dynamic fields may derive values supplied from user specific data. This may operate in a fashion similar to session specific information as discussed above. A user specific value may appear in multiple downloads by a single client. The only difference is that with user specific data the ID or relevant data may be more persistent, so that an ID value from a previous day could be used in a new prefetch request. For the modeler to detect these cases, it needs to have access to a long-term history for the individual user. This might involve data from a proxy server net session database. In alternate embodiments, the prefetching system may expand on web transaction models to incorporate a user-specific indexing of the global database.

In some embodiments, dynamic fields may derive values supplied from configuration specific data. A configuration specific value may have different values for different groups of users, but each user may have the same value over a period of time when the user does not change user system configurations. The bin children model described above may handle configuration values that are specified in the HTTP headers or cookies. Those configuration parameters may be treated as key/value pairs, which may be discovered to be consequential, and a different set of child URLs will be produced that differ only by this 'configuration specific' value. Some configuration settings may not be discoverable in the HTTP headers, but rather are generated when the browser uses Java scripts or other parameters to query its local environment for parameters such as display resolution, support for plug-ins, or other user configurations. The handling of this field may thus be similar to the user specific fields. The primary difference in many embodiments is that it might be possible to predict the value even when no history is available for this value for this user. In such an embodiment of the system, some correlations might be established between groups of users and the value of this field, and the value for this user be synthesized based on membership in such a group.

In some embodiments, dynamic fields may derive values supplied from a date method. Certain embodiments of the system may include a detector for this detecting such dynamic fields based on comparing the field value with the date value returned by the operating system. The date method is a randomizer used for randomizing URLs, and detecting its use can improve system performance. In some embodiments, this is determined using a clock from a user modem, where the optimizer does not share the same system clock as the browser. If a date( ) field can be positively identified, it might be marked as inconsequential to both uploads and downloads, as the synthesized date is equally valid as the one synthesized by the browser.

In some embodiments, dynamic fields may derive values supplied from a rotating value. A rotating value typically has a finite set of values that appear across all users at various frequencies, but can not otherwise be correlated with other fields, configurations, or other elements of the model. In predicting the children of a root, a system may assign probabilities to each value and prefetch multiple URLs if the probabilities are large enough to justify the prefetch resources. In such an embodiment, the extinction probabilities could be modified, so that a Fail does not terminate prefetch attempts as readily as it might with static URLs.

In some embodiments, dynamic fields may derive values supplied from a random browser number. In such embodiments, the random browser number may be an integer that does not appear in any field of any URL from any template for this host. In addition to the uniqueness of the values, the use of this method can be detected by the values of individual digits, which will be evenly distributed across all possible values. Web page analysis at the proxy server of web page transactions by looking for cases where the key name is conveniently labeled like "rand" may provide a trigger to perform an analysis for such a dynamic field. In other embodiments, the uniqueness across large sample sets and the digit variance patterns form a more reliable detection within the proxy server. As with the date( ), rand( ) parameters in dynamic URLs, values that are positively identified as using a random browser number might be marked as inconsequential in both directions in certain embodiments. A value for a field may seem random to all the tests in the prefetching system such that it changes for each download to an unpredictable value and also doesn't meet the profile suggesting it is coming from the rand( ) method, so the synthesizer has no idea what to put there. For parameters in URLs that are random beyond the ability of the prefetching system to detect; however, the system may simply label the dynamic child as not prefetchable.

The purpose of the above described classifications is to be able to synthesize the dynamic field values when a child URL with the same template is requested in different downloads of the root. In such embodiments, the first step is to match the templates of each child against the templates of children during previous downloads. This uses the same template matching strategy used to identify root pages described above.

In some cases, more than one child URL will have the same template, such as cnn.com\ads\junkMail?sessionId=34534 and cnn.com\moreAds\junkCtrl.js?sessionId=37865. Initially, the system may only develop a single model for the template and assume that every use of this template will follow the same procedures for generating the value for "sessionId". In alternative embodiments a system may use different classification models based on some of the other field values, such as for Folder1="ads" versus Folder1="moreAds". In some embodiments, however, the default model is to assume that a field is static, which means it probably has the same value as in previous instances of URLs for the template. If so, the classifier may not need to spend resources looking further. Also, a field that periodically changes to new value, stays at that value for many downloads, and never returns to the old value can also be considered as a static value, as the success rate will be suitably high to justify prefetching using the known values that are considered static by the system.

When a field or URL parameter changes dynamically, the classifier or web page analysis module of a proxy server may attempt to see whether the parameter matches any of the types defined above in the discussion of parameter classifications. If this field has previously been classified and the classification or origin has been determined, then the value may be checked against the classification model. If the value confirms the model, then in certain embodiments the system may halt further analysis. In alternative embodiments, additional classification checks and model updates are verified before expending system resources, such as using network bandwidth and processing resources to prefetch child URLs based on this model in response to future requests for the root URL If a model for a dynamic field in a child URL is not available, the system may begin the process of constructing a model by performing a search to see if the field occurs in the other places in the web page or other web page transactions, such as fields of other URLs in the same root page instance, cookies, and instances of the same template and field in previous downloads of the root page by the same user. In certain embodiments, the proxy server may use a strategy of creating a map for each download where the key is the field value and the payload is a rule specifying where the value appeared. A separate permanent rule map spanning multiple clients and downloads may have the field name as the key and the rule as the payload. The download value map may be used to look up all places the value has occurred in the target search areas for this web page transaction. For each match, an entry in the permanent rule map is either added on first time rule has been seen or updated with, for example, an increment the count of the number of times this rule was valid.

In certain embodiments, the value of a rule is based not just on its statistical probability, which may be defined as a percentage of times the rule was valid, but also in its usefulness to the prefetcher. The most useful data is that data which is available when the root page is requested, such as fields or cookies in the original root URL as well as data from previous downloads. Data that requires other children to be downloaded first may be less useful, but may be the only way to synthesize fields such as download IDs that appear in multiple children, as described above. Performance benefits may be achieved even if the system must to wait for the browser to request one of these URLs before the other URLs may be prefetched.

As discussed above, consequentiality is an important characteristic of parameters in web page transactions. A parameter that is consequential has an impact on a subsequent object in a web page transaction, and impacts the ability of a prefetching system to prefetch child objects, especially if a value of a consequential parameter is not known. An inconsequential parameter is a value that does not impact selection of a subsequent object in the web page transaction. Inconsequential parameters may thus be ignored when making prefetching decisions. In certain embodiments of an improved prefetching system, one of the main goals of the URL modeling may be to determine the impact of each template field on the application. For child URLs, two questions for determining consequentiality are whether a field affects the response that the application will receive, known as download consequentiality, and whether the field is important to the application server, known as upload consequentiality. For root URLs, the question is how each field affects the child URLs that will be requested by the browser when this page is downloaded.

An example of a download-inconsequential child URL field is a statistics update to which the server always responds with the same response packet. The data is meaningful to the web server, so that a URL with the correct value needs to be uploaded to the server. However, the prefetcher may be able to improve performance by taking advantage of the DL-inconsequentiality by serving a response to the browser without waiting for the response from the web server.

An example of an upload-inconsequential child URL field might be a random value inserted into the URL, as is common for cache-busting reasons. Since the value is randomly generated each time, replacing it with a synthesized value in a prefetched request will not affect the application. The response to the synthetic request can be supplied to a browser even if the browser request had a different value for the upload-inconsequential field.

Download-inconsequential child URL fields can be detected by analysis of the URLs and response checksums, where checksum refers to any method allows fast checking of whether two responses are identical. If a field is download-inconsequential, URLs that differ only by this field always result in identical response checksums. Statistical methods described below may identify download-inconsequential fields and determine whether the model is strong enough to allow delivery of a cached response without waiting for a response from the web server.

Upload-inconsequential fields are more difficult to detect, as the server may derive meaning from a field even if the value of the field is download-inconsequential. The most common case is when the URL field is generated by the java rand( ) or date( ) methods. Techniques described below show how these cases may be identified and how the model strength may be determined. The optimizer may then use its own implementation of date( ) or rand( ) in synthesizing requests.

In embodiments where a proxy server has a cached copy of the response that it expects to receive for a child URL with download-inconsequential fields, server may implement prefetch handling is as follows. Initially, the server optimizer does not prefetch anything. The server optimizer sends to a client optimizer a URL with the inconsequential fields masked and the cached response. The client optimizer provides the cached response if a URL matches this template. The client optimizer uploads the browser request URL to the server optimizer. The server optimizer issues a web request for the URL. The server optimizer uses the web server response to update the model at the proxy server, and finally, the server optimizer does not send the web server response across the network link, which in some embodiments is a high latency satellite link. In such an embodiment, the web server will receive the same request as it would without prefetching, so it does not matter whether any fields in the URL are upload-consequential.

Conversely, in embodiments when there is no cached copy, the system embodiments may perform an alternative analysis. Since a cached copy may not be available if a download-consequential field is different from previous requests, the only way to save the round trip time (RTT) is for the server optimizer to issue a prefetched request for the URL. If a field is upload-inconsequential, then the server optimizer can synthesize a value for the prefetch request and the client optimizer can serve the response to the browser even if this field is different from the URL requested by the browser.

If a requested object differs from a prefetched URL only by download-inconsequential fields, the prefetched response can be served to the browser and the RTT will be saved. However, if those fields are not known to be upload-inconsequential, a trade-off exists between two options. In one potential embodiment, the browser URL may be ignored. The web server received one request for the item as expected, but the difference in the download-inconsequential field in the prefetched URL from the browser's URL could affect the application in the future in ways not known to the proxy server when the embodiment ignores the fields/parameters. In alternative embodiments, a second request may be uploaded to the web server containing the browser URL. This insures that the web server obtains the correct request URL, but now the web server has received 2 requests from a sequence a standard web page transaction would only include one, and the web server may be impacted by receiving two requests where the web server expected one. The extra request may have a worse impact, such as interfering with the hit count for the object at the web server, than getting the correct field value.

From the standpoint of the web server or content server, the second embodiment described just above is identical to any other prefetch miss. In such an embodiment, the server receives an incorrect prefetch request followed by the browser URL. The only difference is that the prefetch benefit for the client or user was achieved because the mismatched fields were known to be download-inconsequential. A third embodiment may use a system method that is not to prefetch in these cases. In such a third alternative embodiment, prefetch performance would be poor for service to the client if misses were never allowed. The selection between these three embodiments may can be guided by other preferences, and in certain embodiments may be incorporated as different options within a single embodiment that are selected with information such as indicators that the download-inconsequential field may also be upload-inconsequential.

The follow one potential embodiment of aspects of the present innovations related to determination of download consequentiality. X may represent a result sample which includes the URL that was requested and the response that was received. The response can be expressed as RX, which in may be the value of a checksum of the response data. The URL can be represented as a series of key/value pairs. The value for key=i for the URL associated with sample X can be expressed as V(X,i). Two URLs X and Y are considered identical if V(X,i)=V(Y,i) for all key value pairs.

The impact of a field k might be determined by looking at pairs of URLs that are identical except for the value of k:
V(X,i)=V(Y,i) for all keys except i=k
V(X,k) !=V(Y,k)

If RX !=RY, the field is likely to be consequential, as the change in the value of k produced a different response. It could be a coincidence: the content may change over time and the switch to new content had nothing to do with the value of k.

Similarly, if RX=RY, the field is likely to be inconsequential, as the same response was produced even though the field had different values. A large number of positive samples are needed to provide the level of certainty required before a response can be delivered to the browser where the browser URL differs from the prefetched URL by the value of k.

One potential non-limiting implementation for running such a test on a large sample set is to compute a hash value Hi for all URLs in the sample, where H is a digest of the values for all fields except i=k. Hi is used as the primary sort key for the samples. To count the number of consequential samples, the list can be subsorted by V(x,k), and then by Rx. A count of samples where k was consequential can be generated by iterating through the sorted list and counting the number of different values of Rx for each V(x,k) bin. The number of inconsequential samples can be determined by using Rx as the second sort key and V(x,k) as the third. This may simplify counting of the number of cases where Rx was the same even though V(x,k) was different. This process can then be repeated so as to check the consequentiality of each field.

This implementation above, however, may not handle covariant fields very well. For example, if fields k and j are both inconsequential, but they both vary for each download, then we will never detect any inconsequential cases. We would never find multiple samples where
V(X,i)=V(Y,i) for all keys except i=k
because V(X,j) is always different from V(Y,j). An alternative embodiment may incorporate a test for covariance on a small subset of samples, so that the cost of testing multiple combinations is reduced. Once a candidate list of all inconsequential fields is created, it can be tested against the full sample set. For example, if j and k are the only fields identified as being inconsequential, the system excludes both fields from the hash used for the first sort key:
V(X,i)=V(Y,i) for all keys except i=j or i=k A combined hash can be created for values of the j & k fields, which can then be used as the secondary sort key. The counts can then be computed as described above.

The system then may be able to detect inconsequential fields in URLs for which the responses change over time. For example, the URL http://cnn.com/worldPage.htm?rand=376485
may change value during the day, producing samples where both the value of rand and the content have changed, making the value appear consequential in the previous algorithms. This result may be avoided by sorting first by the fields determined to be consequential, such as fileName=worldPage.htm in the example. Then the system may perform a secondary sort based on the sample time. If the content is linearly time dependent, multiple copies of the same response value will appear consecutively, followed by a new value. The old value will not reappear once it has become obsolete. Bins can be created for each of these blocks of consecutive samples with identical response values, and then subsorted by the inconsequential field values, such as "rand" in this example. The checks described above can then be run to see if the rand URL field value is consequential.

In certain embodiments, the processing speed might be optimized by combining all samples where both the URLs and responses are identical. A count can be stored for the combined samples so that the sample strength in various tests can reflect all the contributors. In particular, a URL like cnn.com\images\leftArrow.gif would combine into a single entry, so that CPU may not be used for sorting or otherwise processing static URLs.

Additionally, various embodiments of the present innovations may need to respond instantly to new data so as to detect when a model fails, add new models as new templates are encountered, and update models when the number of samples makes the correlation strong enough to use in the prefetch list decisions.

Embodiments incorporating real-time updates may use a store for the entries in lists sorted in two ways to verify the current model. During run time, real time embodiments of the system may check whether a model has been broken by identifying new samples that indicate an inconsequential field in the current model is actually consequential. The system may also identify whether the statistical correlation of the consequentiality is strong enough to use in a prefetch list. In both cases, the data can be sorted using three sort keys made up of a hash of all values for URL fields determined to be consequential, a hash of all values for URL fields determined to be inconsequential, and response checksums.

To detect violations of the current model, the system may first sort by the hash of the consequential field values. The system may then subsort by the hash of the inconsequential values and finally then by the response checksums. As each new entry is added to the sorted list, the system may check the values before and after each entry is made to see if the same inconsequential field values produced different results. If so, the value may be consequential and a prefetch list may need to require matches for this field.

To detect affirmations of the current model, embodiments of the system may reverse the order of the last two subsorts discussed just above. As each new entry is added to the sorted list, check the values before and after to see if the new sample adds a different set of values for the inconsequential fields that produce the same response as another set. If so, the model has been strengthened and may be ready for use by a prefetch list.

In some embodiments, the systems and methods for dealing with consequentiality require sufficient memory to store two sets of pointers and the values for the 3 hashes describe above. If the system uses 64 bit hashes, this requires ~40 bytes per URL. Alternative embodiments of the system may also include a 3rd index sorted by time, so that obsolete entries can be periodically removed.

Figure 9:
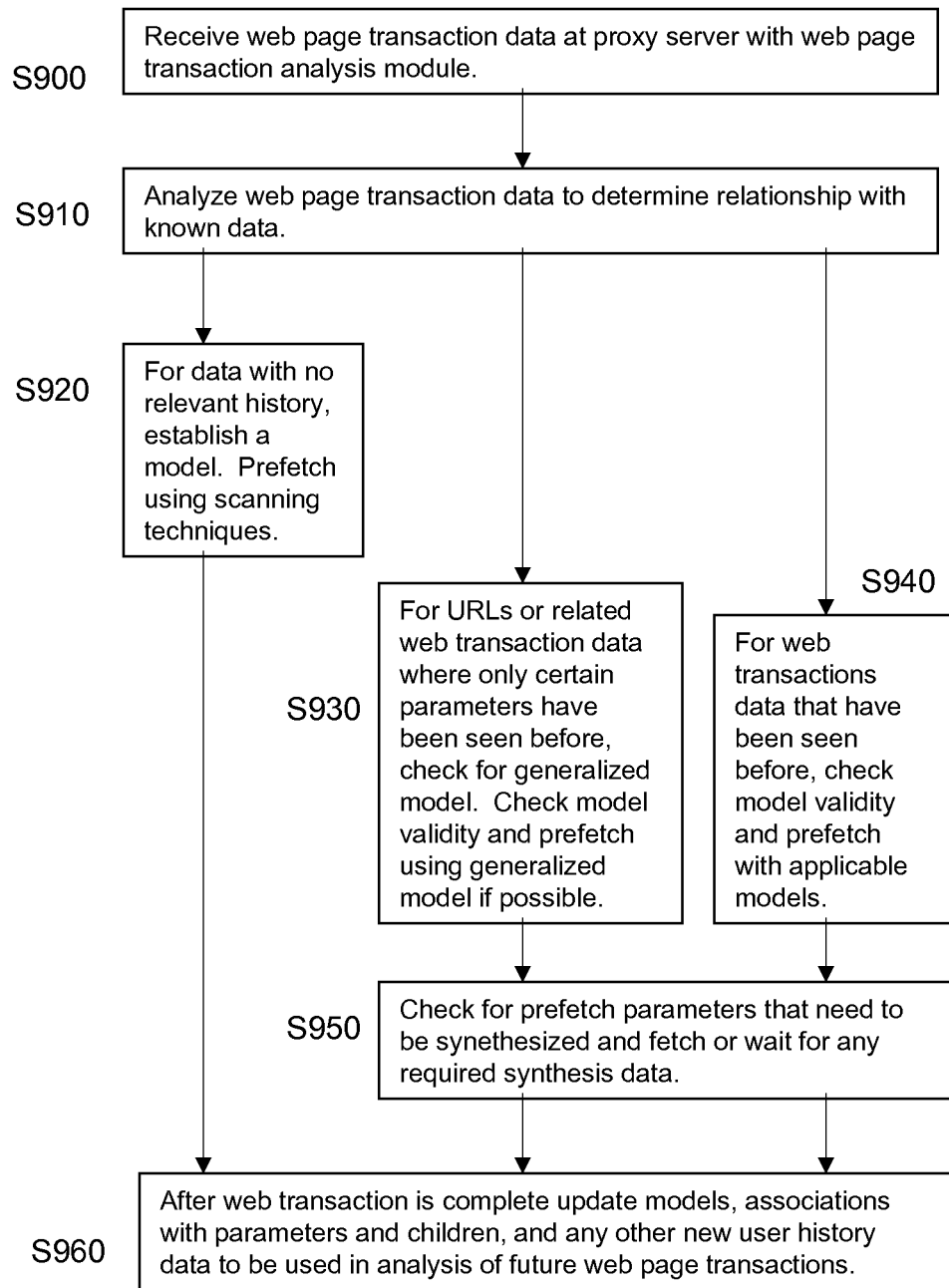
FIG. 9 describes a method for improved prefetching in accordance with one potential implementation of the present innovations.

In certain embodiments, the detection of inconsequential fields may only be useful when the system has enough samples to create a high level of statistical certainty, as defined within the context of the costs, system resources, and/or contract limitations provided by the proxy server service. Consequently, a large number of samples may be collected and stored before the proxy server may reach a threshold to analyze the data. When that threshold is reached, the analysis can be run as described above to determine consequentiality. In certain embodiments, temporary sorting for this analysis might be done using a fast radix sort. If the preliminary analysis and model finds one or more fields to be inconsequential, the maps can be created as needed to use inconsequential parameters in real-time analysis and operation of the service FIG. 9, then may provide a basic outline for every HTTP request or HTTP response moving through a proxy server with an improved prefetching system. In step S900, the system receives web page transaction data. An analysis module such as web transaction tracking module 248, in conjunction with parsers that may be internal or external to the module, such as parsers 244 and 216, all of FIG. 2, may perform analysis in step S910. Such analysis may be performed on any portion of a web page transaction, including root requests and responses, and child requests and responses. When the data has been parsed, the analysis in step S910 may also determine if any, all, or none of the parameters discovered in parsing have been seen previously. In step S920, if no parameters have been seen previously, the system may simply establish a new model, as described above with respect to the Netflix.com™ example, with bins established for various parameters or the entire data portion. In step S930, for web transaction data where only certain parameters have been seen before, the proxy server may check stored history data for a generalized model that matches the parameters and host. Such a generalization technique is described above, along with various characteristic models that may apply.

In step S940, for web page transactions that have been seen before, the system may check the validity of the current model and prefetch with applicable models. For web transaction data that is partially or fully matched, the system may also include a check for parameters that need to be synthesized. The system may search for required synthesis data, or wait for the required data. A model for the parameters or transaction may include instructions for the system to either fetch or wait for the required data. Finally, after the web page transaction is complete, the system will have data for all children that were requested as part of the original root request from the client. The system may then perform analysis for all data, checking for missed associations with models, checking new models for data not previously seen to see if any generalized models may be created or possible in the future, and updating statistics for hits, misses, and fails, as described above in detail for various embodiments.

Figure 12:
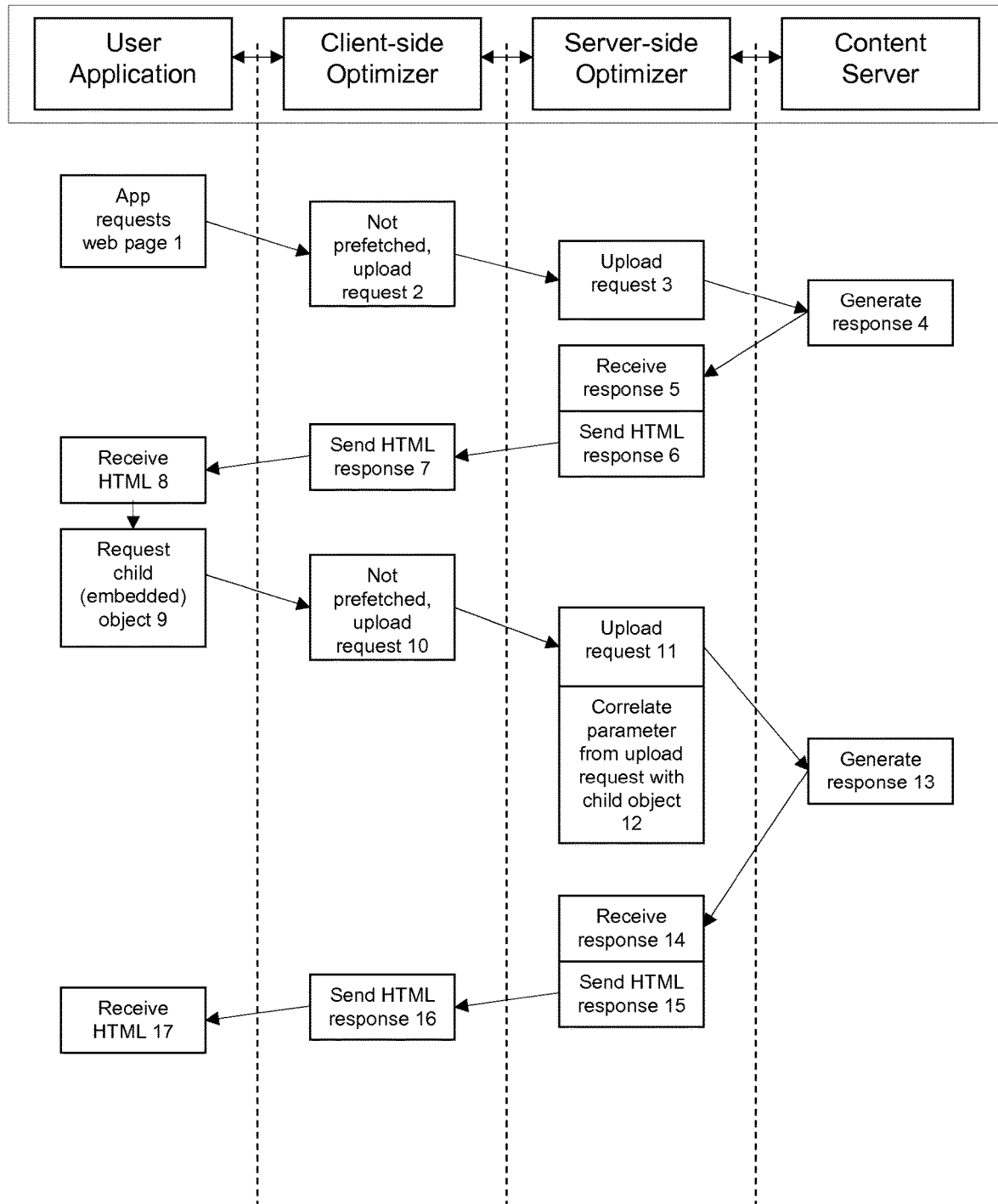
FIG. 12 illustrates a block diagram of one potential implementation of a computing device in accordance with one potential embodiment of the innovations presented herein.
Figure 13:
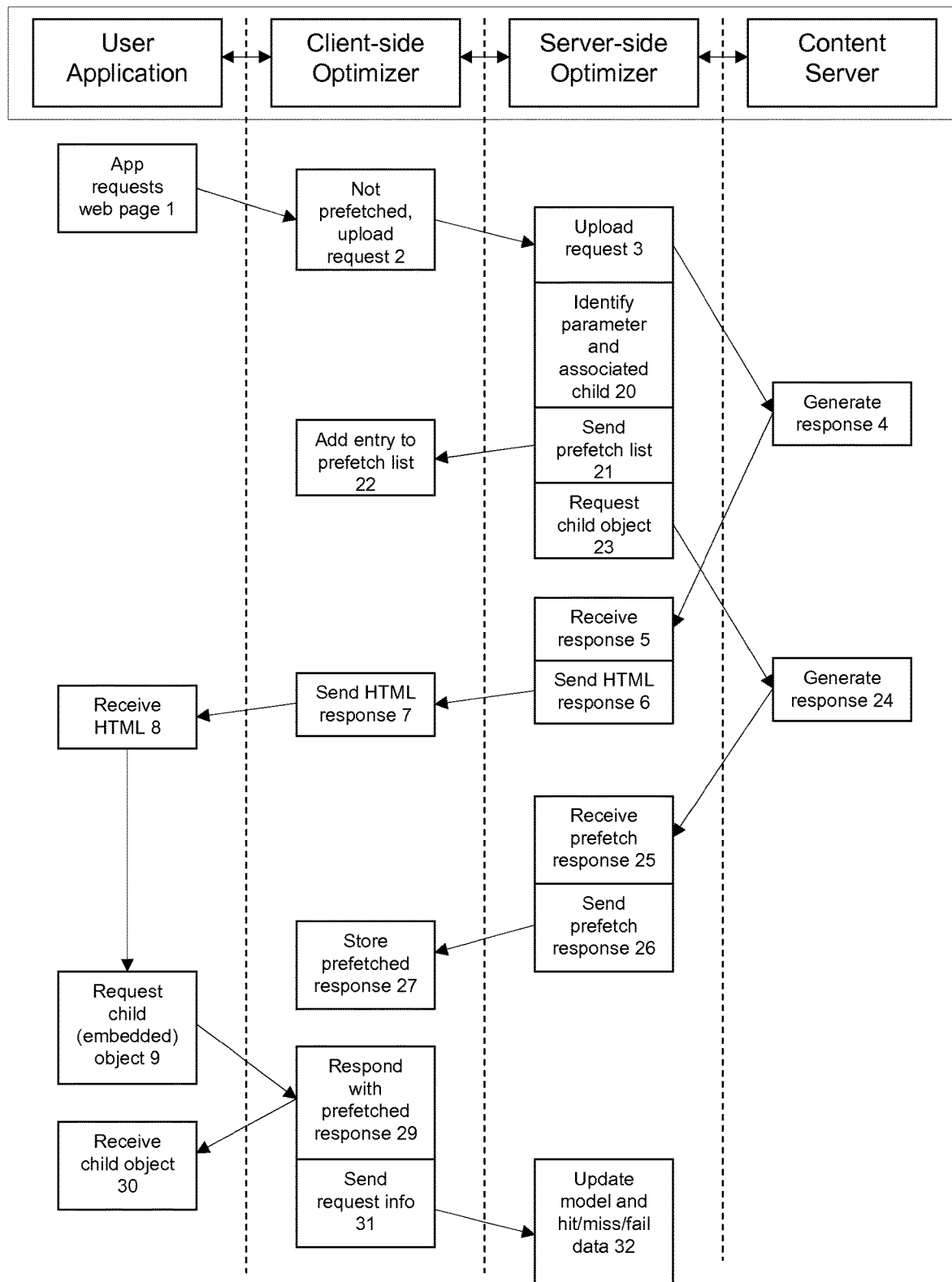
FIG. 13 illustrates a block diagram of one potential implementation of a communications system in accordance with one potential embodiment of the innovations presented herein.

FIGS. 12 and 13 show hybrid flow diagrams for one potential implementation according to the present innovations that also shows the location where steps in a process flow are performed. In FIGS. 12 and 13, the system includes a user application that may be operating on a client such as client 105 of FIG. 1, a client side optimizer such as proxy client 110 of FIG. 1, a server side optimizer that may run on proxy server such as proxy serve 120 of FIG. 1, and a content server such as content server 130 of FIG. 1.

FIG. 12 shows a process flow for a web page transaction where the system has limited or no prior information for the web page request, and where the system uses the real user data to create a correlation for use in future requests for the web page. In step 1, the user application requests a web page. Such a web page is typically requested in direct response to a user input or selection, such as a mouse click or key entry, but may also, in certain embodiments, be responsive to a macro or time based selection operated by the application. The request is sent via the client side optimizer, and in step 2, the system confirms that the requested web page has not been prefetched, and an upload request is sent to the server-side optimizer. In step 3, the upload request is received at the server-side optimizer, and is further reconveyed to the content server. In step 4, the content server responds to the web page request by communicating the response back to the server-side optimizer. In step 5, the server-side optimizer receives the response, and in step 6, the response is conveyed to the client. In step 7, the response is received at the client-side optimizer, and communicated to the user application. The response to the application request is received by the application in step 8.

In step 9, any child requests that are embedded in the initial response are identified by the user application, and the user application requests the child objects. Just as with the initial request, in step 10 the objects are verified not to be prefetched, and the request is sent to the server-side optimizer. In step 11, the request is communicated from the server-side optimizer to the content server. Unlike the previous request described in steps 1 through 8, however, in step 12, the system has prior information. In step 12, then, the system analyzes the initial request for a parameter that may be associated with one or more subsequent child requests. This may be done through the creation of an origin model as previously described, or through any other functional classification system or structure that associates the parameter with the child. Additionally, step 12 may be performed at any point in time relative to the subsequent steps. Step 12 may analyze and create a correlation immediately upon receipt of the child request, or at any later time when additionally processing resources are available or system use of the server-side optimizer is lower. Further, in various alternative embodiments, this analysis may be performed at a different server from the server-side optimizer, at the client, or at any other acceptable computing device. Finally, in steps 13 through 17, the child response is generated and communicated from the content server through the system to the user application.

Continuing with a description of the same embodiment described in FIG. 12, FIG. 13 describes this non-limiting embodiment when a later request for the same web page is made. The request may be made by a different user, after a prefetched copy has been removed from a prefetch system for storage limitations, or when the system has not prefetched a copy for any reason and needs a new copy from the content server. In steps 1-3, the initial request is made just as in FIG. 12. However, when the request is received by the server-side optimizer, the parameter from step 12 of FIG. 12 is identified, along with the associated child. The initial application request then continues in steps 4 through 8 in the same manner as in FIG. 12. However, due to the identification of the parameter and associated child in step 20, the system may then prefetch an anticipated child of the initial application request.

A variety of acceptable prefetch steps and methods may be used to prefetch the generated child. In FIG. 13, the prefetching includes sending an updated prefetch list to the client side optimizer in step 21 where the entry is added to the prefetch list in step 22 so that a later request for the child will be identified as having been prefetched. The server-side optimizer then requests the child object in step 23. The child is generated by the content server in step 24, and communicated to the client-side optimizer in steps 25 through 27. In step 27, the child is stored in the client-side optimizer for use in responding to a subsequent request.

FIG. 13 continues in steps 9 and 29 through 32 to describe a "hit", where the child is requested in step 9, the client-side optimizer serves the prefetched generated child response in step 29 and the user application receives it in step 30, and an updated to a data model occurs in steps 31 and 32. If no related child was later requested, or the parameter generated the wrong child and a different child request was made instead, the object stored in step 27 will not be sent to the user application, and an update will still occur indicating the miss or fail to the server-side optimizer. The process may then repeat and continue, where the model for identifying parameters and associated children is updated, and the system operates with various combinations of requests, prefetched responses, and generated responses.

FIGS. 14-21 now refer to additional embodiments in which certain systems may identify web pages which include objects that must be fetched serially. Also described are methods that include multiple rounds of prefetching enabled for a single web page transaction to improve performance where these serializing objects occur. Additionally, the descriptions of identifying serializing objects and using this information to prefetch in a progressive manner may be instituted with any combination of the prefetching improvements described above. In certain embodiments, the fastest prefetch performance may be achieved if all children or as many children as possible can be requested as soon as the system sees the initial root HTTP request. In some embodiments, a portion of the system that tracks prefetching operation hits, misses, and failures to improve prefetching performance receives a copy of the root HTTP request as it is observed by the system. The tracking portion may then send back a list of child HTTP objects to prefetch. This type of system functions with a single prefetch list created upon observation of the root HTTP request.

A first issue that can cause problems and that may prevent a prefetching system that functions at the time of the root request from working for certain objects is when information needed to synthesize requests for children may not be available, but rather requires getting responses from the web servers or even additional requests from the browser. In other words, details required to make the appropriate child request are received during the course of a chain of requests and responses, and so the object cannot be prefetched at the beginning of the chain.

A second issue that can cause problems and that may prevent this from working occurs when responses during the download set cookies that affect the content delivered in response to subsequent child requests. Similar to the issue above, this is caused by appropriate information not being available at the time of the initial root HTTP request. Instead, the information comes in the form of a cookie that is set during the chain of requests and responses. The prefetch requests should not be issued until the correct cookies are available.

For the purposes of the present application, a "serializer" is any object, request, or response in a web page transaction that includes information that is required prior to a request or response for a later object. "Progressive prefetching" is any prefetching system or method that uses information about serializers in order to prefetch objects in a web page transaction while respecting the inter-object dependencies. In certain embodiments, rather than a single prefetch list created on observation of the root HTTP request, the tracking system may provide multiple prefetch lists, or a list that includes dynamic portions that will respond to information received during the course of the web page transaction.

The tracking system may detect these issues if the objects in the web page transaction or the updates after a download include indicators or data about the order in which requests were issued. The tracking system may also interact with the cookies attached to requests and dropped in responses. The tracking system may then build a model of the sequence of events that needs to occur when this root page is downloaded. In certain embodiments, the information required as part of the dependency may be considered a state change at the prefetching system, which allows creation of the desired prefetch request. Additionally, rather than generate a simple list of URLs to be prefetched, the tracking system may supply the prefetching system with a list of instructions as to the timing of requests and how information from responses and subsequent object requests during the page download can be used to synthesize dynamic fields in the child URLs.

In certain embodiments, then, the Bins described above for dynamic fields and child origin models, such as child origin model 416 of FIG. 4 may be further improved not only with information related to how to get the values for dynamic fields, but when the child may be prefetched within a chain of requests and responses as part of a web page transaction. While in certain embodiments, all prefetching may be initiated at the beginning of the web page transaction when the root request/response occur, other embodiments such as the embodiments described below may allow two or more rounds of progressive prefetching during a single web page transaction in order to deal with the chained nature of certain objects in the web page transaction. The list of child URLs 423 in FIG. 4 includes a child origin model 416 that specifies how to get the values for dynamic fields. In certain embodiments, a child origin model such as child origin model 416 may include details of when in the web transaction the required information will be expected, and when a prefetch operation may be made. In alternative embodiments, a record separate from the child origin model may be used for identifying prefetch timings. In any case, this process may therefore be considered to be progressive prefetching where instead of prefetching a simple list, the system may issue a sequence of prefetching requests that is shaped by events that happen during the page download.

In one potential embodiment, a prefetching system may enforce a maximum number of concurrent prefetch connections outstanding at any one time. In such a system, prefetches may be queued until there is an open slot below the maximum number concurrent threshold available for an additional prefetch connection. This limit on the number of prefetch connections may operate in conjunction with the prefetch sequence seen in a prior web page transaction, such that both the timing and order of the previously seen transaction is respected, as well as the limit on concurrent prefetching transactions.

Figure 14:
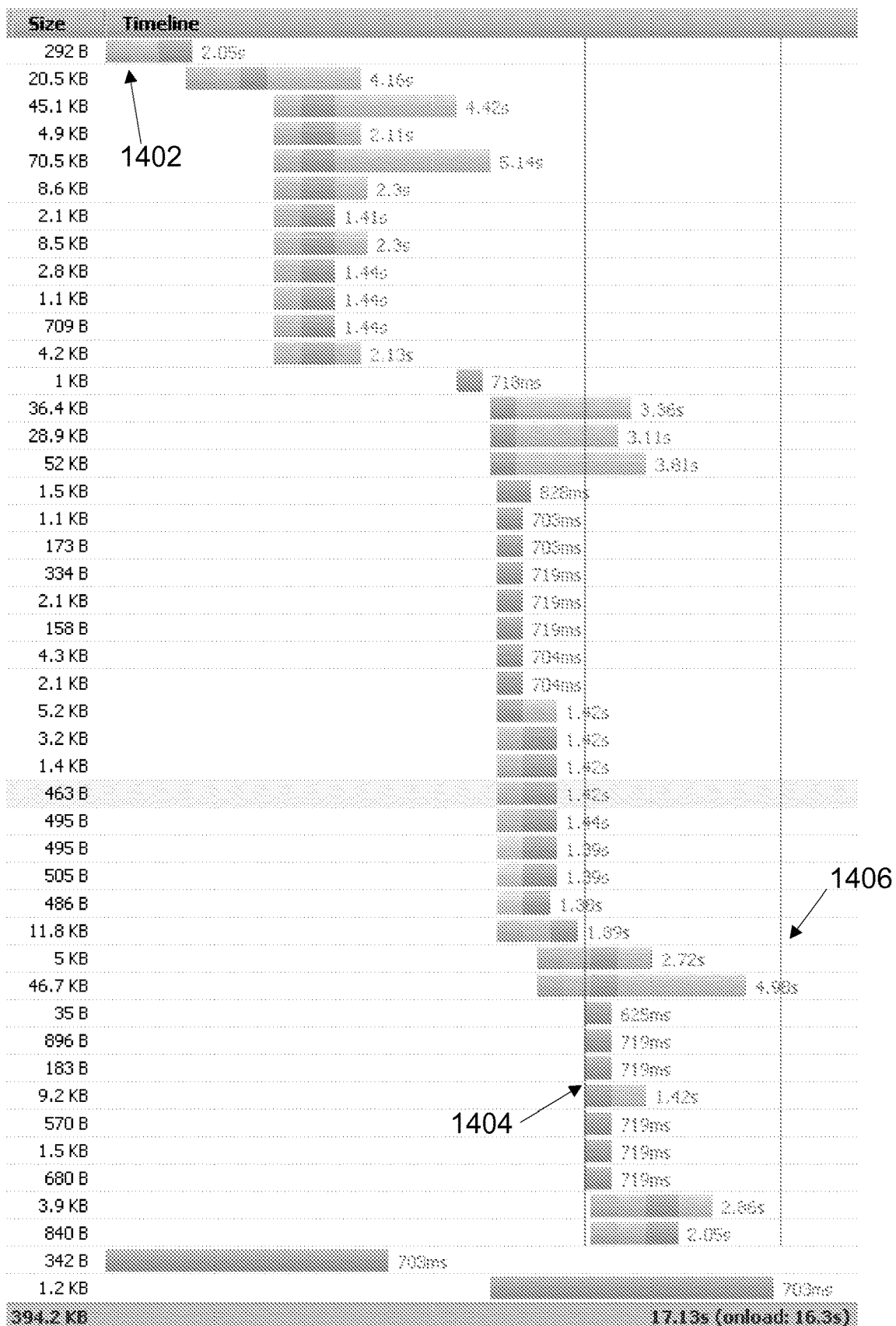
FIG. 14 illustrates one example of web page load data for use with a system in accordance with the present innovations.

FIG. 14 shows a timing chart for one potential real world example of a web page transaction that may be analyzed and accelerated in accordance with embodiments of the present innovations. The chart shows a list of objects, with a total timing and size at the bottom, and a position during the entire transaction when each object has an associated request and response. The root HTTP request of FIG. 14 is labeled as root 1402, with a 292 B size and a 2.05 second request/response time that begins at the very beginning of the web page transaction. The web page transaction includes a number child HTTP requests and responses that are shown as beginning after the completion of the root HTTP response. The child requests and responses occur in several stages, with the final set of requests occurring at the time shown by the line indicated by timing 1404, and the final response ends roughly at the timing line indicated by timing 1406. At the time indicated by timing 1406, the web transaction is complete, and ready for complete display to a user.

Figure 15:
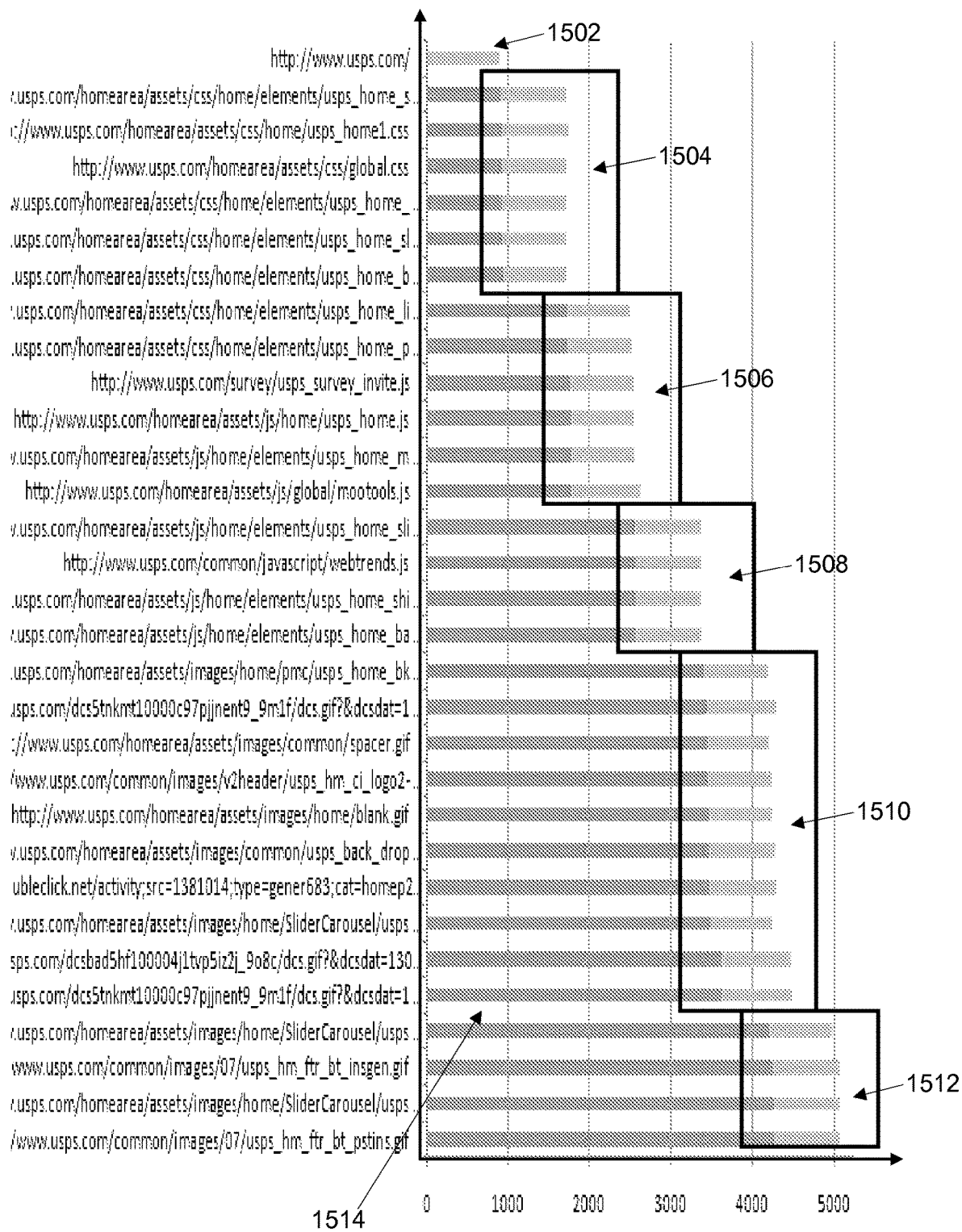
FIG. 15 illustrates one example of web page load data for use with a system in accordance with the present innovations.

FIG. 15 shows another timing chart for a potential real world example of a second web page transaction for "http://usps.com" that may be analyzed and accelerated in accordance with embodiments of the present innovations. The chart has a list of objects along the vertical axis and a time along the horizontal axis. The root HTTP request for http://www.usps.com is timing 1502. A first set of child objects that follows from the root is indicated by a box around object timings 1504. A second set of child objects that follows after the first set of child objects is indicated by object timings 1506. Similarly third child object timings 1508, fourth child object timings 1510, and fifth child object timings 1512 are shown, each roughly following in a progressive fashion from the previous set of requests and responses. The area to the left of the labeled timing boxes, generally indicated by timing area 1514, is the delay from the beginning of the web page transaction for each set of child objects. Because of the progressive nature of the chart with later transmitted objects at the bottom, this may be considered or referred to as a waterfall chart.

Although the web page transactions illustrated in FIGS. 14 and 15 both appear to have groups of object timings that progress from one set of timings to another, there may not be an actual dependency from any later timing group on a previous group, and the design of a web page may vary in nearly any matter set by the creator of the web page. In order to determine if there is an actual timing dependency between objects, additional information or analysis is needed.

FIGS. 16-19 show simplified web page transactions to illustrate various real dependencies and a response that may be made by a prefetching system that uses progressive prefetching.

Figure 16A:
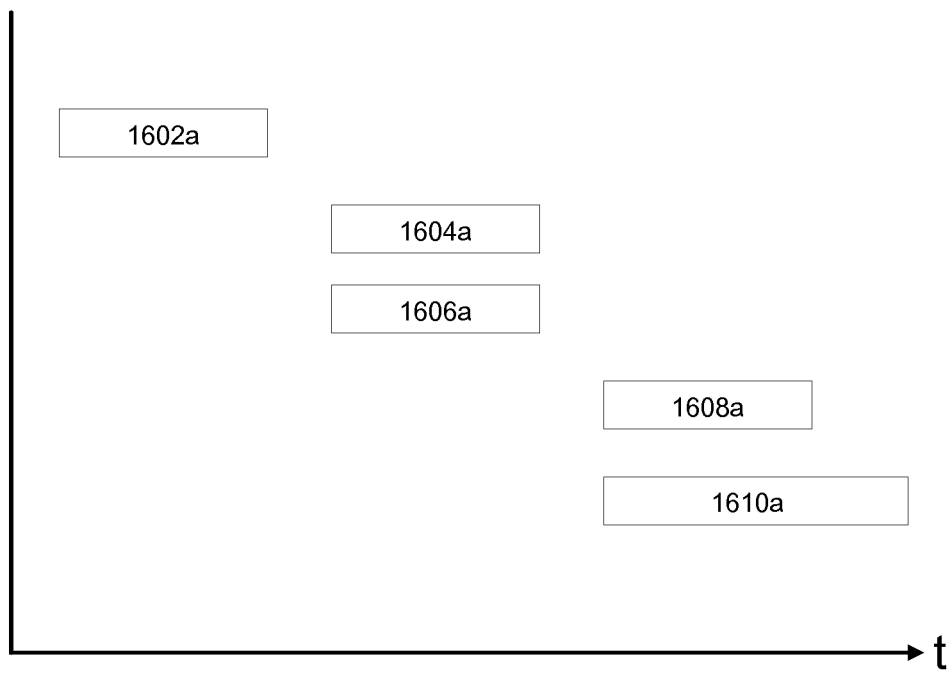
FIG. 16A illustrates one example of web page load data for use with a system in accordance with the present innovations.

FIG. 16A shows a web page transaction consisting of root object 1602 and child objects 1604, 1606, 1608, and 1610. For the purposes of FIGS. 16-19, boxes associated with the objects illustrate a timing from the beginning of the object request by a user system at the left side of each box to the completion of the object response to the user at the right side of the box, in a fashion similar to the charts of FIGS. 14 and 15. In a system without prefetching, the system has no knowledge or information about actual dependencies between objects. The system may simply have timings for the response and request. Although FIG. 16A includes a pattern of progressive requests and responses, the delay may be created not by a dependency, but by a caching limit, a connection limit, or some other limitation on the communication connection between a user and a content provider.

In certain embodiments, a system with progressive prefetching may implement systems to identify the actual dependencies between objects, and to distinguish these from limitations that are caused by some other means. Such a system may identify the serializers by scanning requests and responses for indicators that there is an interdependency. Such a system may also simply analyze timings after completion of a web transaction to identify serializers for use in a later transaction of the same web page. Additional details relating to the determination of the interdependencies is described below.

Figure 16B:
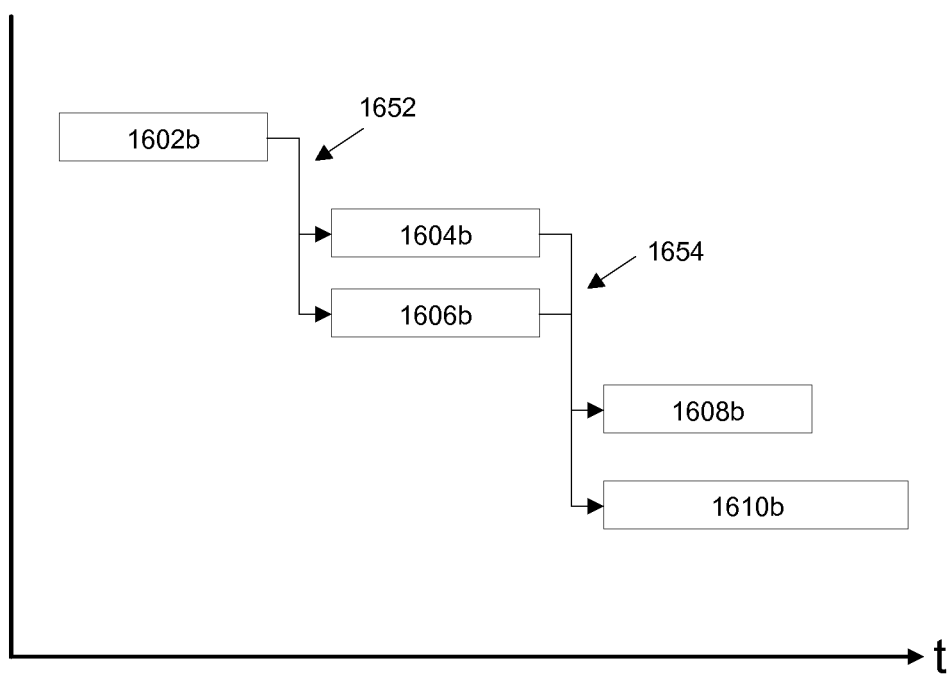
FIG. 16B illustrates one example of web page load data for use with a system in accordance with the present innovations.

In FIG. 16B, an embodiment of the system has analyzed the objects, and identified interdependencies 1652 and 1654.

As illustrated, since both 1604 and 1606 depend on 1602, they may not be prefetched until after the request and response for object 1602 is completed. Similarly both 1608 and 1610 depend on both 1604 and 1606, and so neither 1608 nor 1610 may be prefetched until the response for both 1604 and 1606 is complete. Given these dependencies, the relative order from the transaction shown in FIG. 16A must be maintained to respect the interdependencies during any progressive prefetching. Any later request for the same web page that uses prefetching will have a similar order of object retrieval due to the interdependencies between the objects.

Figure 17A:
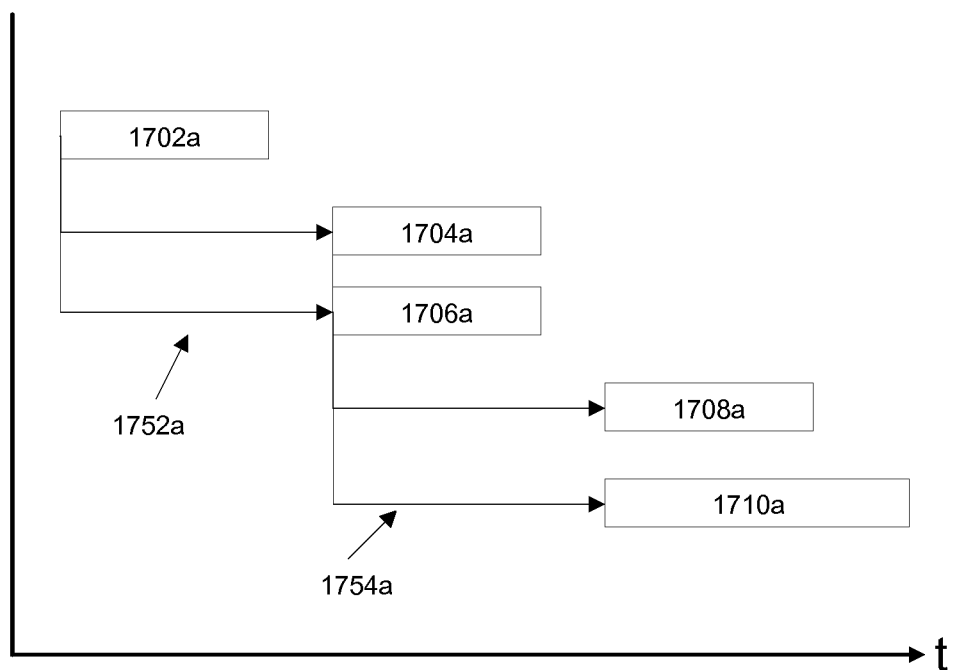
FIG. 17A illustrates one example of web page load data for use with a system in accordance with the present innovations.

FIG. 17A shows a similar web page transaction with objects 1702, 1704, 1706, 1708, and 1710. In FIG. 17A, however, the system has identified a different set of dependencies. Objects 1704 and 1706 depend only on the root HTTP request for object 1702 via dependency 1752. In other words, objects 1704 and 1706 do not require information from the root response that would be completed to the user at the time associated with the right hand side of the box for object 1702. The same is true for objects 1708 and 1710, which have dependency 1754 which means the objects are requested based only on the request for objects 1704 and 1706, and there is no reliance on information from the previous objects.

Figure 17B:
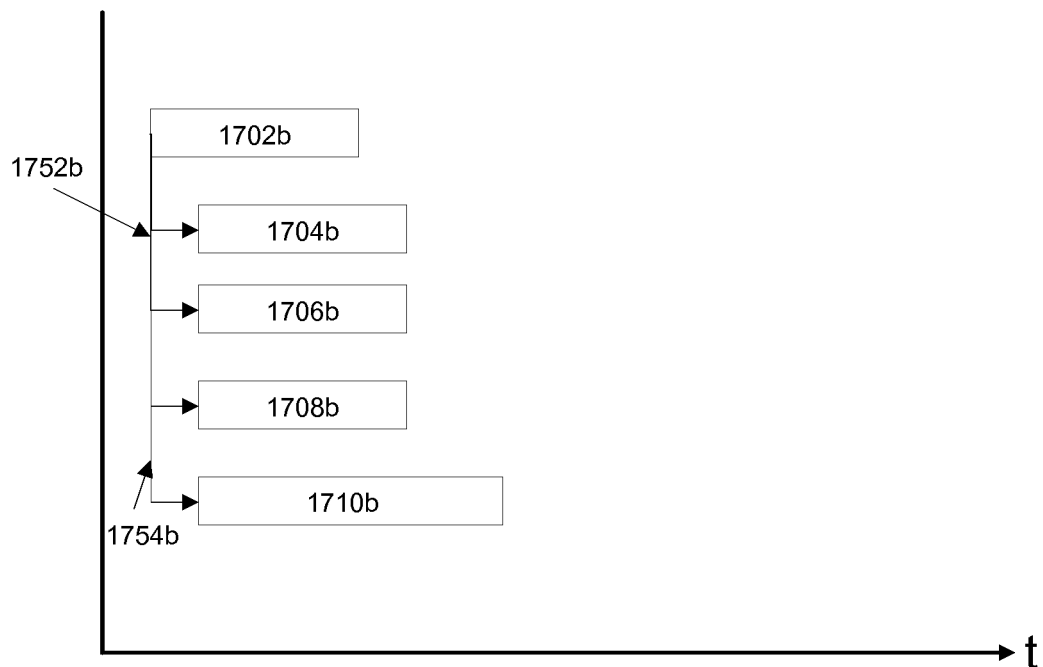
FIG. 17B illustrates one example of web page load data for use with a system in accordance with the present innovations.

FIG. 17B then shows a later request for the same web page as the web page of FIG. 17A. Because none of the child objects rely on information from any response, all of the objects may be prefetched as soon as the system sees the request for root object 1702. Because of the total lack of interdependencies, the example of FIG. 17B essentially shows an embodiment of a progressive prefetching system functioning as a prefetching system without utilizing any functionality for dealing with serializers.

Figure 18A:
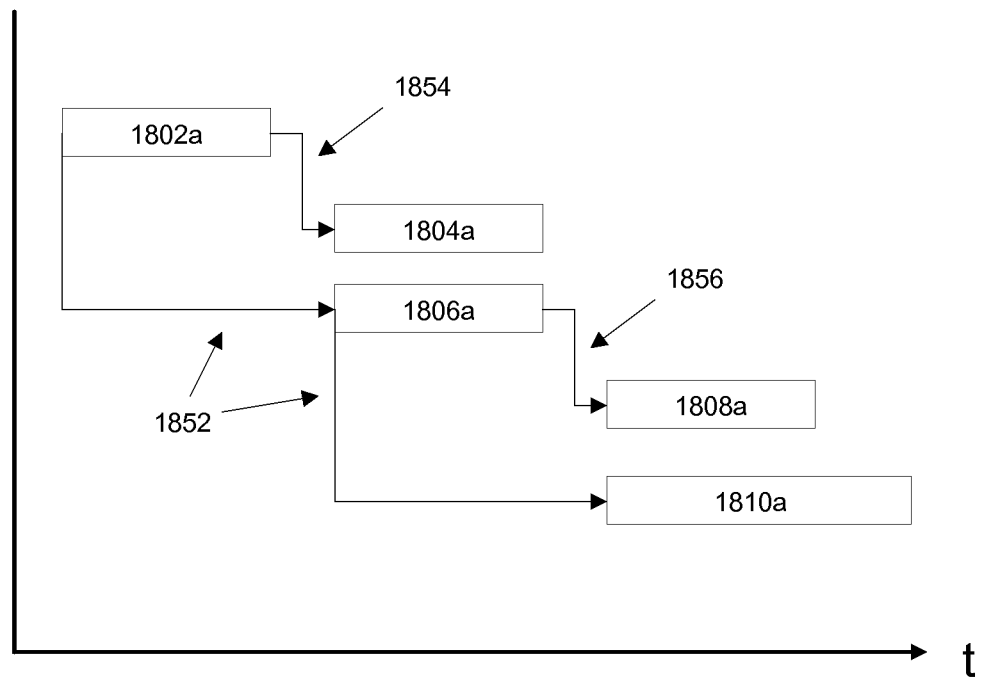
FIG. 18A illustrates one example of web page load data for use with a system in accordance with the present innovations.
Figure 18B:
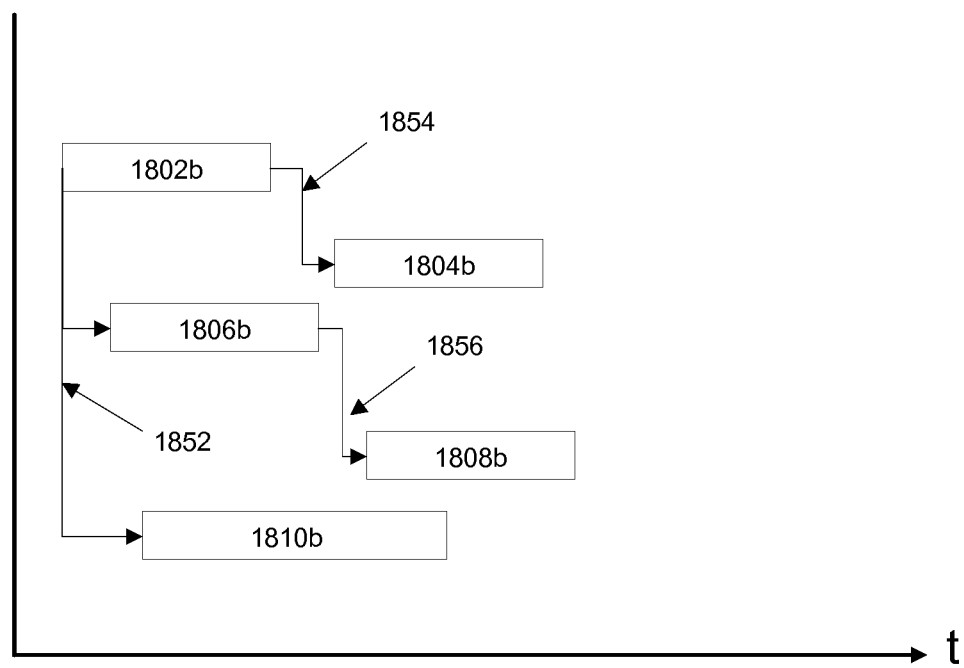
FIG. 18B illustrates one example of web page load data for use with a system in accordance with the present innovations.

FIGS. 18A and 18B again show another example of a web page transaction with the dependencies identified by one potential embodiment of a prefetching system. In FIG. 18, objects 1806 and 1810 do not rely on information from other requests and responses but only have a dependency or non-limiting association with the request as described above for dependency 1754. This does not limit the prefetching of objects 1806 and 1810; however, object 1804 depends on information from object 1802 via dependency 1854, and object 1808 depends on object 1806 via dependency 1856.

FIG. 18B shows a potential timing using prefetching, where objects 1606 and 1610 may be prefetched as soon as the request for root object 1802 is observed by the system. Object 1804 may not be prefetched until the appropriate information is received as part of the response for object 1802, and object 1808 may not be requested until the appropriate information is received from object 1806. This timing may be achieved as part of a prefetching system where a tracking system identifies the dependencies and passes the information to the prefetcher, which enables the new timing included the prefetching of objects at an earlier time in the overall web page transaction timing.

Figure 19A:
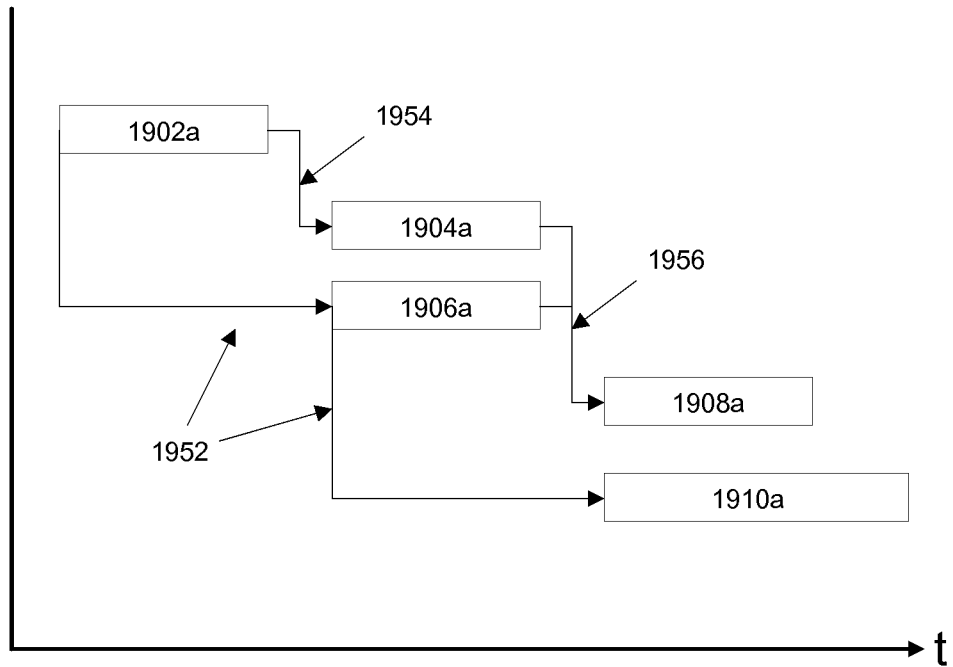
FIG. 19A illustrates one example of web page load data for use with a system in accordance with the present innovations.
Figure 19B:
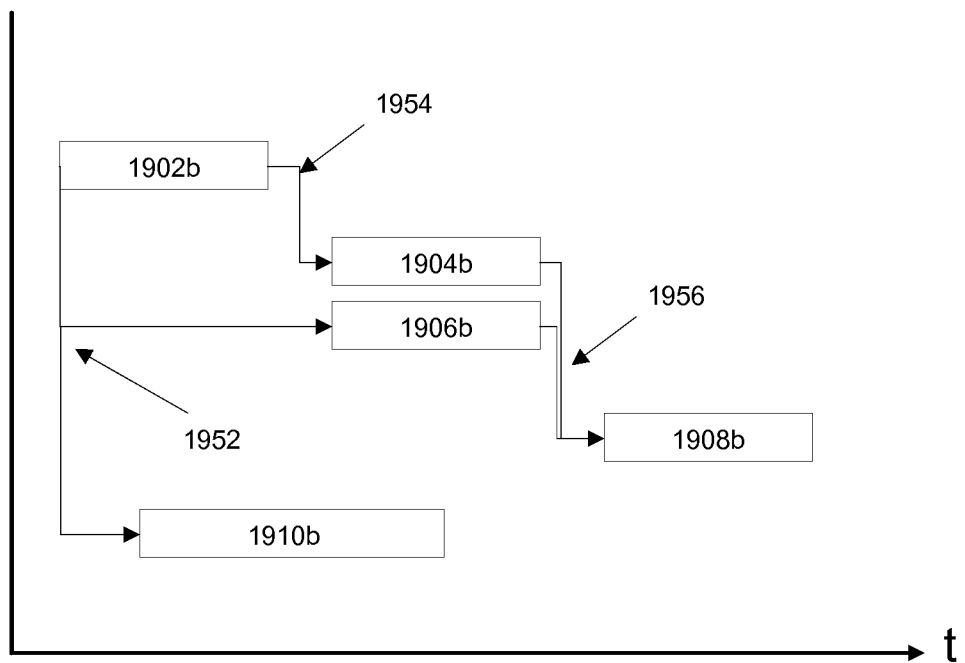
FIG. 19B illustrates one example of web page load data for use with a system in accordance with the present innovations.

Finally, FIGS. 19A and 19B show an additional web page transaction with a third set of dependencies different from those of FIGS. 16, 17, and 18 identified by the system. In FIG. 19, objects 1906 and 1910 have only root request dependency 1952, while object 1904 depends on information from root object 1902, and object 1908 depends on information from both object 1904 and object 1906. FIG. 19B shows a potential timing for a later transaction for the same web page as shown in FIG. 19A using prefetching.

In certain embodiments, the system may initially analyze a web page transaction to identify the dependencies. A system may further analyze various metrics including system resources, cost, user priority, domain priority, data type priority, or any other metric for prefetch decision making. One additional decision metric for prefetching is impact on overall page load time. In FIG. 19B, the system timing only shows object 1910 as having been prefetched in an order different from the request response order shown in the transaction of FIG. 19A. While object 1906 could be prefetched at an earlier timing due to the lack of dependency, such a prefetch would have no impact on the overall page load time, because the chain from object 1902 to object 1904 to object 1908 is the limiting factor in loading the page. Prefetching object 1906 would have no impact in the overall load time of the page.

By contrast, in FIG. 18B, if only object 1810 was prefetched, then the object 1808 would be the limiting factor on the page load time. In order to optimize total page load time, object 1806 is also prefetched to enable an additional second prefetch operation for object 1808 at an earlier time in the transaction, reducing the overall page load time as shown in FIG. 18B.

Figure 20:
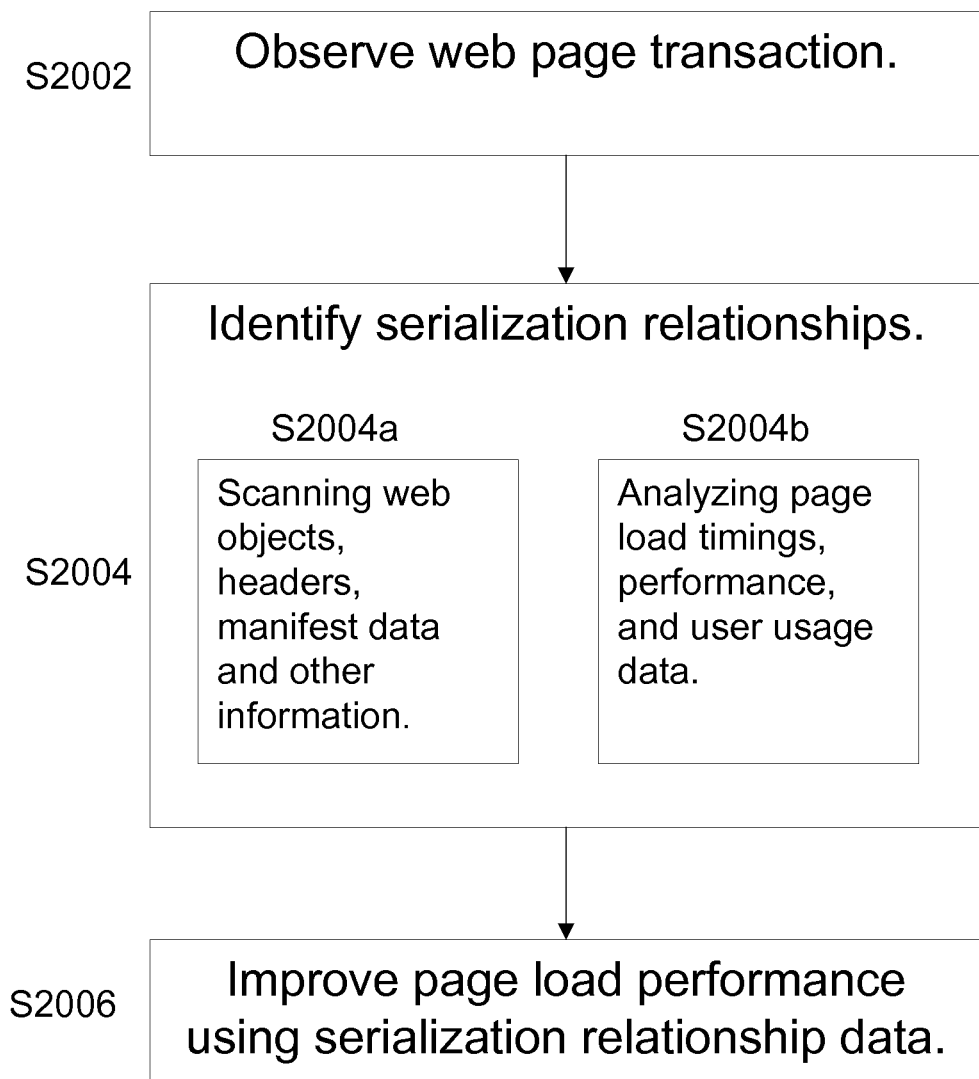
FIG. 20 is a flowchart describing one potential method of improved web page loading in accordance with the innovations presented herein.

FIG. 20, then, describes a basic method for progressive prefetching that may be incorporated into various embodiments of a prefetching system. In step S2002, a prefetching module or serializer identification module observes a web page transaction. Step S2002 may be performed in a proxy server such as proxy server 120 of FIG. 1A. Alternatively, step S2002 may be performed in client such as client 105 of FIG. 1A, by a proxy client or by any other module within client 105 such as a web browser. Step S2002 may also be performed by a prefetch analysis server such as prefetch analysis server 121 of FIG. 1C.

In step S2004, the system identifies serialization relationships between objects. These are serialization relationships such as dependencies 1652 and 1654 of FIG. 16, dependencies 1752 and 1754 of FIG. 17, dependencies 1852, 1854, and 1856 of FIG. 18, and dependencies 1952, 1954, and 1956 of FIG. 19. Various different methods may be used to identify these dependencies.

In step S2004a, objects are scanned to identify dependencies directly from the contents of the object. The system may include rules for contents of an object, such that when a parser scans through an object and identifies content with an associated rule related to progressive prefetching, the system creates a dependency for the identified objects. For example, a first object that contains a particular type of call to a child object with a dynamic URL, where the dynamic URL requires an object response, may be identified by scanning an object. The scan may also identify these relationships not just from the direct object, but from headers, manifold data associated with the web page, information provided with the web page by the content provider, web page creator, or a third party. Any information available for scanning may be parsed for information related to object dependencies.

In certain embodiments, the scanning and prefetch decision making may occur in real time as the web page transaction is occurring, such that progressive prefetching decisions are made for a web page transaction that has never been seen before. In alternative embodiments, the scanning system may simply log the identified dependency for future use in later requests for the web page. As described above with similar prefetching decision making where usage data is recorded to improve future prefetching, the system may use this information on a universal basis for all users of the system, or in alternative embodiments, the system may use the information on a user, or group basis, or any combination of the above.

In step S2004b, the system analyzes page load timings, such as the timings illustrated in FIGS. 14-19, in order to identify potential dependencies. Although individual web page transactions will not provide definitive proof of dependencies, a system may infer a dependency based off of a single observation. For example, a system observing the web page transaction of FIG. 16A may infer the dependencies shown in FIG. 16B without risk of creating errors. If a second observation of the web page shows the same timings, the likelihood that the dependencies inferred as dependency 1652 and 1654 are more likely to be correct. This is even more true with many repeat observations. However, if the timing order changes, the expected rules may be altered. For example, if over many observations object 1608a is sometimes requested before a response is received for object 1604a and object 1606a, the system may assume that there is no dependency for object 1608a, and alter the rule identified by the system. If the lack of dependency is later associated with page load errors, the dependency may be reinstated in a prefetching model.

In alternative embodiments, step S2004 may receive dependency information from a trusted outside source without first identifying or confirming the dependency. In such an embodiment, the system may simply incorporate the identified dependency into a prefetching model and prefetch based on the received information. Again, if the information received is later analyzed to be associated with misses, fails, or serialization based errors, the system may reject the information and adjust the model accordingly. The system may then automatically share information related to the errors with the original provider of the information.

In step S2004, any combination of the above methods, along with any other acceptable method that identifies serializing objects, may be combined. Just as with step S2002, step S2004 may be performed on a client, a proxy server, a prefetch analysis server, or any other computing device. In certain embodiments, the observation and/or identification may be done on a stand alone basis, without any directly associated prefetching system that alters future web page transactions. In the embodiment described in FIG. 20; however, information from step S2004 is provided to improve page load performance.

Step S2006, then, accepts the information from step S2004. The information may be used in a variety of ways to improve page load performance. As described above for FIGS. 18-19, the system may identify serializers that impact overall page load performance, and adjust prefetching decisions or system resource allocation to improve performance based on the identification of the serializers and the associated information. The system of FIG. 20 may include prefetching methods as described in FIGS. 12 and 13, where individual objects may be prefetched or cached in a web page transaction. Such a system may further include a progressive prefetching system that uses the information from step S2004 to alter caching decisions. In a system that is cache limited, serializers and other objects that do not typically impact page load performance over a large number of observations may be given a low caching priority, and serializers along with other objects that do impact page load performance may be given priority in cache memory where possible.

Figure 21:
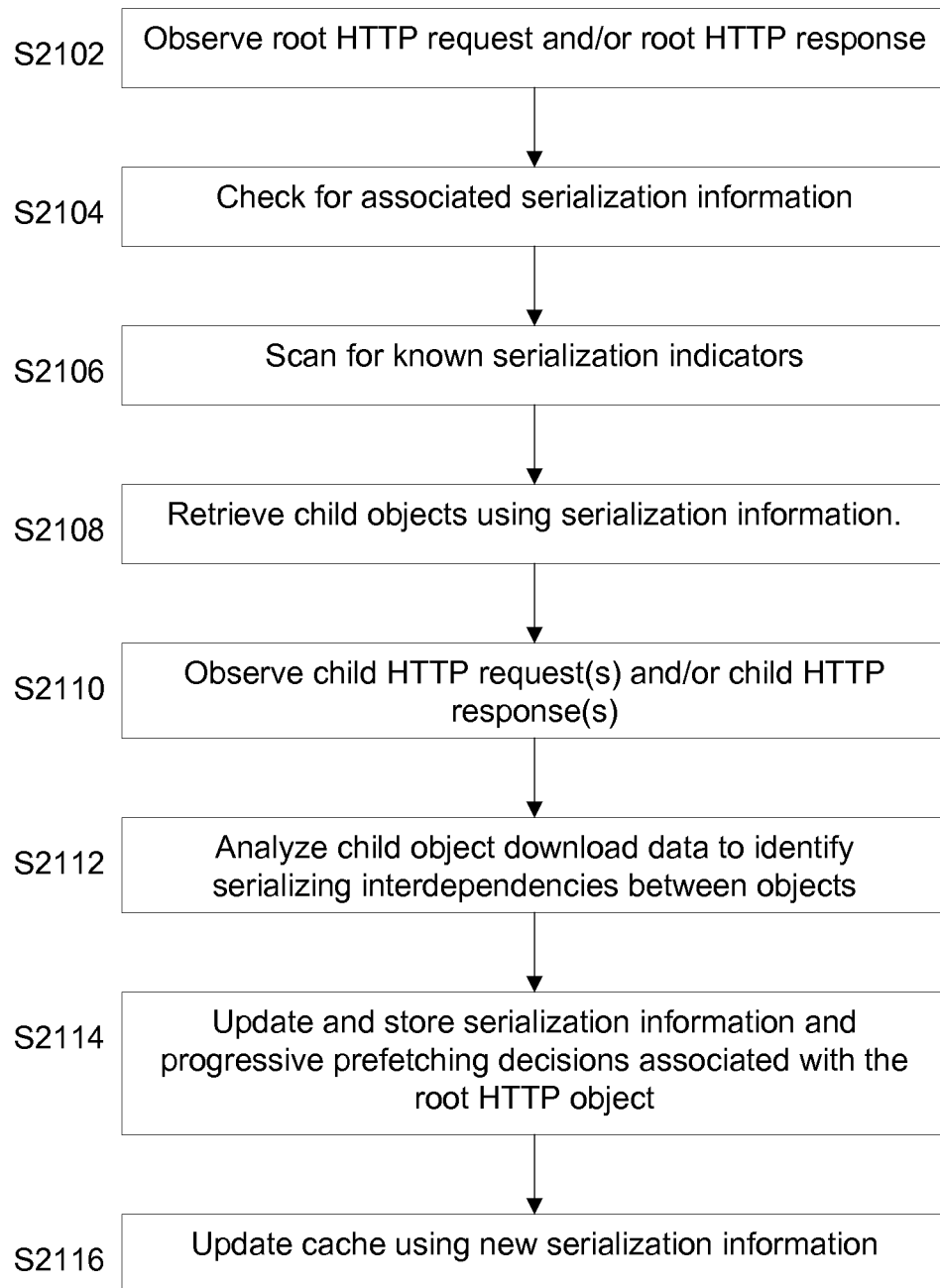
FIG. 21 a flowchart describing one potential method of improved web page loading in accordance with the innovations presented herein.

FIG. 21 provides an alternative method for progressive prefetching for use with one potential embodiment of a prefetching system in accordance with the innovations presented herein. In step S2102, a computing system observes at least a portion of a web page transaction that includes a root HTTP request and a root HTTP response.

In step S2104, the system attempts to identify the web page transaction to see if it has been previously observed, and if there is information associated with the web page transaction. In certain embodiments, this information may be structured as a root template as described above with respect to FIG. 4. A parser may tokenize root HTTP request data into a series of key/value pairs. Each unique root template may have a series of Bins. Each Bin may contain a list of child URLs and the probabilities of their being requested, along with any associated dependencies for each child, and any dynamic elements that may be constructed using information for the dependency as part of child origin model. The child origin model specifies how to get the values for these dynamic fields and may additionally specify the timing of the availability for the values. The origin model or another model may use the timing information along with the dynamic URL creation information to make decisions on prefetching timings within a web page transaction.

Alternatively, step S2104 may use another information storage method or source, where timing information is stored or received from another computing devices.

In step S2106, the system may scan the root and subsequent child requests and responses for tags or indicators that are associated with expected dependencies. A parser may scan through requests and responses to identify indicators or commands that the system has associated with serialization. For example, when the parser tokenizes HTTP data, dynamic portions of the data may be flagged as associated with dependencies. Additional analysis may be done in real time, or flagged for further analysis by a separate computing device or when additional computing resources are available.

In step S2108, the system performs object prefetching during the web page transaction, if possible and indicated by the prefetching rules of the system in conjunction with the associated serialization information from step S2104 and any new scanned serialization indicators from step S2106. Concurrently with step S2108, in step S2110, the web page transaction is observed and data associated with the web page transaction is recorded.

In step S2112, the web page transaction information is analyzed to identify serializing interdependencies between objects. This may include timing analysis in conjunction with previous records for the same or similar web pages. The new information may then be updated in the systems tracking databases or in whatever way the system follows and models web page transactions in step S2114. In step S2114, if the web page was not seen previously, a new template may be created for the newly observed web page. Otherwise the previous template may be updated. In certain embodiments where certain observed objects may be associated with identified key/value pairs, any dependencies identified for related objects may be updated in multiple web page transaction templates. In other words, if a subset of objects may be associated with multiple web pages based on the system models, the data may be abstracted to alter statistical models for all those associated web pages.

In step S2114, the system may also alter or make associations or wait for future progressive prefetching based on the information and analysis. For example, if a previously identified dependency is identified as having been incorrect, such that future prefetching timings may be altered to improve overall page load performance, a timing model may be updated so that the prefetching system will have the information in the future when the web page is requested by a user.

In step S2116, another system action may be taken in response to the identified and analyzed information. The system may identify objects which impact page load performance and adjust caching decisions. For example, continuing with the situation described above for step S2114, if a previously identified dependency is determined to have been incorrect, and an object may now be cached without causing dependency related errors, the system may analyze the impact of caching that object, and decide to alter a cache to include the object. Conversely, in alternative examples an object may be identified for removal from cache based on serialization timing data that indicates that caching a certain object has limited or no impact on overall page load timings. Objects in a cache may therefore be deleted or replaced based on a cache replacement policy created by or including the above described preferences and policies.

Thus, various embodiments may improve caching according to the above described methods. An additional alternative embodiment may use any suitable a system or device and function by observing, using a computing device, a web transaction including a root HTTP request and a plurality of child HTTP requests and responses. The system may then record a set of timing information for the web page transaction, calculate an expected page load time impact associated with caching the at least one child object. The system may make caching adjustments by adjusting a caching priority for the at least one child object or by making a caching decision directly based on the calculated impact.

In various embodiments, the system may include multiple computing devices, and in certain embodiments, calculation of an impact made for a first user computer may be generalized to a second user computer, such that caching decisions may be made on a second computer using an impact calculated for a first user computer. In further additional embodiments, the cache may be remote from a user computer, or may be shared cache. The impact may be made based on characteristics of a system element such as a dynamic CDN, as described herein, where the cache is the dynamic CDN and the page load impact is calculated based on the impact of storing an object in the dynamic CDN/cache. Further embodiments may compare the impact of storing an object in local cache versus a remote cache such as a dynamic CDN.

An impact may be determined in a number of different ways. In certain embodiments, a record of page load frequency for users may be determined based on user history data. This data may be used to predict a future page load frequency. For example, if a user regularly loads a news page daily, the system may infer that the page will be loaded daily. Additional patters such as weekend usage or monthly usage may additionally be found to set specific caching times and to cache objects during peak probability of use in conjunction with the additional impact calculations based on page load time.

An impact may alternately be determined by using a web crawler or server that automatically analyzes server responsiveness and other web transaction data along with known data related to users to model page load impact time without directly observing a page load for a user. In addition to the above described methods, other methods of determining impact may also be used.

Further embodiments may function by communicating the timing information from the computing device to an internet optimization server, wherein the calculating the expected page load time impact is performed on the internet optimization server or the calculation may be done on a client proxy or a browser plug-in module. In various embodiments the set of timing information includes an overall page load time from user selection to complete web page rendering. For systems using a browser module, the module may directly determine when a user selection is made within the browser for the purposes of determining page load timing.

Additionally, in various embodiments, the page load time may impact more than one user. Especially in the case of a shared or remote cache, the impact may be the sum of the impact for each user over a given period of time. The caching priority may therefore be set in a situation where although the impact for a single user may be small or negative, the overall impact for a group of shared users may be large. For example, an impact may be different in a situation where server responsiveness is fast and the bandwidth of users varies widely, but the impact may be similar for users if a server response time is slow compared to the file size and bandwidth of the users.

Also, because the cache will typically have a limited size, the time of caching and the size of the cached object may be considered when calculating the impact. A smaller file with a smaller page load impact may have a cumulatively larger impact with other small files that a large file with an individually larger size. A page impact may therefore be calculated as the sum of page load time for all users in a given time period divided by the file size. The time may be a set period, such as a low usage time when the cache is updated for all cache objects. Alternatively, the cache may be updated for individual files based on a freshness or caching expiration time determined by a content provider that provides the object.

Further embodiments may function where the expected page load time impact is based on an multiple expected future page loads for at least two separate web pages that use the at least one child object, wherein the multiple expected future page loads are determined using a page load history for the at least two separate web pages.

The system may also identify objects which are used by more than one web page. If an object is used by more than one web page, the impact may be calculated based on all identified web pages that use the object, so a greater impact may be seen in objects used by a large number of pages. Some very small objects may be used by a large number of pages, so certain embodiments may set a size or impact threshold to avoid overweighting objects with a small impact in a large number of pages.

In various embodiments, optimization of the web page rendering may include not just caching, but also prefetching, such that analysis of a page load impact may be based on overall optimizing access to the object. Optimizing access to an object may include moving the object to a local cache, a remote cache, or prefetching the object for direct use in rendering the web page. Such systems may use an object access priority that includes caching priority and prefetching priority.

Just as for the multiple various embodiments described above, any particular component or step of the above described example is non-limiting and may be altered, performed independently, or combined with any other known or described step that allows the system to function. In certain embodiments, an input URL and associated dynamic response data are analyzed for nested or dependent relationships. These relationships may be between children of a root HTTP request or may be reliant on further input. In further embodiments, a prefetching system identifies how information from a prefetch response or a subsequent web application request during a page download may be used to synthesize dynamic fields in a child URL. The above description therefore includes many potential combinations of systems, apparatus, and methods of using real user usage data to determine the dependency structures of a web application.

As described above, various embodiments may include observation of web transactions from an intermediate proxy server such as proxy server 120 of FIG. 1A, from a web browser component such as browser acceleration component 206a of FIG. 2B, or from embodiments in which both types of systems may be used. Additional details related to certain non-limiting examples of systems using a web browser component will now be described.

Various embodiments according to the present innovations may therefore include combinations of systems that perform prefetching of dynamically generated child URLs, prefetching of child URLs for roots have not previously seen by the system, progressive prefetching, identification of serializing objects, root URL identification, and identification of inconsequential elements in URLs among others. In certain embodiments the above operations involve inferring web page logic and structure based on observing HTTP requests and responses for the root object and the other objects on the page. In other embodiments of an acceleration system, a client side component built into the web browser may be included. In embodiments of a web page acceleration system where the system has access to such a component built into the web browser, the inference described above may no longer be necessary because the structure and logic of the page may be understood by the browser in order to render the page.

In one particular embodiment, a child URL can be dynamically generated at page load time by concatenating a random number to the end of a URL. Such dynamic URLs are commonly used to generate unique URLs for a given object every time the user visits the page to defeat caches so that web servers will always see these requests. An example of javascript code for such a function is:

```
stringmakeURLUnique (string URL)
{
    uniqueURL = URL + "random=" + rand( );
    returnuniqueURL;
}
```

In an embodiment which only has proxy server data, and does not have access to a browser module, inferring the above code from HTTP requests and responses may require a significant number of samples to have a high level of confidence that the value associated with the key named "random" is both inconsequential and in fact a randomly generated value. Further, in proxy only embodiments, there may always be some probability that in fact the number is not randomly generated. By contrast, in embodiments where a web page acceleration system includes a component inside the browser, then the function used to construct the URL can be included in the feedback sent from the browser to the acceleration feedback collector after a page is rendered.

Dynamic URLs can also include calculated values using custom functions, values found in persistent cookies, or values based on built-in functions like Date( ). As an example, certain web page transactions may use the following method to add a specially constructed string to the end of a URL:

```
stringconcatSpecialString(string URL)
{
//first add a key-value pair for the current timestamp
    specialString="timestamp=" + Date( );
//second add a key-value pair for the session ID
    specialString += "sessionID= + document.cookies["SessionID"];
//next hash this string using a standard MD5 algorithm (stringToMD5
function found here)
    md5String = stringToMD5(specialString);
//now concatanate the hashed string to the original URL
    specializedURL = URL + "MD5=" + md5String;
    returnspecializedURL ;
}
```

An example dynamic child URL could use both of the above functions and be generated as follows:

```
childURL = "http://mywebsite/myfooter.gif?";
childURL = makeURLUnique(childURL);
childURL = concatSpecialString(childURL);
Document.images[0].src = childURL;
```

The above would result in a request from a web browser for a URL of the following form on the network:
http://mywebsite/
myfooter.gif?random=9999999&MD5=9e107d9d3
72bb6826bd81d3542a419d The method used to generate this dynamic child URL would be very difficult to infer by observing instances as HTTP requests at a proxy. However, a component in the browser may send the javascript code used to generate the child URL as part of the feedback sent from the browser to the feedback collector in the acceleration system.

One potential embodiment of a feedback message for the above web page transaction including the dynamic URL web browser operation may be:

```
Root
    URL: http://mywebsite/
    Last Modified Time: <timestamp here>
    File Checksum: <checksum of object here>
    File Size: <number of bytes in root object file here>
    TimeToFirstByte: <milliseconds to receive the first byte in the
        response>
    DownloadTime: <milliseconds from first to last byte in the
        response>
Child1
    URL: dynamicChild1Function( )
        Function dynamicChild1Function( )
        {
            childURL = "http://mywebsite/myfooter.gif?";
            childURL = makeURLUnique(childURL);
            childURL = concatSpecialString(childURL);
            returnchildURL;
        }
        //referenced javascript functions including MD5 hashing
        function inserted here
    Last Modified Time:<timestamp here>
    File Checksum: <checksum of object here>
    File Size: <number of bytes in Child1 here>
    TimeToFirstByte: <milliseconds to receive the first byte in the
        response>
    DownloadTime: <milliseconds from first to last byte in the
        response>
    Dependencies: Child2, Child3
Child2
    URL: http://mywebsite/myicon.ico
    Last Modified Time:<timestamp here>
    File Checksum: <checksum of object here>
    File Size: <number of bytes in Child2 here>
    TimeToFirstByte: 500 ms
    DownloadTime: From Cache
    Dependencies: None
```

-continued

```
Child3
    URL: http://mywebsite/myscripts.js
    Last Modified Time:<timestamp here>
    File Checksum: <checksum of object here>
    File Size: <number of bytes in Child3 here>
    TimeToFirstByte: From Cache
    DownloadTime: From Cache
    Dependencies: None
Child4
    URL: http://myadserver/ad.gif
    Last Modified Time:<timestamp here>
    File Checksum: <checksum of object here>
    File Size: <number of bytes of object here>
    File Checksum: <checksum of object here>
    File Size: <number of bytes in Child1 here>
    Dependencies: None
```

In certain embodiments, such browser feedback may form the basis of prefetch hints supplied by either an optimization server in the assisted browsing architecture or the proxy server in the proxied architecture.

Other benefits of browser feedback are illustrated by the above described example implementation. The browser feedback may indicate when a child object is read from browser cache and used as part of rendering the page without any networking communication with the web server. This addresses another weakness of network-based HTTP feedback—the challenge of distinguishing between objects that are no longer part of the page and objects that are just being read from cache and therefore do not show up in the network transaction. In the above example, TimeToFirstByte "From Cache" and DownloadTime "FromCache" indicate that the browser never communicated with the server.

Browser feedback can also provide information about inter-object dependencies that would otherwise need to be inferred. So, for instance, if makeURLUniquejavascript method is implemented in myscripts.js which is an object of Child 3 in the above example, then the Child 1 URL cannot be generated until Child 3 is downloaded. Likewise, if the response to Child 2 sets a cookie (SessionID cookie, for instance), that is subsequently used to create a dynamic URL, or whose value is uploaded in the HTTP GET requests of subsequent objects sent to that host, then the requests for those objects are dependent on Child 2. Serializers are a specific case of inter-object dependencies where, during the course of rendering a page, a single object needs to be downloaded prior to any subsequent objects being requested on the page. In general, when the browser renders the page, it requests objects in a particular order. Ignoring limits on concurrent connections to hosts, this order is caused by the underlying interdependencies between the objects, and this information is important for prefetching.

Browser feedback also provides perfect root object identification. In fact it goes further by indicating which web control on the page was used to initiate the root object. So, for instance, browser feedback can indicate that the user clicked the "Search" button to initiate the root object request. Or the "submit" button. Or on the other hand, if the user clicked a link in an HTML header or an HTML footer. This type of click context information enables smarter root templating, which is where the acceleration system is able to identify child objects to prefetch for a give root object URL despite the fact that the exact root URL has never been seen before in the system.

The browser feedback described above can benefit both a proxied accelerator system as well as a web acceleration systems that includes a component inside the browser to perform prefetching. In general, browser-based feedback improves performance and efficiency as more objects are successfully prefetched with fewer extra objects downloaded that are not requested by the browser. Additional improvements may be seen when the web browser component not only provides feedback but also functions inside the browser to assist in the prefetching process itself. In such embodiments, the components, such as browser acceleration component 206a, function both to provide feedback to an acceleration system and also to improve the prefetching for objects in a web page transaction being currently executed by the web browser.

In certain such embodiments, when the user decides to initiate a page load either by clicking a link or pressing a button, the browser may request prefetch hints from the optimization server, prefetch analysis server, or proxy server.

In embodiments based on the above browser feedback described just above, these hints can take a similar form as the feedback itself. So if the example feedback file was the result of the previous visit to http://mywebsite, then prefetch hints returned by the optimization server could take a similar form such that prefetch hint information sent to the browser comprises:

```
Root
    URL: http://mywebsite/
    Last Modified Time: <timestamp here>
    File Checksum: <checksum of object here>
    File Size: <number of bytes in root object file here>
    TimeToFirstByte: <milliseconds to receive the first byte in the
        response>
    DownloadTime: <milliseconds from first to last byte in the
        response>
Child1
    URL: dynamicChild1Function( )
        Function dynamicChild1Function( )
        {
            childURL = "http://mywebsite/myfooter.gif?";
            childURL = makeURLUnique(childURL);
            childURL = concatSpecialString(childURL);
            returnchildURL;
        }
        //referenced javascript functions including MD5 hashing
            function inserted here
    Last Modified Time:<timestamp here>
    File Checksum: <checksum of object here>
    File Size: <number of bytes in Child1 here>
    TimeToFirstByte: <milliseconds to receive the first byte in the
        response>
    DownloadTime: <milliseconds from first to last byte in the
        response>
    Dependencies: Child2, Child3
Child2
    URL: http://mywebsite/myicon.ico
    Last Modified Time:<timestamp here>
    File Checksum: <checksum of object here>
    File Size: <number of bytes in Child2 here>
    TimeToFirstByte: 500 ms
    DownloadTime: From Cache
    Dependencies: None
Child3
    URL: http://mywebsite/myscripts.js
    Last Modified Time:<timestamp here>
    File Checksum: <checksum of object here>
    File Size: <number of bytes in Child3 here>
    TimeToFirstByte: From Cache
    DownloadTime: From Cache
    Dependencies: None
Child4
    URL: http://myadserver/ad.gif
    Last Modified Time:<timestamp here>
    File Checksum: <checksum of object here>
```

```
File Size: <number of bytes of object here>
File Checksum: <checksum of object here>
File Size: <number of bytes in Child1 here>
Dependencies: None
```

The browser may function using the prefetch hint information a smarter, dynamic manifest file that improves on any information that may be provided in an associated HTML5 manifest. The improved dynamic manifest file may cover all hosts referenced on the page, so for static objects, the improved manifest would allow the browser to issue the requests for these child objects in parallel as soon as the prefetch hints are received. In certain embodiments the manifest is "dynamic" because it did not need to be manually updated by the web developer, but may be instead be updated by the feedback from the proxy observation or the feedback from the browser acceleration component. Such a dynamic manifest file may be considered "smarter" because even the dynamic child objects with dependencies can be speculatively prefetched using, for example, the dynamic child creation methods described above or any similar such method for prefetching a dynamic child URL. In one embodiment, upon receipt of the manifest file, an acceleration system may compile the javascript associated with Child 1 and then execute all or part of the javascript to calculate the value of the URL for Child 1 to enable prefetching. If at the time the browser needs to render this object, none of the variable input values (in this case SessionID only) have changed, then the system may use the prefetched copy.

Because the prefetcher can detect and enforce dependencies, this approach enables various embodiments to function in a way that is friendly to pages that update cookies during page load. Prefetched requests may thus be issued progressively for the first batch containing URLs that have no dependencies, and the second and subsequent containing URLs that depend on cookies being updated by the first batch of URLs. In certain embodiments, this applies to cookies that are updated via a Set-Cookie response header as well as those that are updated via javascript code executed in the browser. In alternate embodiments, the system may be amended to capture any cookie update that impacts child objects. In any embodiment, the prefetcher can be aware of a dependency and simply wait for the update to complete before issuing the dependent requests. In certain embodiments, prefetching may be used initially, and when errors or problems arise, the particular dependency may be flagged as a source of misses or fails and the system set to wait for the update prior to continuing with the web page transaction.

For embodiments that identify and prefetch dynamic children, the smart manifest or the prefetch hints may function most efficiently when they contain all the javascript used to generate the dynamic URL. Sections of javascript code that do not impact URL generation can be removed so that what is uploaded in the feedback and/or what is downloaded as part of the prefetch hints to the proxy server or web browser will contain only that code that is needed to generate the URL.

In certain embodiments structured with a manifest as described above, because of the other information in the manifest (Last Modified Time, Checksum, File Size), the browser may function to determine whether or not it can safely use an object in its cache without having to separately ask the web server about that object. Also, the file size can inform prefetch decisions. If the user is running over a narrowband connection and the probability of use is low, then the user can use browser-based prefetching components to decide not to prefetch the given object.

Therefore, for many embodiments, having a component inside the browser allows an acceleration system to gather significant amounts of detailed information about the structure and logic of the page and the page loading process that is not as easily or directly available to improve prefetching in a proxy-only embodiment. Further still, for embodiments that also have a browser component to read and act on the prefetch hints and to actively assist with prefetching for the web browser in addition to providing feedback, then prefetching success ratios and performance improvements may be even higher.

Figure 10:
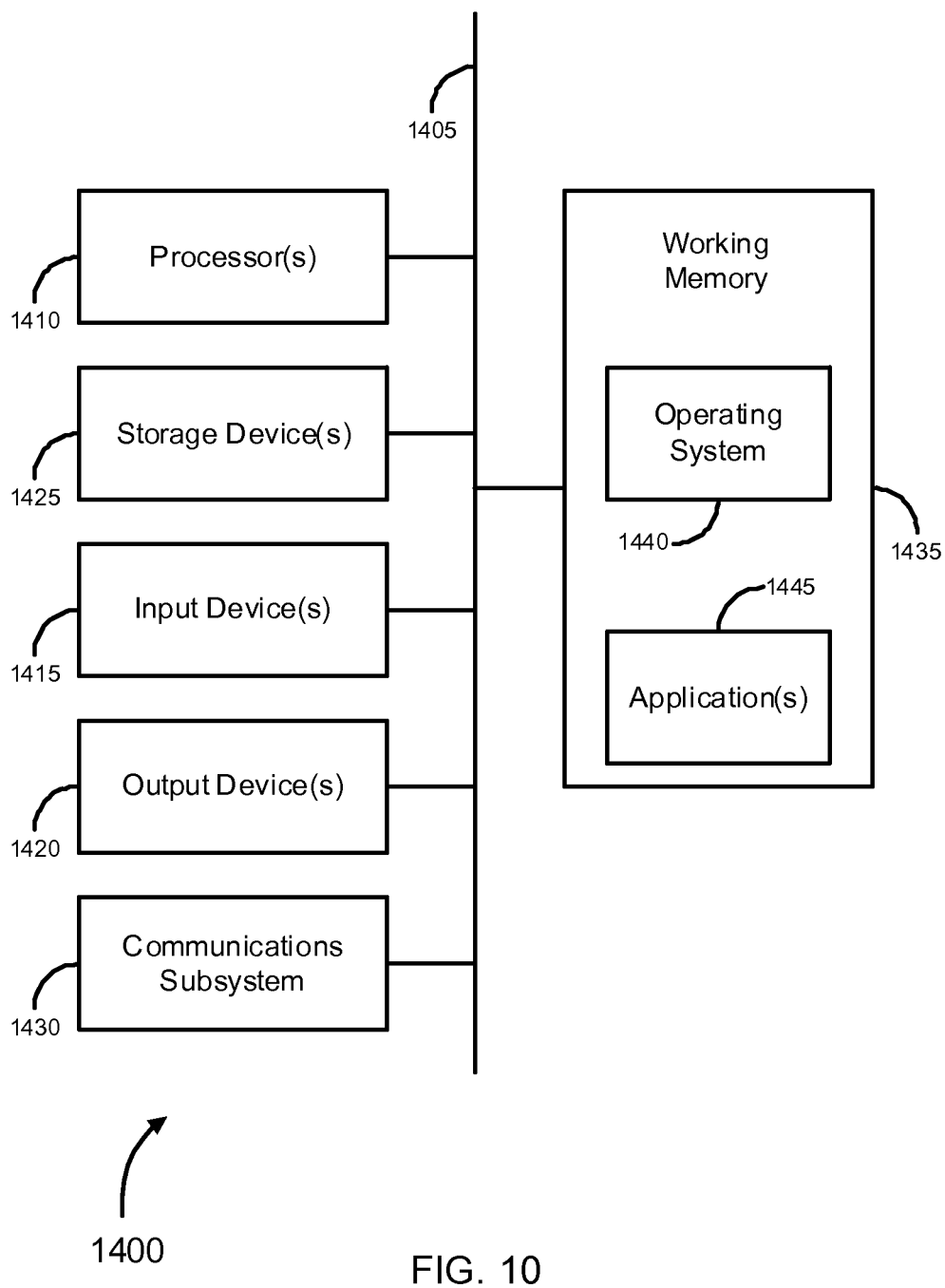
FIG. 10 illustrates a block diagram of one potential implementation of a computing device in accordance with one potential embodiment of the innovations presented herein.

FIG. 10 provides a schematic illustration of one embodiment of a computer system 1400 that can perform the methods of the invention, as described herein, and/or can function, for example, as any part of client 305, proxy server 320, or content server 330 in FIG. 3. It should be noted that FIG. 10 is meant only to provide a generalized illustration of various components, any or all of which may be utilized, as appropriate. FIG. 10, therefore, broadly illustrates how individual system elements may be implemented in a relatively separated or relatively more integrated manner.

The computer system 1400 is shown comprising hardware elements that can be electrically coupled via a bus 1405 (or may otherwise be in communication, as appropriate). The hardware elements can include one or more processors 1410, including, without limitation, one or more general-purpose processors and/or one or more special-purpose processors (such as digital signal processing chips, graphics acceleration chips, and/or the like); one or more input devices 1415, which can include, without limitation, a mouse, a keyboard, and/or the like; and one or more output devices 1420, which can include, without limitation, a display device, a printer, and/or the like.

The computer system 1400 may further include (and/or be in communication with) one or more storage devices 1425, which can comprise, without limitation, local and/or network accessible storage and/or can include, without limitation, a disk drive, a drive array, an optical storage device, a solid-state storage device such as a random access memory ("RAM"), and/or a read-only memory ("ROM"), which can be programmable, flash-updateable, and/or the like. The computer system 1400 might also include a communications subsystem 1430, which can include, without limitation, a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1430 may permit data to be exchanged with a network (such as the network described below, to name one example), and/or any other devices described herein. In many embodiments, the computer system 1400 will further comprise a working memory 1435, which can include a RAM or ROM device, as described above.

The computer system 1400 also can comprise software elements, shown as being currently located within the working memory 1435, including an operating system 1440 and/or other code, such as one or more application programs 1445, which may comprise computer programs of the invention and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 1425 described above. In some cases, the storage medium might be incorporated within a computer system, such as the system 1400. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 1400, and/or might take the form of source and/or installable code which, upon compilation and/or installation on the computer system 1400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 1400) to perform methods of the invention. According to a set of embodiments, some or all of the procedures of such methods are performed by the computer system 1400 in response to processor 1410 executing one or more sequences of one or more instructions (which might be incorporated into the operating system 1440 and/or other code, such as an application program 1445) contained in the working memory 1435. Such instructions may be read into the working memory 1435 from another machine-readable medium, such as one or more of the storage device(s) 1425. Merely by way of example, execution of the sequences of instructions contained in the working memory 1435 might cause the processor(s) 1410 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 1400, various machine-readable media might be involved in providing instructions/code to processor(s) 1410 for execution and/or might be used to store and/or carry such instructions/code (e.g., as signals). In many implementations, a computer readable medium is a physical and/or tangible storage medium. Such a medium may take many forms, including, but not limited to, non-volatile media, volatile media, and transmission media. Non-volatile media includes, for example, optical or magnetic disks, such as the storage device(s) 1425. Volatile media includes, without limitation, dynamic memory, such as the working memory 1435. Transmission media includes coaxial cables, copper wire, and fiber optics, including the wires that comprise the bus 1405, as well as the various components of the communications subsystem 1430 (and/or the media by which the communications subsystem 1430 provides communication with other devices). Hence, transmission media can also take the form of waves (including, without limitation, radio, acoustic, and/or light waves, such as those generated during radio-wave and infrared data communications).

Common forms of physical and/or tangible computer readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1400. These signals, which might be in the form of electromagnetic signals, acoustic signals, optical signals, and/or the like, are all examples of carrier waves on which instructions can be encoded, in accordance with various embodiments of the invention.

The communications subsystem 1430 (and/or components thereof) generally will receive the signals, and the bus 1405 then might carry the signals (and/or the data, instructions, etc., carried by the signals) to the working memory 1435, from which the processor(s) 1405 retrieves and executes the instructions. The instructions received by the working memory 1435 may optionally be stored on a storage device 1425 either before or after execution by the processor(s) 1410.

Figure 11:
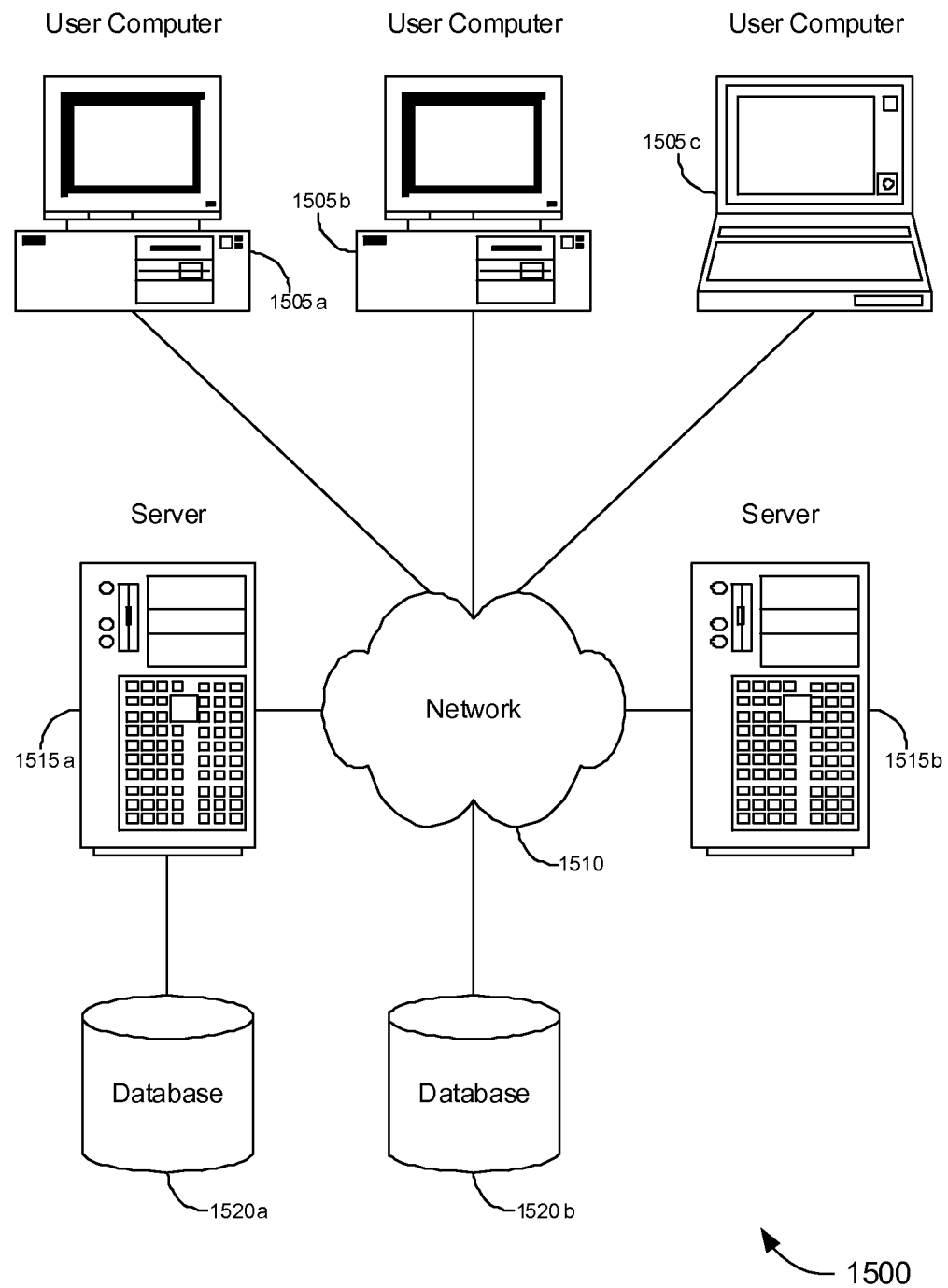
FIG. 11 illustrates a block diagram of one potential implementation of a communications system in accordance with one potential embodiment of the innovations presented herein.

A set of embodiments comprises systems for implementing staged configurator modeling. In one embodiment, proxy server 320 and/or client 305 (as shown in FIG. 3) may be implemented as computer system 1400 in FIG. 10. Merely by way of example, FIG. 11 illustrates a schematic diagram of a system 1500 that can be used in accordance with one set of embodiments. The system 1500 can include one or more user computers 1505. The user computers 1505 can be general purpose personal computers (including, merely by way of example, personal computers and/or laptop computers running any appropriate flavor of Windows® operating systems and/or Mac OS® operating system software) and/or workstation computers running any of a variety of commercially-available UNIX® or UNIX-like operating systems. These user computers 1505 can also have any of a variety of applications, including one or more applications configured to perform methods of the invention, as well as one or more office applications, database client and/or server applications, and web browser applications. Alternatively, the user computers 1505 can be any other electronic device, such as a thin-client computer, Internet-enabled mobile telephone, and/or personal digital assistant (PDA), capable of communicating via a network (e.g., the network 1510 described below) and/or displaying and navigating web pages or other types of electronic documents. Although the exemplary system 1500 is shown with three user computers 1505, any number of user computers can be supported.

Certain embodiments of the invention operate in a networked environment, which can include a network 1510. The network 1510 can be any type of network familiar to those skilled in the art that can support data communications using any of a variety of commercially-available protocols, including, without limitation, TCP/IP, SNA, IPX, AppleTalk®, and the like. Merely by way of example, the network 1510 can be a local area network (LAN), including, without limitation, an Ethernet network; a Token-Ring network and/or the like; a wide-area network (WAN); a virtual network, including, without limitation, a virtual private network (VPN); the Internet; an intranet; an extranet; a public switched telephone network (PSTN); an infrared network; a wireless network, including, without limitation, a network operating under any of the IEEE 802.11 suite of protocols, the Bluetooth™ protocol known in the art, and/or any other wireless protocol; and/or any combination of these and/or other networks.

Embodiments of the invention can include one or more server computers 1515. Each of the server computers 1515 may be configured with an operating system, including, without limitation, any of those discussed above, as well as any commercially (or freely) available server operating systems. Each of the servers 1515 may also be running one or more applications, which can be configured to provide services to one or more user computers 1505 and/or other servers 1515.

Merely by way of example, one of the servers 1515 may be a web server, which can be used, merely by way of example, to process requests for web pages or other electronic documents from user computers 1505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 1505 to perform methods of the invention.

The server computers 1515, in some embodiments, might include one or more application servers, which can include one or more applications accessible by a client running on one or more of the client computers 1505 and/or other servers 1515. Merely by way of example, the server(s) 1515 can be one or more general purpose computers capable of executing programs or scripts in response to the user computers 1505 and/or other servers 1515, including, without limitation, web applications (which might, in some cases, be configured to perform methods of the invention). Merely by way of example, a web application can be implemented as one or more scripts or programs written in any suitable programming language, such as Java, C, C# or C++, and/or any scripting language, such as Perl, Python, or TCL, as well as combinations of any programming/scripting languages. The application server(s) can also include database servers, including without limitation those commercially available from Oracle®, Microsoft®, Sybase®, IBM®, and the like, which can process requests from clients (including, depending on the configurator, database clients, API clients, web browsers, etc.) running on a user computer 1505 and/or another server 1515. In some embodiments, an application server can create web pages dynamically for displaying the information in accordance with embodiments of the invention, such as information displayed on web browser 106 in FIG. 1. Data provided by an application server may be formatted as web pages (comprising HTML, Javascript, etc., for example) and/or may be forwarded to a user computer 1505 via a web server (as described above, for example). Similarly, a web server might receive web page requests and/or input data from a user computer 1505 and/or forward the web page requests and/or input data to an application server. In some cases a web server may be integrated with an application server.

In accordance with further embodiments, one or more servers 1515 can function as a file server and/or can include one or more of the files (e.g., application code, data files, etc.) necessary to implement methods of the invention incorporated by an application running on a user computer 1505 and/or another server 1515. Alternatively, as those skilled in the art will appreciate, a file server can include all necessary files, allowing such an application to be invoked remotely by a user computer 1505 and/or server 1515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1520. The location of the database(s) 1520 is discretionary: merely by way of example, a database 1520a might reside on a storage medium local to (and/or resident in) a server 1515a (and/or a user computer 1505). Alternatively, a database 1520b can be remote from any or all of the computers 1505 or servers 1515, so long as the database 1520b can be in communication (e.g., via the network 1510) with one or more of these. In a particular set of embodiments, a database 1520 can reside in a storage-area network (SAN) familiar to those skilled in the art. (Likewise, any necessary files for performing the functions attributed to the computers 1505 or servers 1515 can be stored locally on the respective computer and/or remotely, as appropriate.) In one set of embodiments, the database 1520 can be a relational database, such as an Oracle database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

That which is claimed is:

1. A method comprising:
   receiving, using a computing device, web page transaction data for a web page transaction comprising:
   a root request for a web page, and resulting therefrom:
   a root response;
   a child request for a child object; and
   a child response;
   wherein the web page transaction comprises a prior loading of the web page by a first client browser, and
   wherein the web page transaction data comprises timing data indicating a relative timing of a plurality of web page transaction events during the prior loading of the web page, the timing data comprising a timing of the use of the child object by the first client browser relative to one of the plurality of web page transaction events;
   determining, using the computing device, a page impact on the web page transaction of the child object based on the web page transaction data, the page impact based on a use of the child object during the web page transaction with respect to a web page transaction event;
   determining, using the computing device, a caching priority based on the page impact; and
   providing, using the computing device, the caching priority to enable a determination to cache the child object if the caching priority indicates the child object should be cached.

2. The method of claim 1, wherein one of the plurality of web page transaction events is an initiation of the web page transaction by the first client browser and another of the plurality of web page transaction events is use of the child object by the first client browser.

3. The method of claim 1, wherein one of the plurality of web page transaction events is the child request by the first client browser and another of the plurality of web page transaction events is receipt of the child response by the first client browser.

4. The method of claim 3, wherein another of the plurality of web page transaction events is receipt of a first byte of the child response by the first client browser.

5. The method of claim 1, wherein one of the plurality of web page transaction events is starting, by the first client browser, a rendering of the web page.

6. The method of claim 1, wherein one of the plurality of web page transaction events is use of the child object by the first client browser and another of the plurality of web page transaction events is use of another child object of the web page by the first client browser.

7. The method of claim 1, wherein one of the plurality of web page transaction events is a navigation event by the first client browser and another of the plurality of web page transaction events is use of the child object by the first client browser.

8. The method of claim 1, wherein one of the plurality of web page transaction events is completion of the prior loading of the web page by the first client browser.

9. The method of claim 1, wherein one of the plurality of web page transaction events is the root request.

10. The method of claim 1, wherein:
    the computing device is a web optimization server, and
    the receiving web page transaction data comprises receiving the web page transaction data from the first client browser.

11. The method of claim 1, wherein the providing the caching priority comprises providing the caching priority to a second client browser.

12. The method of claim 11, wherein the caching priority enables the second client browser to make the determination to cache the child object.

13. The method of claim 11, wherein the caching priority enables a cache external to the computing device and the first and second client browsers to make the determination to cache the child object.

14. The method of claim 1, wherein the page impact is based on a timing of the use of the child object by the first client browser with respect to at least one of the web page transaction events during the loading of the web page.

15. The method of claim 1, wherein the web page transaction data further comprises a probability of the first client browser or another client browser using the child object during a future loading of the web page.

16. The method of claim 1, wherein determining the page impact is further based on an expected impact associated with caching the child object.

17. The method of claim 1, wherein determining the page impact is further based on an impact from storing the child object in a dynamic content delivery network.

18. The method of claim 1, wherein determining the page impact is further based on a predicted future page load frequency.

19. The method of claim 1, wherein determining the page impact is further based on server responsiveness of a server associated with the child object.

20. The method of claim 1, wherein the page impact is a shared page impact, and wherein determining the shared page impact is based on a sum of a plurality of page impacts of the child object over a predetermined time period.

21. The method of claim 1, wherein determining the page impact is further based on a second page impact, the second page impact based on a use of the child object during a second web page transaction with respect to a web page transaction event, the second web page transaction for a second web page different than the web page.

22. The method of claim 1, wherein:
    the computing device is an internet optimization server.

23. A system comprising:
    a non-transitory computer-readable medium; and
    a processor in communication with the non-transitory computer-readable medium, the processor configured to execute processor-executable instructions stored in the non-transitory computer-readable medium to:
    receive web page transaction data for a web page transaction comprising:
    a root request for a web page, and resulting therefrom:
    a root response;
    a child request for a child object; and
    a child response;
    wherein the web page transaction comprises a prior loading of the web page by a first client browser, and
    wherein the web page transaction data comprises timing data indicating a relative timing of a plurality of web page transaction events during the prior loading of the web page, the timing data comprising a timing of the use of the child object by the first client browser relative to one of the plurality of web page transaction events;

determine a page impact on the web page transaction of the child object based on the web page transaction data, the page impact based on a use of the child object during the web page transaction with respect to a web page transaction event;

determine a caching priority based on the page impact; and provide the caching priority to enable a determination to cache the child object if the caching priority indicates the child object should be cached.

24. The system of claim 23, wherein one of the plurality of web page transaction events is an initiation of the web page transaction by the first client browser and another of the plurality of web page transaction events is use of the child object by the first client browser.

25. The system of claim 23, wherein one of the plurality of web page transaction events is the child request by the first client browser and another of the plurality of web page transaction events is receipt of the child response by the first client browser.

26. The system of claim 25, wherein another of the plurality of web page transaction events is receipt of a first byte of the child response by the first client browser.

27. The system of claim 23, wherein one of the plurality of web page transaction events is starting, by the first client browser, a rendering of the web page.

28. The system of claim 23, wherein one of the plurality of web page transaction events is use of the child object by the first client browser and another of the plurality of web page transaction events is use of another child object of the web page by the first client browser.

29. The system of claim 23, wherein one of the plurality of web page transaction events is a navigation event by the first client browser and another of the plurality of web page transaction events is use of the child object by the first client browser.

30. The system of claim 23, wherein one of the plurality of web page transaction events is completion of the prior loading of the web page by the first client browser.

31. The system of claim 23, wherein one of the plurality of web page transaction events is the root request.

32. The system of claim 23, wherein:
the system is a web optimization server, and
the processor is further configured to execute processor-executable instructions stored in the non-transitory computer-readable medium to receive the web page transaction data from the first client browser.

33. The system of claim 19, the processor is further configured to execute processor-executable instructions stored in the non-transitory computer-readable medium to provide the caching priority to a second client browser.

34. The system of claim 30, wherein the caching priority enables the second client browser to make the determination to cache the child object.

35. The system of claim 30, wherein the caching priority enables a cache external to the system and the first and second client browsers to make the determination to cache the child object.

36. The system of claim 23, wherein the page impact is based on a timing of the use of the child object by the first client browser with respect to at least one of the web page transaction events during the loading of the web page.

37. The system of claim 23, wherein the web page transaction data further comprises a probability of the first client browser or another client browser using the child object during a future loading of the web page.

38. The system of claim 19, wherein the processor is further configured to execute processor-executable instructions stored in the non-transitory computer-readable medium to determine the page impact further based on an expected impact associated with caching the child object.

39. The system of claim 19, wherein the processor is further configured to execute processor-executable instructions stored in the non-transitory computer-readable medium to determine the page impact further based on an impact from storing the child object in a dynamic content delivery network.

40. The system of claim 19, wherein the processor is further configured to execute processor-executable instructions stored in the non-transitory computer-readable medium to determine the page impact further based on a predicted future page load frequency.

41. The system of claim 19, wherein the processor is further configured to execute processor-executable instructions stored in the non-transitory computer-readable medium to determine the page impact further based on server responsiveness of a server associated with the child object.

42. The system of claim 23, wherein the page impact is a shared page impact, and wherein the processor is further configured to execute processor-executable instructions stored in the non-transitory computer-readable medium to determine the shared page impact based on a sum of a plurality of page impacts of the child object over a predetermined time period.

43. The system of claim 23 wherein the processor is further configured to execute processor-executable instructions stored in the non-transitory computer-readable medium to determine the page impact further based on a second page impact, the second page impact based on a use of the child object during a second web page transaction with respect to a web page transaction event, the second web page transaction for a second web page different than the web page.

44. The system of claim 23, wherein:
the system is an internet optimization server.

* * * * *